United States Patent [19]

Andersen et al.

[11] Patent Number: 5,720,913
[45] Date of Patent: Feb. 24, 1998

[54] METHODS FOR MANUFACTURING SHEETS FROM HYDRAULICALLY SETTABLE COMPOSITIONS

[75] Inventors: Per Just Andersen; Simon K. Hodson, both of Santa Barbara, Calif.

[73] Assignee: E. Khashoggi Industries, Santa Barbara, Calif.

[21] Appl. No.: 475,366

[22] Filed: Jun. 7, 1995

Related U.S. Application Data

[63] Continuation of Ser. No. 101,500, Aug. 3, 1993, abandoned, which is a continuation-in-part of Ser. No. 929,898, Aug. 11, 1992, abandoned, Ser. No. 19,151, Feb. 17, 1993, Pat. No. 5,453,310, and Ser. No. 95,662, Jul. 21, 1993, Pat. No. 5,385,764.

[51] Int. Cl.$^6$ .......................... B29C 59/00; B29C 67/20; B28B 11/16; B29D 31/00
[52] U.S. Cl. .......................... 264/108; 264/129; 264/145; 264/152; 264/175
[58] Field of Search .................................. 264/175, 108, 264/129, 145, 152

[56] References Cited

U.S. PATENT DOCUMENTS

| | | |
|---|---|---|
| 109,669 | 11/1870 | Rowland . |
| 128,980 | 7/1872 | Rowland . |
| 591,168 | 10/1897 | Heinzerling . |

(List continued on next page.)

FOREIGN PATENT DOCUMENTS

| | | |
|---|---|---|
| 237557 | 8/1988 | Argentina . |
| 241781 | 12/1992 | Argentina . |
| 241782 A1 | 12/1992 | Argentina . |
| 0263723 A2 | 4/1988 | European Pat. Off. . |
| 263723 A2 | 4/1988 | European Pat. Off. . |
| 0290007 A1 | 11/1988 | European Pat. Off. . |
| 0340707 A2 | 11/1989 | European Pat. Off. . |
| 0340765 A2 | 11/1989 | European Pat. Off. . |

(List continued on next page.)

OTHER PUBLICATIONS

Nakano et al., Cement Compositions Suitable for Extrusion Molding of High–Strength Building Materials, Chemical Abstracts, vol. 115, p. 314 (1991).

Berger et al., Acceleration of Hydration of Calcium Silicates by Carbon Dioxide Treatment, Nature Physical Science, vol. 240 (Nov. 6, 1972).

Kline, Paper and Paperboard Properties, Paper and Paperboard Manufacturing and Converting Fundamentals, 19–28, 2nd Ed. (1982).

Yudenfreund et al., Hardened Portland Cement Pastes of Low Porosity, II, Exploratory Studies. Dimensional Changes, Cement and Concrete Research, vol. 2, pp. 331–348 (1972).

Zukoski et al., Rheology of Cementitious Systems, MRS Bulletin (Mar. 1993).

Japanese Abstract 87–351311/50, Derwent Publications, 1987.

(List continued on next page.)

*Primary Examiner*—Christopher A. Fiorilla
*Attorney, Agent, or Firm*—Workman, Nydegger & Seeley

[57] ABSTRACT

Compositions and methods for manufacturing sheets having a hydraulically settable matrix are disclosed. Suitable compositions are prepared by mixing together a hydraulic binder, water, and appropriate additives (such as aggregates, fibers, and rheology-modifying agents) which impart predetermined properties so that a sheet formed therefrom has the desired performance criteria. The compositions are formed into sheets by first extruding them into a sheet and then calendering the sheet using a set of rollers. The calendered sheets are dried in an accelerated manner to form a substantially hardened sheet. The drying is performed by heated rollers and/or a drying chamber. The hydraulically settable sheets so formed may have properties substantially similar to sheets made from presently used materials like paper, cardboard, polystyrene, or plastic. Such sheets can be rolled, pressed, scored, perforated, folded, and glued. They have especial utility in the mass production of containers, particularly food and beverage containers.

75 Claims, 15 Drawing Sheets

U.S. PATENT DOCUMENTS

| | | |
|---|---|---|
| 882,538 | 3/1908 | Sargent . |
| 1,223,834 | 4/1917 | Sanger . |
| 1,234,692 | 7/1917 | Poznanski . |
| 1,874,974 | 8/1932 | Hammenecker . |
| 1,932,150 | 10/1933 | Tada . |
| 1,954,117 | 4/1934 | Caldwell . |
| 1,965,538 | 7/1934 | Stewart . |
| 2,045,099 | 6/1936 | Pond . |
| 2,170,102 | 8/1939 | Thompson . |
| 2,205,735 | 6/1940 | Scherer, Jr. . |
| 2,307,629 | 1/1943 | MacIldowie . |
| 2,432,971 | 12/1947 | Ruthman et al. . |
| 2,496,895 | 2/1950 | Staley . |
| 2,549,507 | 4/1951 | Morgan et al. . |
| 2,629,667 | 2/1953 | Kaveler et al. . |
| 2,671,939 | 3/1954 | Everhart . |
| 2,700,615 | 1/1955 | Heijmer et al. . |
| 2,793,957 | 5/1957 | Mangold et al. . |
| 2,820,713 | 1/1958 | Wagner . |
| 2,837,435 | 6/1958 | Miller et al. . |
| 2,917,778 | 12/1959 | Lyon, Jr. et al. . |
| 2,959,489 | 11/1960 | Wagner . |
| 3,006,615 | 10/1961 | Mason, Jr. . |
| 3,027,266 | 3/1962 | Wikne . |
| 3,030,258 | 4/1962 | Wagner . |
| 3,042,578 | 7/1962 | Denning . |
| 3,149,986 | 9/1964 | Zelmanoff . |
| 3,169,877 | 2/1965 | Bartoli et al. . |
| 3,205,116 | 9/1965 | Walsh et al. . |
| 3,215,549 | 11/1965 | Ericson . |
| 3,305,613 | 2/1967 | Spence . |
| 3,306,961 | 2/1967 | Spence . |
| 3,356,779 | 12/1967 | Schulze . |
| 3,393,261 | 7/1968 | Herzig et al. . |
| 3,406,614 | 10/1968 | Martin et al. . |
| 3,432,317 | 3/1969 | Kelly et al. . |
| 3,468,993 | 9/1969 | Bierlich . |
| 3,470,005 | 9/1969 | Flachsenberg et al. . |
| 3,492,385 | 1/1970 | Simunic . |
| 3,520,707 | 7/1970 | Steinberg et al. . |
| 3,526,172 | 9/1970 | Stuart . |
| 3,558,070 | 1/1971 | Gabriels . |
| 3,579,366 | 5/1971 | Rehmar . |
| 3,683,760 | 8/1972 | Silva . |
| 3,689,294 | 9/1972 | Brannauer . |
| 3,697,366 | 10/1972 | Harlock et al. . |
| 3,753,749 | 8/1973 | Nutt . |
| 3,754,954 | 8/1973 | Gabriel et al. . |
| 3,759,729 | 9/1973 | Fahn . |
| 3,770,859 | 11/1973 | Bevan . |
| 3,773,700 | 11/1973 | Eash et al. . |
| 3,806,571 | 4/1974 | Ronnmark et al. . |
| 3,819,389 | 6/1974 | Uchikawa et al. . |
| 3,824,107 | 7/1974 | Weiant . |
| 3,827,895 | 8/1974 | Copeland . |
| 3,841,885 | 10/1974 | Jakel . |
| 3,857,715 | 12/1974 | Humphrey . |
| 3,872,204 | 3/1975 | Yano . |
| 3,902,912 | 9/1975 | Wolf . |
| 3,904,341 | 9/1975 | Putti . |
| 3,914,359 | 10/1975 | Bevan . |
| 3,917,781 | 11/1975 | Gabriel et al. . |
| 3,954,490 | 5/1976 | Cockram . |
| 3,979,217 | 9/1976 | Sutton . |
| 3,989,534 | 11/1976 | Plunguian et al. . |
| 3,998,651 | 12/1976 | Fukuwatari . |
| 4,002,482 | 1/1977 | Coenen . |
| 4,014,636 | 3/1977 | Pawelczyk . |
| 4,017,321 | 4/1977 | Reighter . |
| 4,017,324 | 4/1977 | Eggers . |
| 4,028,454 | 6/1977 | Davidovits et al. . |
| 4,040,851 | 8/1977 | Ziegler . |
| 4,046,584 | 9/1977 | Snyder et al. . |
| 4,070,199 | 1/1978 | Downing et al. . |
| 4,073,658 | 2/1978 | Ohtani et al. . |
| 4,077,809 | 3/1978 | Plunguian et al. . |
| 4,084,980 | 4/1978 | Motoki . |
| 4,086,045 | 4/1978 | Thiel . |
| 4,093,690 | 6/1978 | Murray . |
| 4,115,135 | 9/1978 | Geoman . |
| 4,117,059 | 9/1978 | Murray . |
| 4,117,060 | 9/1978 | Murray . |
| 4,132,555 | 1/1979 | Barrable . |
| 4,133,619 | 1/1979 | Wise . |
| 4,135,940 | 1/1979 | Peltier . |
| 4,157,998 | 6/1979 | Berntsson et al. . |
| 4,159,302 | 6/1979 | Greve et al. . |
| 4,185,923 | 1/1980 | Bouette et al. . |
| 4,188,231 | 2/1980 | Valore . |
| 4,190,454 | 2/1980 | Yamagisi et al. . |
| 4,202,857 | 5/1980 | Lowe . |
| 4,209,336 | 6/1980 | Previte . |
| 4,220,576 | 9/1980 | Tatard . |
| 4,225,247 | 9/1980 | Hodson . |
| 4,225,357 | 9/1980 | Hodson . |
| 4,229,225 | 10/1980 | Kraszewski et al. . |
| 4,230,502 | 10/1980 | Lustig et al. . |
| 4,233,080 | 11/1980 | Koeppel . |
| 4,233,368 | 11/1980 | Baehr et al. . |
| 4,234,344 | 11/1980 | Tinsley et al. . |
| 4,239,716 | 12/1980 | Ishida et al. . |
| 4,244,781 | 1/1981 | Heckman . |
| 4,257,710 | 3/1981 | Delcoigne et al. . |
| 4,257,814 | 3/1981 | Kellet et al. . |
| 4,261,754 | 4/1981 | Krenchel et al. . |
| 4,264,367 | 4/1981 | Schutz . |
| 4,264,368 | 4/1981 | Schutz . |
| 4,272,198 | 6/1981 | Velikov et al. . |
| 4,279,695 | 7/1981 | Winterbottom . |
| 4,299,790 | 11/1981 | Greenberg . |
| 4,305,758 | 12/1981 | Powers et al. . |
| 4,310,996 | 1/1982 | Mulvey et al. . |
| 4,313,997 | 2/1982 | Ruff et al. . |
| 4,326,891 | 4/1982 | Sadler . |
| 4,353,748 | 10/1982 | Birchall et al. . |
| 4,362,679 | 12/1982 | Malinowski . |
| 4,370,166 | 1/1983 | Powers et al. . |
| 4,373,957 | 2/1983 | Pedersen . |
| 4,377,440 | 3/1983 | Gasland . |
| 4,383,862 | 5/1983 | Dyson . |
| 4,406,703 | 9/1983 | Guthrie et al. . |
| 4,410,366 | 10/1983 | Birchall . |
| 4,415,366 | 11/1983 | Copening . |
| 4,427,610 | 1/1984 | Murray . |
| 4,428,775 | 1/1984 | Johnson et al. . |
| 4,444,593 | 4/1984 | Schutz . |
| 4,447,479 | 5/1984 | Harrison . |
| 4,462,835 | 7/1984 | Car . |
| 4,481,037 | 11/1984 | Beale et al. . |
| 4,497,662 | 2/1985 | Chisholm et al. . |
| 4,504,315 | 3/1985 | Allemann et al. . |
| 4,508,595 | 4/1985 | Gasland . |
| 4,524,828 | 6/1985 | Sabins et al. . |
| 4,529,663 | 7/1985 | Lancaster et al. . |
| 4,533,393 | 8/1985 | Neuschaeffer et al. . |
| 4,552,463 | 11/1985 | Hodson . |
| 4,562,218 | 12/1985 | Fornadel et al. . |
| 4,585,486 | 4/1986 | Fujita et al. . |
| 4,588,443 | 5/1986 | Bache ........................................ 106/97 |
| 4,613,627 | 9/1986 | Sherman et al. . |
| 4,623,150 | 11/1986 | Moehlman et al. . |
| 4,636,345 | 1/1987 | Jensen et al. . |

| | | |
|---|---|---|
| 4,637,860 | 1/1987 | Harper et al. . |
| 4,640,715 | 2/1987 | Heitzmann et al. . |
| 4,642,137 | 2/1987 | Heitzmann et al. . |
| 4,650,523 | 3/1987 | Kikuchi et al. . |
| 4,655,981 | 4/1987 | Nielsen et al. . |
| 4,707,187 | 11/1987 | Tsuda et al. . |
| 4,746,481 | 5/1988 | Schmidt . |
| 4,754,589 | 7/1988 | Leth . |
| 4,755,494 | 7/1988 | Ruben . |
| 4,772,439 | 9/1988 | Trevino-Gonzalez . |
| 4,780,180 | 10/1988 | Take et al. . |
| 4,784,693 | 11/1988 | Kirkland et al. . |
| 4,784,816 | 11/1988 | Sattler . |
| 4,786,670 | 11/1988 | Tracy et al. . |
| 4,789,244 | 12/1988 | Dunton et al. . |
| 4,797,161 | 1/1989 | Kirchmayr et al. . |
| 4,799,961 | 1/1989 | Friberg . |
| 4,836,940 | 6/1989 | Alexander . |
| 4,840,672 | 6/1989 | Baes . |
| 4,842,649 | 6/1989 | Heitzman et al. . |
| 4,872,913 | 10/1989 | Dunton et al. . |
| 4,888,059 | 12/1989 | Yamaguchi et al. . |
| 4,889,428 | 12/1989 | Hodson . |
| 4,892,589 | 1/1990 | Kirkland et al. . |
| 4,895,598 | 1/1990 | Hedberg et al. . |
| 4,912,069 | 3/1990 | Ruben . |
| 4,923,665 | 5/1990 | Andersen et al. . |
| 4,927,573 | 5/1990 | Alpár et al. . |
| 4,939,192 | 7/1990 | t'Sas . |
| 4,944,595 | 7/1990 | Hodson . |
| 4,948,429 | 8/1990 | Arfaei . |
| 4,979,992 | 12/1990 | Bache . |
| 4,985,119 | 1/1991 | Vinson et al. . |
| 4,999,056 | 3/1991 | Rasmussen . |
| 5,021,093 | 6/1991 | Beshay . |
| 5,030,282 | 7/1991 | Matsuhashi et al. . |
| 5,039,560 | 8/1991 | Durgin et al. . |
| 5,047,086 | 9/1991 | Hayakawa et al. . |
| 5,051,217 | 9/1991 | Alpár et al. . |
| 5,076,986 | 12/1991 | Delvaux . |
| 5,085,366 | 2/1992 | Durgin et al. . |
| 5,102,596 | 4/1992 | Lempfer et al. . |
| 5,106,423 | 4/1992 | Clarke . |
| 5,106,880 | 4/1992 | Miller et al. . |
| 5,108,677 | 4/1992 | Ayres . |
| 5,108,679 | 4/1992 | Rirsch et al. . |
| 5,154,771 | 10/1992 | Wada et al. ............... 106/730 |
| 5,167,894 | 12/1992 | Baumgarten . |
| 5,184,995 | 2/1993 | Kuchenbecker . |
| 5,232,496 | 8/1993 | Jennings et al. . |
| 5,269,845 | 12/1993 | Grunau et al. . |
| 5,290,355 | 3/1994 | Jakel . |
| 5,316,624 | 5/1994 | Racine . |
| 5,338,349 | 8/1994 | Farrar . |
| 5,366,549 | 11/1994 | Imaizumi . |
| 5,380,180 | 1/1995 | Lamb . |

FOREIGN PATENT DOCUMENTS

| | | |
|---|---|---|
| 0497151 A1 | 8/1992 | European Pat. Off. . |
| 2841172 | 9/1978 | Germany . |
| 3011330 | 3/1980 | Germany . |
| 47-20190 | 9/1972 | Japan . |
| 51-2729 | 1/1976 | Japan . |
| 52-44841 | 4/1977 | Japan . |
| 53-16730 | 2/1978 | Japan . |
| 54-31320 | 3/1979 | Japan . |
| 54-48821 | 4/1979 | Japan . |
| 55-37407 | 3/1980 | Japan . |
| 55-100256 | 7/1980 | Japan . |
| 56-17965 | 2/1981 | Japan . |
| 58-120555 | 7/1983 | Japan . |
| 62-36055 | 8/1985 | Japan . |
| 62-36056 | 8/1985 | Japan . |
| 60-260484 | 12/1985 | Japan . |
| 60-264375 | 12/1985 | Japan . |
| 62-253407 | 4/1986 | Japan . |
| 62-39204 | 2/1987 | Japan . |
| 62-46941 | 2/1987 | Japan . |
| 62-151304 | 7/1987 | Japan . |
| 62-253407 | 11/1987 | Japan . |
| 63-00551 | 1/1988 | Japan . |
| 63-00552 | 1/1988 | Japan . |
| 63-129079 | 1/1988 | Japan . |
| 63-123851 | 5/1988 | Japan . |
| 63-210082 | 8/1988 | Japan . |
| 63-218589 | 9/1988 | Japan . |
| 63-248759 | 10/1988 | Japan . |
| 63-310780 | 12/1988 | Japan . |
| 64-37478 | 2/1989 | Japan . |
| 2-51460 | 2/1990 | Japan . |
| 2-141484 | 5/1990 | Japan . |
| 2-190304 | 7/1990 | Japan . |
| 3-42235 | 2/1991 | Japan . |
| 3-80141 | 4/1991 | Japan . |
| 3-153551 | 7/1991 | Japan . |
| 3-184807 | 8/1991 | Japan . |
| 3-187962 | 8/1991 | Japan . |
| 3-202310 | 9/1991 | Japan . |
| 3-202313 | 9/1991 | Japan . |
| 3-208847 | 9/1991 | Japan . |
| 4-70304 | 3/1992 | Japan . |
| 4-164604 | 6/1992 | Japan . |
| 5-338008 | 12/1993 | Japan . |
| 453555 | 1/1936 | United Kingdom . |
| 490820 | 8/1938 | United Kingdom . |
| 561743 | 6/1944 | United Kingdom . |
| 2086748 | 5/1982 | United Kingdom . |
| 2192392 | 1/1988 | United Kingdom . |
| 2220934 | 1/1990 | United Kingdom . |
| WO 87/00828 | 2/1987 | WIPO . |
| WO 91/12186 | 8/1991 | WIPO . |
| WO 93/20990 | 10/1993 | WIPO . |

OTHER PUBLICATIONS

Alexanderson, Self-Smoothing Floors Based on Polymer Cement Concrete, Concrete International (Jan. 1990).

Algnesberger, The Use of Anionic Melamine Resin as a Concrete Additive, Cement Lime and Gravel (Sep. 1973).

Andersen, Control and Monitoring of Concrete Production—A Study of Particle Packing and Rheology, The Danish Academy of Technical Sciences (1990).

Andersen, Effect of Organic Superplasticizing Admixtures and Their Components on Zeta Potential and Related Properties of Cement Materials, Master of Science thesis, Pennsylvania State University (1987).

Andersen, Effects of W/C-Ratio and Dispersion on the Pore Size Distribution of Cement Paste and Concrete, Paper prepared for MRL by Per Just Anderson (Aug. 1988).

Andersen, Rheology of Cement Paste, Mortar and Concrete (Undated).

Andersen, et al., Tailoring of Cement-Bound Materials By the Use of Packing Rheological Models, American Ceramic Society (1988).

Andersen, Tailoring of Concrete Materials, R&H Annual Review (1988).

Attwood, Paperboard, in *The Wiley Encyclopedia of Packaging Technology*, 500–506 (Marilyn Bakker ed., 1986).

Ashby, Materials Selection in Engineering Design, Indian Journal of Technology, vol. 28 (Jun.–Aug. 1990).

Ashby, Overview No. 80: On the Engineering Properties of Materials, Acta Metall, vol. 3, No. 5, 1273–1293 (1989).

Bach, Cement-Based Products Processed the Plastics Way.

Bache, Densified Cement/Ultra-Fine Particle-Based Materials, Presented at the Second International Conference on Superplasticizers in Concrete, in Ottawa, Canada (Jun. 10-12, 1981).

Bailey, Flexural Strength of Cements, Nature, vol. 292, 2 (Jul. 1981).

Bajza, On The Factors Influencing the Strength of Cement Compacts, Cement and Concrete Research, vol. 2, 67-78 (1972).

Balaguru et al., Flexural Behavior of Slurry Infiltrated Fiber Concrete (SIFCON) Made Using Condensed Silica Fume.

Baum, et al., Paper, in *Kirk-Othmer Concise Encyclopedia of Chemical Technology*, 834-836 (Martin Grayson ed., 1985).

Benbow, et al., The Extrusion Mechanics of Pastes—The Influence of Paste Formulation on Extrusion Parameters, Chemical Engineering Science, vol. 42, No. 9, 2151-2162 (1987).

Berger, et al., Acceleration of Hydration of Calcium Silicates by Carbon Dioxide Treatment, Nature Physical Science, vol. 240 (Nov. 6, 1972).

Blaha, Ideas in Concrete, Concrete Products (Sep. 1992).

Brady, et al., *Materials Handbook*, 588-594 (1991).

Brown, et al., An Investigation of a High Speed Shear Mixer on Selected Pastes and Mortars, Mat. Res. Soc. Symp. Proc vol. 137 (1989).

Bukowski, et al., Reactivity and Strength Development of $CO_2$ Activated Non-Hydraulic Calcium Silicates, Cement and Concrete Research, vol. 9, 57-68 (1979).

Clauson-Kaas, Ekstrudering af Fiberbeton-delrapport (English Translation: Extrusion of Fiber Concrete-Interim Report), (1987).

Clauson-Kaas, Opsprojtet Glasfiberton i Byggeriet (1987). (See Statement of Relevance as there is no English translation).

Collepardi, et al., Combined Effect of Lignosulfate and Carbonate on Pure Portland Clinker Compounds Hydration. I. Tetracalcium Aluminoferrite Hydration, Cement and Concrete Research, vol. 10, 455-462 (1980).

Collepardi, et al., Influence of Polymerization of Sulfonated Naphthalene Condensate and its Interaction with Cement.

Davidson, et al., Water-Soluble Resins, New York: Reinhold Publishing Corp., Chapman & Hall, Ltd., London.

Devlin, et al., Waxes, in *The Wiley Encyclopedia of Packaging Technology* 697-700 (Marilyn Bakekr ed., 1986).

Dow Plastics, *Thermoforming Process Guide*.

Eriksen et al., Foam Stability Experiments on Solutions Containing Superplasticizing and Air-entraining Agents for Concrete, The Technological Institute, Department of Building Technology, Taastrup, Denmark.

Ferretti, Distributed Reinforcement Concrete Piper: An Innovative Products, MRS, 44-48 (May 1993).

Fordos, Natural or Modified Cellulose Fibres as Reinforcement in Cement Composites, Concrete Technology & Design vol. 5, Natural Fiber Reinforced Cement and Concrete (1988).

Greminger, Jr. et al., Alkyl and Hydroxyalkylalkylcellulose, Dow Chemical U.S.A., Midland, Oregon.

Hewlett, Physico-Chemical Mechanisms of Admixtures Lecture, CGLI Advanced Concrete Technology Course, Cement and Concrete Association Training Centre (1975).

Hlavac, The Technology of Ceramics, Glass Science and Technology, 4: The Technology of Glass and Ceramics, Elsevier Publishing (1983).

Hyland, F-Flute Inches Its Way Into Folding Carton Market, Paperboard Packaging, at 28-29 (May 1993).

Johansen, et al., Particle Packing and Concrete Properties, Materials Science of Concrete II, 111-147.

Jones, et al., Raw Materials Processing, Ceramics: Industrial Processing Testing, Iowa State University Press (1972).

Klieger, Studies of the Effect of Entrained Air on the Strength and Durability of Concretes Made with Various Maximum Sizes of Aggregate, Research and Development Laboratories of the Portland Cement Association (Oct. 1952).

Kline, Corrugating Operations and Raw Materials in Paper and Paperboard: Manufacturing and Converting Fundamentals, 184-195 (2d ed. 1991).

Kline, Paper and Paperboard Manufacturing and Converting Fundamentals, 19-28 (2d ed. 1982).

Knab, et al., Effects of Maximum Void Size and Aggregate Characteristics on the Strength of Mortar, Cement and Concrete Research. vol. 13, 383-390 (1983).

Knudsen, On Particule Size Distribution in Cement Hydration, Presented to the 7th International Congress on the Chemistry of Cement, Paris (1980).

Laenger, Designing an Extruder with Allowance for the Properties of Ceramic Extrusion Compounds—Part 1, cfi/Ber. DKG 67, No. 4 (1990).

Laenger, Extruderauslegung unter Berucksichtingung . . . English Translation—Designing an Extruder with Allowance for the Properties of Ceramic . . . Part 2a, cfi/Ber. DKG 68, No. 9 (1991).

Laenger, Extruderauslegung unter Berucksichtingung . . . English Translation—Designing an Extruder with Allowance for the Properties of Ceramic . . . Part 2b, cfi/Ber. DKG 68, No. 10/11 (1991).

Laenger, Extruderauslegung unter Berucksichtingung . . . English Translation—Designing an Extruder with Allowance for the Properties of Ceramic . . . Part 3, cfi/Ber. DKG 69, No. 3 (1992).

Laenger, Extruderauslegung unter Berucksichtingung . . . English Translation—Designing an Extruder with Allowance for the Properties of Ceramic . . . Part 4a, cfi/Ber. DKG 69, No. 7/8 (1992).

Laenger, Extruderauslegung unter Berucksichtingung . . . English Translation—Designing an Extruder with Allowance for the Properties of Ceramic . . . 4b, cfi/Ber. DKG 69, No. 9 (1992).

Laenger, Extruderauslegung unter Berucksichtingung . . . English Translation—Designing an Extruder with Allowance for the Properties of Ceramic . . . Part 5a, cfi/Ber. DKG 69, 10 (1992).

Laenger, Extruderauslegung unter Berucksichtingung . . . English Translation—Designing an Extruder with llowance for the Properties of Ceramic . . . Part 5b, cfi/Ber. DKG 70, No. 3 (1993).

Lawrence, The Properties of Cement Paste Compacted Under High Pressure: Research Report 19, Cement and Concrete Association Research Report 19 (Jun. 1969).

Leaversuch, Blowing Agents: Products Minimize Tradeoffs as CFC Phase-out Takes Effect, Modern Plastics (1993).

Lecznar, et al., Strength of Neat Cement Pastes Molded Under Pressure, Journal of the American Concrete Institute Concrete Briefs (Feb. 1961).

Lentz, Printing, in *The Wiley Encyclopedia of Packaging Technology*, 554-559 (Marilyn Bakker ed., 1986).

Lewis, et al., Microstructure-Property Relationships in Macro-Defect-Free Cement, MRS Bulletin (Mar. 1993).

Lewis, Sr., *Condensed Chemical Dictionary*, 870 (12th ed. 1993).

Litvan, et al., Particulate Admixture for Enhanced Freeze–Thaw Resistance of Concrete, Cement and Concrete Research, vol. 8, 53–60, Pergamon Press, Inc. (1978).

Manson, et al., Use of Polymers in Highway Concrete, National Cooperative Highway Research Program Report 190 (1978).

Maries, The Activation of Portland Cement by Carbon Dioxide.

Mass, Premixed Cement Paste, Concrete International (Nov. 1989).

Maycock, et al., Carbonation of Hydrated Calcium Silicates, Cement and Concrete Research, vol. 4, 69–76 (1974).

Miyake, et al., Sakai, Superplasticized Concrete Using Refined Lignosulfate and its Action Mechanism, Cement and Concrete Research, vol. 15 (1985).

Naaman, et al., Tensile Stress–Strain Properties of SIFCON, ACI Materials Journal (May–Jun. 1989).

Niel, Supplementary Paper II–117. The Influence of Alkali–Carbonate on the Hydration of Cement (1968).

Purton, The Effect of Sand Grading on the Calcium Silicate Brick Reaction, Cement and Concrete Research vol. 4, 13–29 (1974).

Putnam, et al., Papermaking Additives, in *Kirk–Othmer Concise Encyclopedia of Chemical Technology*, 836–837 (Martin Grayson ed., 1985).

Robinson, *Extrusion Defects*, (Undated).

Rosenberg, et al., A New Mineral Admixture for High–Strength Concrete–Proposed Mechanism for Strength Enhancement, Second International Conference on the Use of Fly Ash, Silica Fume, Slag and Natural Pozzolans in Concrete (Apr. 21–25, 1986).

Roy, New Strong Cement Materials: Chemically Bonded Ceramics, Science, vol. 235, 6 (Feb. 1987).

Roy, et al., Processing of Optimized Cements and concretes via Particle Packing, MRS Bulletin (Mar. 1993).

Roy, et al., Very High Strength Cement Pastes Prepared by Hot Pressing and Other High Pressure Techniques, Cement and Concrete Research, vol. 2, 349–366 (1972).

Satas, Coating, Equipment, in *The Wiley Encyclopedia of Packaging Technology*, 186–191 (Marilyn Bakker ed., 1986).

Shah, Recent Trends In The Science and Technology of Concrete, Trends in Science and Technology of Concrete.

Shilstone, Sr., Mix Temperature and $$$$$, Concrete Producer News (Oct. 1989).

Shilstone, Sr., Concrete Mixture Optimization by Coarseness Factor, Mortar Factor & Particle Distribution, Concrete International (Dec. 1989).

Shilstone, Sr., Mixture Optimization for Fast–Track, Report for American Concrete Institution Convention, San Diego, CA.

Sikora, Paper, *The Wiley Encyclopedia of Packaging Technology*, 497–500 (Marilyn Bakker ed., 1986).

Skalny, et al., Low Water to Cement Ratio Concretes, Cement, and Concrete Research, vol. 3, 29–40 (1973).

Skalny, et al., Properties of Cement Pastes Prepared by High Pressure Compaction, ACI Journal, Mar. (1970).

Soroushian, et al., Recycling of Wood and Paper in Cementitious Materials, Mat. Res. Soc. Sypm. Proc., vol. 266 (1992).

Stix, Concrete Solutions, Scientific American (Apr. 1993).

Strabo, et al., Cementbaserede Hybridkompositte, Teknologisk Institut, Byggeteknik, TR–Projekt 1985–133/177–85.533 (1987).

English Translation—Strabo, et al., Cement–Based Hybrid Composites, Technological Institute of Denmark, Department of Building Technology, TR–Project 1985–133/177–85.533 (1987).

Strabo, et al., Ekstrudering af Fiberbeton, Teknologisk Institut, Byggeteknik, TR–Projekt 1985–133/177–85.538 (Oct. 1987).

English Translation—Strabo, et al., Extrusion of Fiber Concrete, Danish Technological Institute, Department. of Building Technology, TR–Project 1985–133/177–85/538 (Oct. 1987).

Strabo, et al., Fiberbeton Teknologi, Teknologisk Institut, Byggeteknik, TR–Projekt 133/117–82.042 (1986).

English Translation—Strabo, et al., Fiber Concrete Technology, Technological Institute of Denmark, Department. of Building Technology, TR–Project 133/117–82.042 (1986).

Strabo, et al, Nye Formgivningsmetoder til Fiberbeton, Teknologisk Institut, Byggeteknik, TR–Projekt 1984–133/117–84.028 (Apr. 1987).

English Translation—Strabo, et al, New Design Methods for Fiber Concrete, Technological Institute of Denmark, Department of Building Technology, TR–Project 1984–133/117–84.028 (Apr. 1987).

Studt, New Advances Revive Interest In Cement–Based Materials, R&D Magazine (Nov. 1992).

Sun, et al., The Composition of Hydrated DSP Cement Pastes.

Sutherland, Air–Entrained Concrete, Cement and Concrete Association, Cement and Concrete Association (1970).

Suzuki, et al., Formation and Carbonation of C–S–H In Water, Cement and Concrete Research, vol. 15, 213–224 (1985).

Swec, Boxes, Corrugated, in *The Wiley Encyclopedia of Packaging Technology*, 66–76 (Marilyn Bakker ed., 1986).

Unwalla, et al., editors, Recycled Materials for Making Concrete, The Indian Concrete Journal, vol. 53, No. 9 (Sep. 1979).

Verbeck, Carbonation of Hydrated Portland Cement, Cement and Concrete Special Technical Publication No. 203 (1958).

Vrana, Khashoggi Kin Reported Planning Private Placement of Shares in New Container Firm, (Mar. 28, 1993).

Wagner, Polymer Modification of Portland Cement Systems, Chemtech (Feb. 1973).

Weiss, et al., High Tensile Cement Pastes as a Low–Energy Substitute for Metals, Plastics, Ceramics, and Wood. Phase 1: Preliminary Technological Evaluation, CTL Project CR7851–4330, Final Report, Prepared for U.S. Dept. of Energy (Nov. 1984).

Westman, et al., The Packing of Particles (1930).

Young, et al., Introduction to MDF Cement Composites, ACBM vol. 1, No. 2 (Fall 1989).

Young, Macro–Defect–Free Cement: A Review, Mat. Res. Soc. Symp. Proc., vol. 179 (1991).

Yudenfreund, et al., Hardened Portland Cement Pastes of Low Porosity. II. Exploratory Studies. Dimensional Changes, Cement and Concrete Research, vol. 2, 331–348 (1972).

Zukowski, et al., Rheology of Cementitious Systems, MRS Bulletin (Mar. 1993).

Cementing the Future: A New Extrusion Technology, ACBM, vol. 6, No. 1 (Spring 1994).

The Coating Process for Paper (1993).
The Colcrete Process, Undated Publication.
Doing More With Less: Optimizing Concrete Mix, Better Roads (Aug. 1990).
Fiberbeton–nyt, Teknologisk Institut, Byggeteknik, Blad nr. 1 (Oct. 1987).
English Translation—Fiber Concrete News, The Technological Institute of Denmark, Department of Building Technology, Pamphlet No. 1 (Oct. 1987).

Nye Metoder I Beton Kan Betyde Teknisk Knock–Out for Plast, Ingenioren, Saertryk fra nr. 14/86 (1986).
English Translation—New Method for Concrete May Mean Technical Knock–Out for Plastic, The Engineer, No. 14 (1986).
Plastic–Forming Processes.
Report of the Panel on Solids Processing.
Space–Age Concrete That May Sub for Steel.
Zien In The Food Industry, Freeman Industries, Inc.

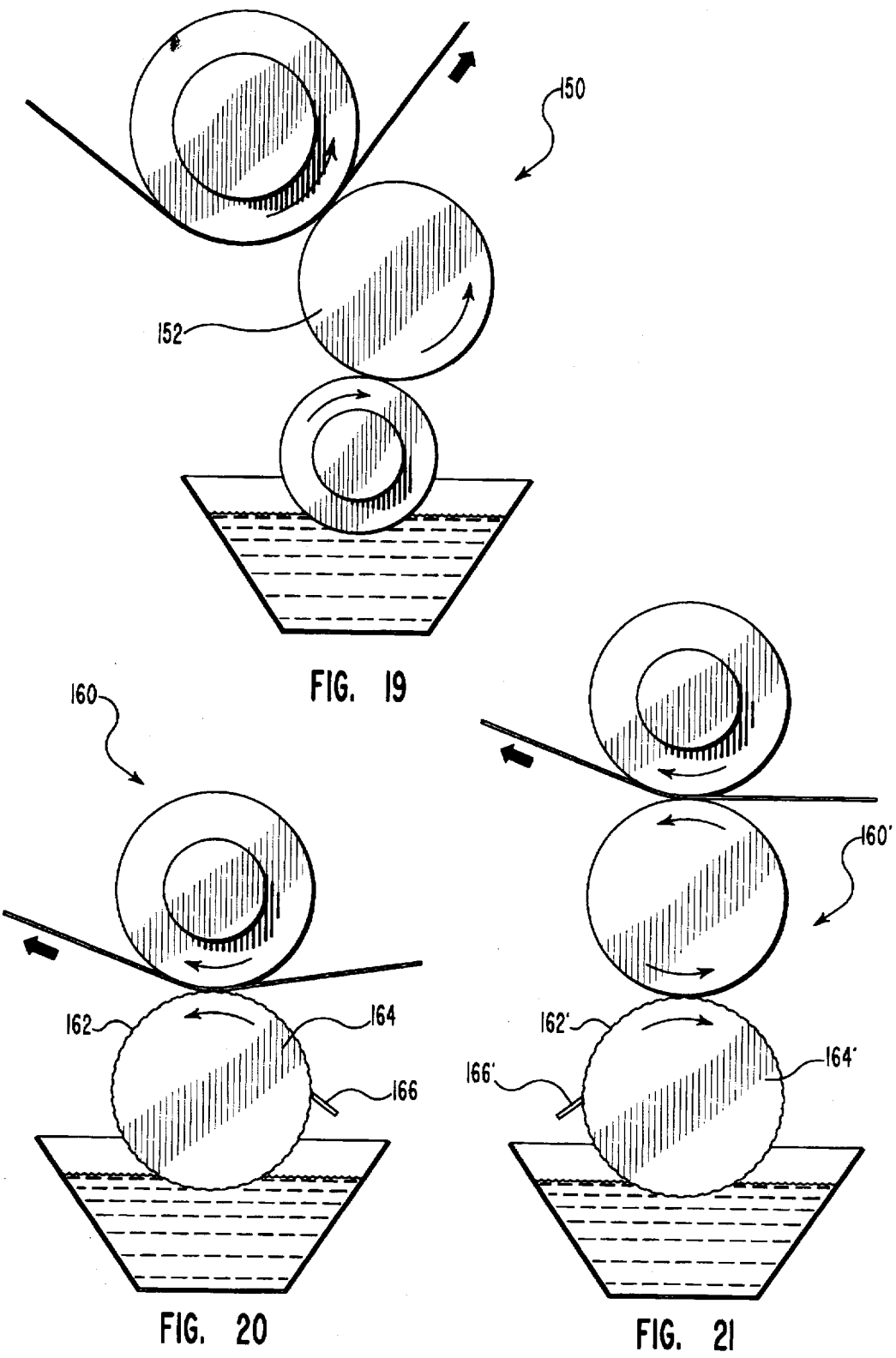

METHODS FOR MANUFACTURING SHEETS FROM HYDRAULICALLY SETTABLE COMPOSITIONS

This application is a continuation of application Ser. No. 08/101,500, entitled "Methods and Apparatus for Manufacturing Moldable Hydraulically Settable Sheets for Making Containers, Printed Materials, and Other Objects," filed Aug. 3, 1993, in the names of Per Just Anderson, Ph.D. and Simon K. Hodson (now abandoned), which is a continuation-in-part of application Ser. No. 07/929,898, entitled "Cementitious Food and Beverage Storage, Dispensing, and Packaging containers and the Methods of Manufacturing Same," filed Aug. 11, 1992, in the names of Per Just Anderson, Ph.D. and Simon K. Hodson (now abandoned), and also a continuation-in-part of application Ser. No. 08/019,151, filed Feb. 17, 1993, now U.S. Pat. No. 5,453,310, and also a continuation-in-part of application Ser. No. 08/095,662, filed Jul. 21, 1993, now U.S. Pat. No. 5,385,764.

BACKGROUND OF THE INVENTION

1. The Field of the Invention

The present invention relates to methods and apparatus for manufacturing hydraulically settable sheets used in making containers, printed materials, and other objects. More particularly, the present invention relates to methods and apparatus for readily and economically forming a hydraulically settable material into thin, flexible sheets that can be cured and then stored in a roll or flat sheets until needed, or scored and folded into the desired container, printed sheet, or other object. The hydraulically settable sheets can be used much like paper or cardboard, plastic or polystyrene, and metal materials and can be readily moldable into the desired container or object.

2. The Relevant Technology

A. Traditional Hydraulically Settable Materials.

Hydraulically settable materials such as those that contain hydraulic cement or gypsum (hereinafter "hydraulically settable," "hydraulic," or "cementitious" compositions, materials, or mixtures) have been used for thousands of years to create useful, generally large, bulky structures that are durable, strong, and relatively inexpensive. For example, cement is a hydraulically settable binder derived from clay and limestone, and it is essentially nondepletable.

Those materials containing a hydraulic cement are generally formed by mixing hydraulic cement with water and usually some type of aggregate to form a cementitious mixture, which hardens into concrete. Ideally, a freshly mixed cementitious mixture is fairly nonviscous, semi-fluid, and capable of being mixed and formed by hand. Because of its fluid nature, concrete is generally shaped by being poured into a mold, worked to eliminate large air pockets, and allowed to harden. If the surface of the concrete structure is to be exposed, such as on a concrete sidewalk, additional efforts are made to finish the surface to make it more functional and to give it the desired surface characteristics.

Due to the high level of fluidity required for typical cementitious mixtures to have adequate workability, the uses of concrete and other hydraulically settable mixtures have been limited mainly to simple shapes which are generally large, heavy, and bulky, and which require mechanical forces to retain their shape for an extended period of time until sufficient hardening of the material has occurred. Another aspect of the limitations of traditional cementitious mixtures or slurries is that they have little or no form stability and they are molded into the final form by pouring the mixture into a space having externally supported boundaries or walls.

It is precisely because of this lack of moldability (which may be the result of poor workability and/or poor form stability), coupled with the low tensile strength per unit weight, that hydraulically settable materials have traditionally been useful only for applications where size and weight are not limiting factors and where the forces or loads exerted on the concrete are generally limited to compressive forces or loads, as in, e.g., roads, foundations, sidewalks, and walls.

Moreover, hydraulically settable materials have historically been brittle, rigid, unable to be folded or bent, and having low elasticity, deflection and flexural strength. The brittle nature and lack of tensile strength (about 1–4 MPa) in concrete is ubiquitously illustrated by the fact that concrete readily cracks or fractures upon the slightest amount of shrinkage or bending, unlike other materials such as metal, paper, plastic, or ceramic. Consequently, typical hydraulically settable materials have not been suitable for making small, lightweight objects, such as containers or thin sheets, which are better if made from materials with much higher tensile and flexural strengths per unit weight compared to typical hydraulically settable materials.

More recently, higher strength hydraulically settable materials have been developed which might be capable of being formed into smaller, denser objects. One such material is known as "Macro-defect Free" or "MDF" concrete, such as is disclosed in U.S. Pat. No. 4,410,366 to Birchall et al. See also, S. J. Weiss, E. M. Gartner & S. W. Tresouthick, "High Tensile Cement Pastes as a Low Energy Substitute for Metals, Plastics, Ceramics, and Wood," U.S. Department of Energy CTL Project CR7851-4330 (Final Report, November 1984). However, such high strength cementitious materials have been prohibitively expensive and would be unsuitable for making inexpensive sheets or containers where much cheaper materials better suited for such uses (e.g., paper and plastic) are readily available. Another drawback is that MDF concrete cannot be used to mass produce small, lightweight objects due to the high amount of time and effort involved in forming and hardening the material and the fact that it is highly water soluble. Therefore, MDF concrete has been limited to expensive objects of simple shape.

Another problem with traditional, and even more recently developed high strength, concretes has been the lengthy curing times almost universally required for most concretes. Typical concrete products formed from a flowable mixture require a hardening period of 10–24 hours before the concrete is mechanically self-supporting, and upwards of a month before the concrete reaches a substantial amount of its maximum strength. Extreme care has had to be used to avoid moving the hydraulically settable articles until they have obtained sufficient strength to be demolded. Movement or demolding prior to this time has usually resulted in cracks and flaws in the hydraulically settable structural matrix. Once self-supporting, the object could be demolded, although it has not typically attained the majority of its ultimate strength until days or even weeks later.

Since the molds used in forming hydraulically settable objects are generally reused in the production of concrete products and a substantial period of time is required for even minimal curing of the concrete, it has been difficult to economically and commercially mass produce hydraulically settable objects. Although zero slump concrete has been used to produce large, bulky objects (such as molded slabs, large pipes, or bricks which are immediately self-supporting) on an economically commercial scale, such production is only useful in producing objects at a rate of a few thousand per day. Such compositions and methods cannot be used to mass produce small, thin-walled objects at a rate of thousands per hour.

Demolding a hydraulically settable object can create further problems. As concrete cures, it tends to bond to the forms unless expensive releasing agents are used. It is often necessary to wedge the forms loose to remove them. Such wedging, if not done properly and carefully each time, often results in cracking or breakage around the edges of the structure. This problem further limits the ability to make thin-walled hydraulically settable articles or shapes other than flat slabs, particularly in any type of a commercial mass production.

If the bond between the outer wall of the molded hydraulically settable article and the mold is greater than the internal cohesive or tensile strengths of the molded article, removal of the mold will likely break the relatively weak walls or other structural features of the molded article. Hence, traditional hydraulically settable objects must be large in volume, as well as extraordinarily simple in shape, in order to avoid breakage during demolding (unless expensive releasing agents and other precautions are used).

Typical processing techniques of concrete also require that it be properly consolidated after it is placed in order to ensure that no voids exist between the forms or in the structural matrix. This is usually accomplished through various methods of vibration or poking. The problem with consolidating, however, is that extensive overvibration of the concrete after it has been placed can result in segregation or bleeding of the concrete.

"Bleeding" is the migration of water to the top surface of freshly placed concrete caused by the settling of the heavier aggregate. Excessive bleeding increases the water to cement ratio near the top surface of the concrete slab, which correspondingly weakens and reduces the durability of the surface of the slab. The overworking of concrete during the finishing process not only brings an excess of water to the surface, but also fine material, thereby resulting in subsequent surface defects.

For each of the foregoing reasons, as well as numerous others which cannot be listed here, hydraulically settable materials have not generally had application outside of the formation of large, slab-like objects, such as in buildings, foundations, walk-ways, or highways, or as mortar to adhere bricks or cured concrete blocks. It is completely counterintuitive, as well as contrary to human experience, to even imagine (let alone actually experience) the manufacture from hydraulically settable materials within the scope of the present invention of small lightweight sheets and other objects such as containers, which are comparable to lightweight sheets made from paper, cardboard, plastic, or polystyrene.

Yet, due to the more recent awareness of the tremendous environmental impact (not to mention the ever mounting political pressures) of using sheets made from paper, cardboard, plastic, polystyrene, and metals for a variety of single-use, mainly disposable, items such as containers or magazines, there has been an acute need (long since recognized to those skilled in the art) to find environmentally sound substitute materials such as hydraulically settable materials for these disposable items.

In spite of such pressures and long-felt need, the technology simply has not existed for the economic and feasible production of hydraulically settable materials which could be substituted for paper, cardboard, plastic, polystyrene, or metal sheets used to make a wide variety of disposable items such as containers. However, because hydraulically settable materials essentially comprise such environmentally neutral components such as rock, sand, clay, and water, they would be ideally suited from an ecological standpoint to replace paper, cardboard, plastic, or polystyrene materials as the material of choice for such applications.

B. The Impact of Paper, Cardboard, Plastic, Polystyrene, and Metals.

A huge variety of objects such as containers, packing materials, mats, disposable utensils, reading or other printed materials, and decorative items are presently mass-produced from paper, cardboard, plastic, polystyrene, and metals. The vast majority of such items eventually wind up within our ever diminishing landfills, or worse, are scattered on the ground or dumped into bodies of water as litter. Because plastic and polystyrene are essentially nonbiodegradable, they persist within the land and water as unsightly, value diminishing, and (in some cases) toxic foreign materials. Even paper or cardboard, believed by many to be biodegradable, can persist for years, even decades, within landfills where they are shielded from air, light, and water, which are all necessary for normal biodegration activities. Metal products utilize valuable natural resources in their manufacture, and if not recycled, remain in the landfill and unusable essentially forever.

In spite of the more recent attention that has been given to reduce the use of such materials, they continue to be used because of their superior properties of strength and, especially, mass productivity. Moreover, for any given use for which they were designed, such materials are relatively inexpensive, lightweight, easy to mold, strong, durable, and resistant to degradation during the use of the object in question.

Although each of these materials may be comparably priced to any of the other materials presently available, they are usually far more expensive than typical hydraulically settable materials. Because no rational business would ignore the economic benefit which would necessarily accrue from the substitution of radically cheaper hydraulically settable materials for paper, cardboard, plastic, polystyrene, or metal materials, the failure to do so can only be explained by a marked absence of available technology to make the switch.

In the manufacture of paper, the fiber slurry has upwards of 99% water which must be removed during the paper-making process. The slurry is sprayed onto a moving sieve bed through which water is extracted by a series of suction boxes. When the fiber sheet which is formed is removed from the moving bed, the fiber sheet still comprises 80% water. The fiber sheet then passes through a series of rollers which reduces the water content to about 50%; thereafter, heat is applied to dry the fiber sheet to form the paper product. This process, which has changed little in decades, is energy intensive, time consuming, and requires a significant initial investment.

The manufacturing processes of plastic sheets or products vary, but they typically require precise control of both temperature and shear stress in order to make a usable product. In addition, the typical polystyrene or plastic manufacturing process is a high consumer of energy. Similarly, manufacturing products from metals consumes high amounts of energy because of the elevated temperatures utilized in the processes, as well as requiring high shear stresses to fashion and mold the products. Of course, the initial capital investments for manufacturing processes utilizing metals are very high.

Recently, there has been a growing debate as to which of these materials (i.e., paper, plastic or metals) is more damaging to the environment. Consciousness-raising organizations have convinced many people to substitute one material for another in order to be more environmentally "correct." The debate often misses the point that each of these materials has its own unique environmental weaknesses. To one who is not fully informed, or who may lack an adequately rigorous scientific approach, one material may appear superior to another when viewed in light of a particular environmental problem, while ignoring different, often larger, problems associated with the supposedly preferred material.

In fact, paper, cardboard, plastic, polystyrene, and metal each has its own unique environmental weaknesses. The debate should, therefore, not be directed to which of these materials is more or less harmful to the environment, but should rather be directed toward asking: Can we find an alternative material which will solve most, if not all, of the various environmental problems associated with each of these presently used materials?.

Based on the forgoing, what is needed are improved compositions and methods for manufacturing cementitious and other hydraulically settable sheets that can be formed into a variety of objects presently formed from paper, cardboard, polystyrene, plastic, or metal.

It would be a significant improvement in the art if such compositions and methods yielded hydraulically settable sheets which had properties similar to paper, cardboard, polystyrene, plastic, and metal. It would yet be a tremendous improvement in the art if such sheets could be formed into a variety of containers or other objects using the same or similar manufacturing apparatus and techniques as those presently used to form such objects from paper, cardboard, polystyrene, plastic, or metal.

It would yet be an important advancement in the art if such sheets did not result in the generation of wastes involved in the manufacture of paper, plastic, or metal materials. In addition, it would be a significant improvement in the art if such sheets, as well as containers or other objects made therefrom, were readily degradable into substances which are commonly found in the earth.

From a practical point of view, it would be a significant improvement if such materials and methods made possible the manufacture of sheets, containers, and other objects at a cost comparable or even superior to existing methods of manufacturing paper or polystyrene products. Specifically, it would be desirable to reduce the energy requirements and the initial capital investment costs for making products having the desirable characteristics of paper, plastic, and metals.

From a manufacturing perspective, it would be a significant advancement in the art of cement making to provide cementitious mixtures and methods for mass producing cementitious sheets which can rapidly be formed and substantially dried within a matter of minutes from the beginning of the manufacturing process.

Such materials and methods are disclosed and claimed herein.

SUMMARY AND OBJECTS OF THE INVENTION

The present invention relates to novel compositions and methods for the manufacture of hydraulically settable sheets having properties similar to those of paper, plastic, or thin-walled metals which can be immediately used to form a variety of objects such as food or beverage containers. Alternatively, such sheets can be rolled onto large spools or cut into sheets and stacked on a pallet much like paper or cardboard and stored until needed. Thereafter, the stacked or rolled sheets may be cut and formed into the object of choice. The sheets can be remoistened in order to introduce additional flexibility and elongation to avoid splitting or cracking while the object is formed.

The hydraulically settable sheets can be printed, coated, crimped, stamped, rolled, pressed, folded, fluted, corrugated, and glued much like paper or cardboard. In some cases, it may be advantageous during the manufacturing process to score or perforate the sheet to aid in forming a bend or hinge at a predetermined location within the sheet. The score can be pressed into the surface of the sheet anytime after it is formed; that is, the score can be pressed into the sheet while in the green state, in a semi-hardened state, or after it has become fully dried. The time and location of the placement of a score, score cut, or perforation will depend upon the desired purpose of the score and the properties of the hydraulically settable material in question.

The result is the ability to mass produce a wide variety of different products heretofore manufactured from paper, cardboard, plastic, polystyrene, or metal at a cost that is usually competitive with, and in most cases even superior to, the costs involved in using these other materials. The cost savings come not only from the reduced cost of the raw materials, but also from the manufacturing processes which requires less energy and lower initial capital investment.

Moreover, because the hydraulically settable sheets of the present invention comprise environmentally neutral components, the manufacture of such sheets impacts the environment to a much lesser extent than does the manufacture of sheets from these other materials. The hydraulically settable sheets of the present invention preferably do not require the use of high concentrations of wood pulp, petroleum products, or other natural resources as does the manufacture of containers or other objects from paper, plastic, or metals.

The major components within the hydraulically settable sheets of the present invention include mainly inorganic materials, such as a hydraulic binder, aggregates (like sand, glass, silica, perlite, vermiculite, clay, mica, and even waste concrete products), and water necessary to hydrate, or react with, the hydraulic binder.

Although certain embodiments may also include organic components, such as cellulose-based fibers and/or rheology-modifying agents, these organic components represent a much smaller fraction of the overall mass of the hydraulically settable sheets and together will make up usually less than about 30% by weight of the unhardened hydraulically settable mixture; preferably, this fraction will be less than about 15% by weight.

However, due to the versatility of the hydraulically settable mixtures used in the manufacturing processes of the present invention, a wide range of fibers, both organic and inorganic, can be used. Any abundant fiber, not just wood fiber, but preferably that which can be planted and harvested in an agribusiness setting, works well within the invention. The use of such fibrous materials would have the additional beneficial effect of preserving our dwindling forests.

In any event, fibers such as cotton, southern pine, flax, abaca, hemp, and bagasse are preferred. Because they are held together with a hydraulic binder, they do not require the intense processing used to make most paper or cardboard products. Such processes are necessary in the paper industry in order to release the lignin within the wood pulp and fray the fibers, thereby achieving a web effect between the fibers that binds the fibers together. No such intense processing is necessary in the present invention, which to a major extent preserves the strength of the fibers and allows them to be included in far lesser amounts while still deriving a high level of strength therefrom.

Unlike the manufacture of plastic or polystyrene, hydraulically settable sheets utilize little or no petroleum-based products or derivatives as starting materials. Thus, although some amount of fossil fuel is necessary to generate the energy used in manufacturing the hydraulically settable sheets, only a fraction of the petroleum used in the manufacture of polystyrene or plastic products will be consumed overall. In addition, the energy requirements of the present invention are much less than the energy requirements of paper manufacturing.

As compared to the manufacture of thin-walled metal products (such as aluminum and tin cans), the hydraulically settable sheets of the present invention do not result in the continued use of rapidly depleting natural resources. Further, the lower temperature and simplicity of processing conditions of the present invention reduce the energy costs and the initial capital investment costs.

Finally, another advantage of the hydraulically settable sheets of the present invention (as well as containers, printed materials, or other objects made therefrom) is that their disposal impacts the environment less than paper and cardboard products, and much less than plastic, polystyrene, or metal products. The hydraulically settable materials of the present invention can be readily recycled. Nevertheless, even if not recycled the hydraulically settable sheets, containers, and other objects of the present invention can be discarded and reduced to a fine granular powder which has a composition complementary to the components of the earth into which it will be placed.

This disintegration process is not dependent on biodegradation forces but will occur as a result of various forces which may be present, such as moisture and/or pressure. For example, the rheology-modifying agent will dissolve over time through exposure to water, thereby creating voids within the matrix of the material. These voids make the material easier to crush. In addition, both the rheology-modifying agent and the cellulose fibers are subject to breakdown by microorganisms.

If the hydraulically settable waste materials are discarded into a landfill, they will crumble into a fine powder under the weight of the other garbage present. If discarded onto the ground, the forces of water and wind, and even fortuitous compressive forces such as from cars running over them or people stepping on them, will cause the hydraulically settable waste materials to be reduced to a largely inorganic, harmless granular powder in a short period of time relative to the time it usually takes for the typical disposable paper or polystyrene cup to decompose under the same circumstances.

A polystyrene, plastic, or metal cup or can thrown into a lake or stream will last for decades, perhaps even centuries, while a hydraulically settable container will dissolve in a short period of time into essentially a dirt-like powder, the time of dissolution being dependent largely on the mix design of the hydraulically settable mixture used to manufacture the sheet that is formed into the container.

In general, the particular qualities of any embodiment of the present invention can be designed beforehand using a materials science and microstructural engineering approach in order to give the microstructure of the hydraulically settable structural matrix the desired properties, while at the same time remaining cognizant of the costs and other complications involved in large scale manufacturing systems. This materials science and microstructural engineering approach, instead of the traditional trial-and-error, mix-and-test approach, allows for the design of hydraulically settable materials with the desired properties of high tensile and flexural strength, low weight, low cost, and low environmental impact.

The preferred structural matrix of the sheets, containers, and other objects manufactured according to the present invention is formed from the reaction products of a cementitious or other hydraulically settable mixture. The hydraulically settable mixture will, at a minimum, contain a hydraulic binder, such as hydraulic cement or gypsum hemihydrate, and water. In order to design the desired properties into the hydraulically settable mixture and/or the cured structural matrix, a variety of other additives can be included within the hydraulic mixture, such as rheology-modifying agents, dispersants, one or more aggregate materials, fibers, air entraining agents, blowing agents (often introduced during the extrusion process), or reactive metals. The identity and quantity of any additive will depend on the desired properties or performance criteria of both the hydraulically settable mixture, as well as the final hardened sheet.

Rheology-modifying agents can be added to increase the cohesive strength, "plastic-like" behavior, and the ability of the mixture to retain its shape when molded or extruded. They act as thickeners and increase the yield stress of the hydraulically settable mixture, which is the amount of force necessary to deform the mixture. This creates higher "green strength" in the molded or extruded product. Suitable rheology-modifying agents include a variety of cellulose-, starch-, and protein-based materials (which are generally highly polar), all of which assist in bridging the individual cement particles together.

Dispersants, on the other hand, act to decrease the viscosity of the mixture by dispersing the individual hydraulic binder particles. This allows for the use of less water while maintaining adequate levels of workability. Suitable dispersants include any material which can be adsorbed onto the surface of the hydraulic binder particles and which act to disperse the particles, usually by creating a charged area on the particle surface or in the near colloid double layer.

In the case where both a rheology-modifying agent and dispersant are used, it will usually be advantageous to add the dispersant first and then the rheology-modifying agent second in order to obtain the beneficial effects of each. Otherwise, if the rheology-modifying agent is first adsorbed by the binder particles, it acts as a protective colloid, saturates the surface, and the dispersant will then be unable to be adsorbed by the particles and will not impart its beneficial effect to the hydraulically settable mixture.

It may be preferable to include one or more aggregate materials within the hydraulically settable mixture to add bulk and decrease the cost of the mixture. Aggregates often impart significant strength properties and improved workability. An example of one such aggregate is ordinary sand, which is completely environmentally safe, extremely inexpensive, and essentially inexhaustible.

In other cases, lightweight aggregates can be added to yield a lighter, and often more insulating, final product. Examples of lightweight aggregate are perlite, vermiculite, hollow glass spheres, aerogel, xerogel, and other lightweight, rock-like materials. These aggregates are likewise environmentally neutral and relatively inexpensive.

Fibers may be added to the hydraulically settable mixture to increase the tensile, flexural, and cohesive strengths of the wet sheet as well as the hardened sheet. It is the inclusion of fibers which allows the hydraulically settable sheets of the present invention to be rolled up and later scored and folded into the desired shape of a container or other object. Fibers should preferably have high tear and burst strengths (high tensile strength), examples of which include cotton, abaca, southern pine, flax, bagasse (sugar cane fiber), and hemp. Fibers with a high aspect ratio work best in imparting strength and toughness to the hydraulically settable material.

A preferred method of manufacturing hydraulically settable sheets within the scope of the present invention includes the steps of (1) mixing a hydraulic binder and water in order to form a hydraulic paste often in a high shear mixer; (2) adding other desired materials such as a rheology-modifying agent, dispersants, aggregates, and fibers to create a hydraulically settable mixture having the desired rheological as well as ultimate strength, weight, and low cost properties; (3) placing the hydraulically settable mixture into an extruder, such as an auger or piston extruder; (4) while providing a means for deairing the hydraulic mixture, extruding the mixture through an appropriate die to preferably form a flat sheet of a desired thickness or a pipe that can be unfolded into a sheet; (5) reducing the thickness of the sheet by passing it between at least one pair of rollers; and (6) drying the sheet to create a substantially hardened structural matrix.

In addition, the sheet can be optionally compacted while still in a slightly moistened condition in order to eliminate unwanted voids created from the evaporation of water from within the structural matrix, increase the fiber adhesion, reduce porosity, and/or increase surface smoothness. This is carried out by passing the sheet through one or more separate sets of compaction rollers. By carefully controlling the water content, it will be possible to ensure that the compaction rollers only compress and increase the density of the sheet without further elongating the sheet. The compaction step improves the strength of the final hardened sheet by creating a more uniform structural matrix while also leaving the sheet with a smoother finish. The optional compaction step is generally preferred in the case of thinner sheets where strength per unit of thickness should be maximized and where insulation ability is less important. Compaction is generally unnecessary for thicker sheets intended to have high insulation and/or low weight characteristics.

The sheet can also be optionally scored, score cut, or perforated while in a slightly moistened or even in the dry condition in order to create a line within the structural matrix upon which the sheet can later be bent. Optionally, the sheet could be passed through a set of corrugation rollers in order to produce a corrugated sheet and/or cardboard.

In addition, coatings can be applied to the surface of the sheet for a number of reasons, such as to make the sheet more waterproof, more flexible, or to give it a glossier surface. Coatings based upon materials such as soybean oil or methocel, either alone or in combination with polyethylene glycol, can be applied to the surface in order to permanently soften the sheet or a hinge within the sheet.

Elastomer, plastic, or paper coatings can aid in preserving the integrity of the hinge whether or not the underlying hardened structural matrix fractures upon bending at the hinge. In the case of packaging containers, it may be desirable to print the sheets or otherwise attach indicia or logos on the surface, such as by embossing or engraving the surface. The printed sheets may also be used in magazines, brochures, or other reading materials.

Finally, it may be desirable to pass the sheets between one or more pairs of finishing rollers consisting of a hard and soft roller, the hard roller leaving a glossy finish on one side while the soft roller provides friction so that the sheet can be pulled with some tension. The finishing rollers can also impart a textured or roughened finish to the sheets.

After the hydraulically settable sheet has been dried and has been optionally treated using any of the other procedures set forth above, it can either be used immediately as a sheet of paper or cardboard, or it can be stored for later use by, for example, rolling the sheet onto a spool or by cutting and stacking the sheets onto a pallet.

During the subsequent process of forming the sheet into the shape of the desired object, it will usually be advantageous to remoisten the hardened sheet in order to temporarily increase the flexibility and workability of the sheet. This is particularly true in the case where the sheet will be rolled or has been scored and is expected to make a particularly sharp bend during the container forming stage. After the sheets are rolled and/or bent into the desired configuration, it may be necessary to glue the ends or seams together using adhesive methods known to those skilled in the art. It may also be necessary in some cases to trim excess material from the final product using cutting means known in the paper or plastic arts.

It will be understood that fibers are a preferred additive which increases the strength, flexibility, ductility, and bendability of the hydraulically settable sheets. Fibers are particularly important where the sheet has been scored and is expected to bend over a larger angle. In addition, the properties imparted to the hardened sheets by the fibers can be increased by unidirectionally or bidirectionally orienting the fibers within the hydraulically settable rolled sheet. Depending on the shape of the extruder die head, the extrusion process itself will tend to orient the fibers in the "Y" (or machine) direction. The sheet thickness reduction process, during which the sheet is also elongated, further orients the fibers in the "Y" direction.

In addition, by using a pair of rollers having different orientations in the "Z" direction (or normal to the surface of the sheet), such as by using a flat roller paired with a conical roller, a percentage of the fibers can be oriented in the "X" (cross machine or width-wise) direction. In this way a sheet having bidirectionally oriented fibers can be manufactured. This is thought to occur because the conical roller can widen the sheet in the "X" direction. As a result, desired strength characteristics can be engineered into the resultant sheet.

From the forgoing, an object of the present invention is to provide improved compositions and methods for manufacturing cementitious and other hydraulically settable sheets that can be formed into a variety of objects presently formed from paper, cardboard, polystyrene, plastic, or metals.

Another object and feature of the present invention is to provide compositions and methods which yield hydraulically settable sheets which have properties similar to those of paper, cardboard, polystyrene, plastic, and metals. A further object of the present invention is to provide hydraulically settable sheets which can be formed into a variety of containers and other objects using the same or similar manufacturing apparatus and techniques as those presently used to form such objects from paper, plastic, or metals.

Yet another object and feature of the present invention is to provide compositions and methods for manufacturing hydraulically settable sheets which do not result in the generation of wastes involved in the manufacture of paper, plastic, or metal materials. Still a further object and feature is that such sheets, as well as containers, printed materials, or other objects made therefrom, are readily degradable into substances which are commonly found in the earth.

Another object of the present invention is to provide compositions and methods which make possible the manufacture of sheets, containers, and other objects at a cost comparable to and even superior to existing methods of manufacturing paper or polystyrene products.

Still another object and feature of the present invention is to provide methods of manufacture which are less energy intensive, conserve valuable natural resources, and require lower initial capital investments.

A further object of the present invention is to provide compositions which contain less water that has to be removed during the manufacturing process (as compared to paper manufacturing) in order to shorten the processing time and reduce the initial equipment capital investment.

Finally, an additional object and feature of the present invention is to provide compositions and methods for mass producing cementitious sheets which can rapidly be formed and substantially dried within a matter of minutes from the beginning of the manufacturing process.

These and other objects and features of the present invention will become more fully apparent from the following description and appended claims, or may be learned by the practice of the invention.

BRIEF DESCRIPTION OF THE DRAWINGS

In order that the manner in which the above-recited and other advantages and objects of the invention are obtained, a more particular description of the invention briefly characterized above will be rendered by reference to specific embodiments thereof which are illustrated in the appended drawings. Understanding that these drawings depict only typical embodiments of the invention and are therefore not to be considered limiting of its scope, the invention will be described with additional specificity and detail through the use of the accompanying drawings in which:

FIG. 19 is a side view of a Dahlgren coating apparatus.

FIG. 20 is a side view of a gravure coating apparatus.

FIG. 21 is a side view of an offset gravure coating apparatus.

DETAILED DESCRIPTION OF THE PREFERRED EMBODIMENTS

Figure 1:
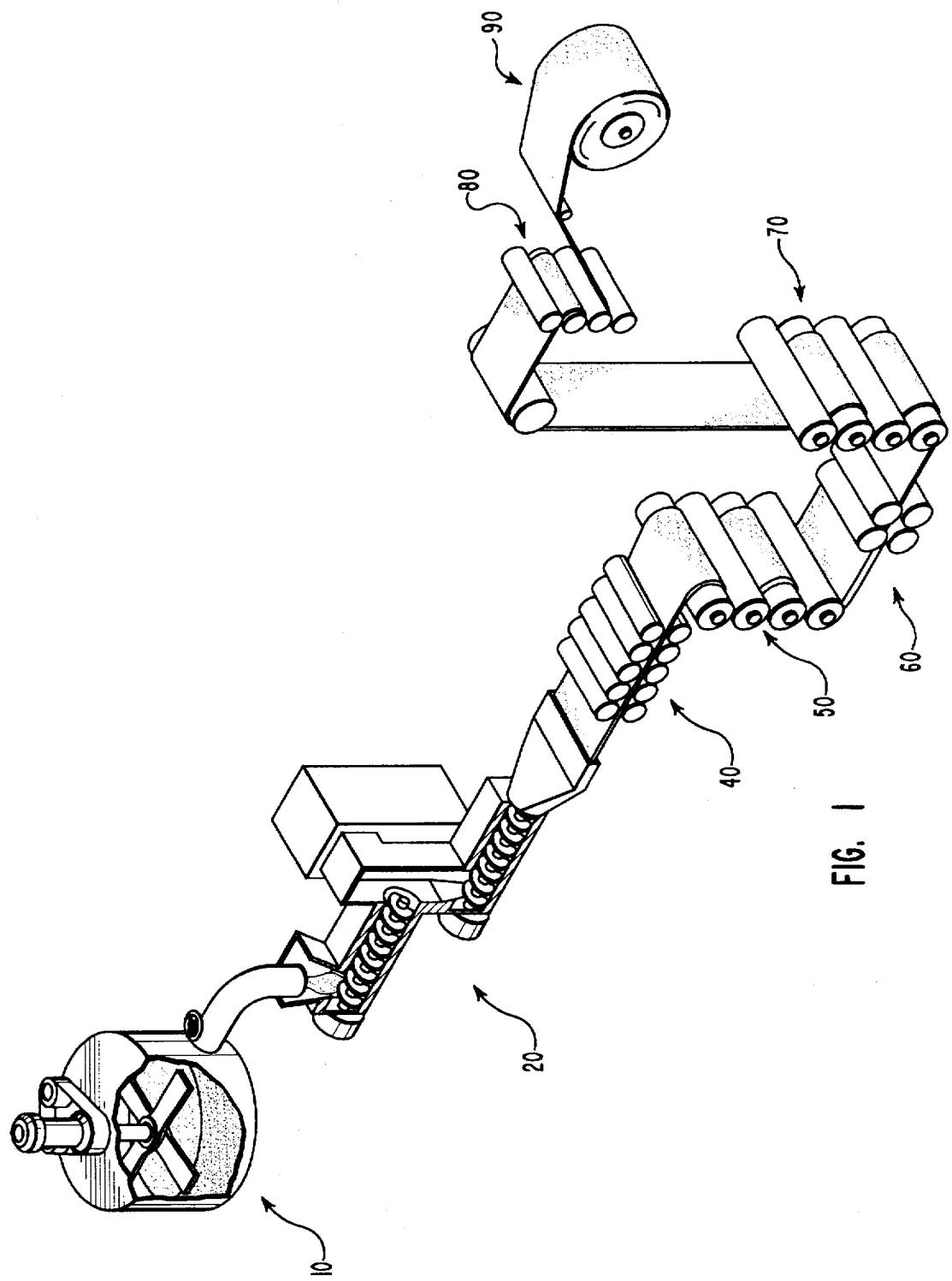
FIG. 1 is a comprehensive view of the system used to manufacture a hydraulically settable sheet, including a mixer, extruder, reduction rollers, first drying rollers, compaction rollers (optional), second drying rollers (optional), finishing rollers (optional), and spooler (optional).

The present invention utilizes novel compositions and methods used in molding a hydraulically settable mixture into sheets which can be utilized in a manner comparable to conventional paper or paperboard. Such sheets can be cut and formed (such as by rollers or folding) into a variety of containers or other objects. The compositions and methods of the present invention are particularly useful in the mass production of disposable food or beverage containers or packaging.

I. General Discussion

A. Microstructural Engineering Design.

As mentioned above, the compositions used to make the hydraulically settable sheets of the present invention have been developed from the perspective of microstructural engineering in order to build into the microstructure of the hydraulically settable matrix certain desired, predetermined properties, while at the same time remaining cognizant of costs and other manufacturing complications. Furthermore, this microstructural engineering analysis approach, in contrast to the traditional trial-and-error, mix-and-test approach, has resulted in the ability to design hydraulically settable materials with those properties of strength, weight, insulation, cost, and environmental neutrality that are necessary for appropriate sheets used to make containers and other objects in a significantly more efficient manner.

The number of different raw materials available to engineer a specific product is enormous, with estimates ranging from between fifty thousand and eighty thousand. They can be drawn from such disparately broad classes as metals, polymers, elastomers, ceramics, glasses, composites, and cements. Within a given class, there is some commonality in properties, processing, and use-patterns. Ceramics, for instance, have a high modulus of elasticity, while polymers have a low modulus; metals can be shaped by casting and forging, while composites require lay-up or special molding techniques; hydraulically settable materials, including those made from hydraulic cements historically have low flexural strength, while elastomers have high flexural strength.

However, compartmentalization of material properties has its dangers; it can lead to specialization (the metallurgist who knows nothing of ceramics) and to conservative thinking ("we use steel because that is what we have always used"). It is this specialization and conservative thinking that has limited the consideration of using hydraulically settable materials for a variety of products, such as in the manufacture of paper- or cardboard-like sheets.

Nevertheless, once it is realized that hydraulically settable materials have such a wide utility and can be designed and microstructurally engineered, then their applicability to a variety of possible products becomes obvious. Hydraulically settable materials have an additional advantage over other conventional materials in that they gain their properties under relatively gentle and nondamaging conditions. (Other materials require high energy, severe heat, or harsh chemical processing that significantly affects the material components.) Therefore, many nonhydraulically settable materials can be incorporated into hydraulically settable materials with surprising synergistic properties or results if properly designed and engineered.

The design of the compositions of the present invention has been developed and narrowed, first by primary constraints dictated by the design, and then by seeking the subset of materials which maximizes the performance of the components. At all times during the process, however, it is important to realize the necessity of designing products which can be manufactured in a cost-competitive process.

Primary constraints in materials selection are imposed by characteristics of the design of a component which are critical to a successful product. With respect to a sheet used to make a food or beverage container, those primary constraints include minimal weight, strength (both compressive and tensile), and toughness requirements, while simultaneously keeping the costs to those comparable to paper, plastic, and metal counterparts.

As discussed above, one of the problems with hydraulically settable materials in the past has been that they are typically poured into a form, worked, and then allowed to set, harden, and cure over a long period of time—even days or weeks. Experts generally agree that it takes at least one month for traditional concrete products to reach a substantial degree of their optimum strength. Even with expensive "set accelerators," this strength gain occurs over a period of days. Such time periods are certainly impractical for the economic mass production of disposable containers and similar products.

As a result, an important feature of the present invention is that when the hydraulically settable mixture is molded into a sheet, it will maintain its shape (i.e., support its own weight subject to minor forces, such as gravity and movement through the processing equipment) in the green state without external support. Further, from a manufacturing perspective, in order for production to be economical, it is important that the molded sheet rapidly (in a matter of minutes or even seconds) achieve sufficient strength so that it can be handled using ordinary manufacturing procedures, even though the hydraulically settable mixture may still be in a green state and not fully hardened.

Another advantage of the microstructural engineering and materials science approach of the present invention is the ability to develop compositions in which cross-sections of the structural matrix are more homogeneous than have been typically achieved in the prior art. Ideally, when any two given samples of about 1–2 $mm^3$ of the hydraulically settable matrix are taken, they will have substantially similar amounts of voids, aggregates, fibers, any other additives, and properties of the matrix.

In its simplest form, the process of using materials science in microstructurally engineering and designing a hydraulically settable material comprises characterizing, analyzing, and modifying (if necessary): (a) the aggregates, (b) the predicted particle packing, (c) the system rheology, and (d) the processing and energy of the manufacturing system. In characterizing the aggregates, the average particle size is determined, the natural packing density of the particles (which is a function of the actual particle sizes) is determined, and the strength of the particles is ascertained. (Unreacted hydraulic binder particles may be considered to be an aggregate.)

With this information, the particle packing can be predicted according to mathematical models. It has been established that the particle packing is a primary factor for designing desired requirements of the ultimate product, such as workability, form stability, shrinkage, bulk density, insulative capabilities, tensile, compressive, and flexural strengths, elasticity, durability, and cost optimization. The particle packing is affected not only by the particle and aggregate characterization, but also by the amount of water and its relationship to the interstitial void volume of the packed aggregates.

System rheology is a function of both macro-rheology and micro-rheology. The macro-rheology is the relationship of the solid particles with respect to each other as defined by the particle packing. The micro-rheology is a function of the lubricant fraction of the system. By modification of the lubricants (which may be water, rheology-modifying agents, plasticizers, or other materials), the viscosity and yield stress can be chemically modified. The micro-rheology can also be modified physically by changing the shape and size of the particles, e.g., the use of chopped fibers, plate-like mica, round-shaped silica fume, or crushed, angular, granular, hydrated binder particles will interact with the lubricants differently.

Finally, the manufacturing processing can be modified to manipulate the balance between workability and form stability. As applied to the present invention, this becomes important in significantly increasing the yield stress during formation of the sheet by either chemical additive (such as by adding a rheology-modifying agent) or by adding energy to the system (such as by heating the molds). Indeed, it is this discovery of how to manipulate the hydraulically settable compositions in order to quickly increase the form stability of the compositions during the formation process that make the present invention such a significant advancement in the art.

From the following discussion, it will be appreciated how each of the component materials within the hydraulically settable mixture, as well as the processing parameters, contributes to the primary design constraints of the food and beverage container so that they can be economically mass produced. Specific compositions are set forth in the examples given later in order to demonstrate how the maximization of the performance of each component accomplishes the combination of desired properties.

B. General Description of Sheet Forming Process.

Hydraulically settable products, including cementitious materials, and the methods of utilizing them have been known for millennia. The types of such cementitious or other hydraulically settable products are various and numerous, although they share the common quality of being generally large and bulky. Most hydraulically settable objects require significant size and mass in order to achieve the desired strength and other performance criteria, and they generally require relatively extended setting and curing times before they can be demolded.

The combination of high bulk and mass along with slow setting times has heretofore made it impossible to mass produce hydraulically settable sheets used to manufacture useful containers or other objects. While some relatively lightweight hydraulically settable products have been made (in very special settings in the construction industries), these products do not possess adequate tensile strength to be useful in making sheets having properties similar to those of paper, polystyrene, or other materials presently used to make containers or other products. Such prior art lightweight concretes are relatively weak, brittle, and cannot be formed into thin-walled objects having high tensile and compressive strengths, low overall mass, small size, and low cost.

Similarly, while some high strength hydraulically settable materials (such as MDF concrete) might theoretically be able to be formed into sheets, to do so would be impractical for many reasons. The first constraint is cost. MDF concrete is one of the most expensive cementitious products. Another constraint is the inability to continuously mass produce objects from MDF concrete, the molding of which requires high pressure and generally long molding times.

The underlying theory behind the present invention is the rapid, continuous, and economical formation of lightweight, inexpensive sheets from a moldable hydraulically settable mixture, which sheets can be easily handled and rapidly manipulated in a commercial manufacturing setting much like paper or cardboard. The result is the ability to mass-produce in a very cost competitive manner lightweight, thin-walled, form stable sheets, as well as containers or other objects made therefrom, having a structural matrix which includes a hydraulically settable binder such as hydraulic cement or gypsum, rather than a paper, plastic, or polystyrene structural matrix.

The present invention accomplishes this goal through a sheet and calendering process in which an appropriate hydraulically settable mixture having the desired characteristics is first extruded through a die using, for example, an auger- or piston-type extruder, into thin sheets (or similar shapes) of a predetermined thickness. A detailed description of hydraulically settable materials which can be used to manufacture food or beverage containers is set forth in detail in co-pending application Ser. No. 07/929,898 entitled "Cementitious Food and Beverage Storage, Dispensing, and Packaging Containers and the Methods of Manufacturing Same," filed Aug. 11, 1992, in the names of Per Just Andersen, Ph.D., and Simon K. Hodson now abandoned. A related continuation-in-part application Ser. No. 08/095,662 was filed Jul. 21, 1993, now U.S. Pat. No. 5,385,764 in the names of Per Just Andersen, Ph.D., and Simon K. Hodson, and entitled "Hydraulically Settable Containers And Other Articles For Storing, Dispensing, And Packaging Food And Beverages And Methods For Their Manufacture."

Similarly, a detailed description of hydraulically settable materials which can be used to manufacture general packaging and storing containers for any type of good is set forth in detail in co-pending application Ser. No. 08/019,151 now U.S. Pat. No. 5,453,310 entitled "Cementitious Materials For Use in Packaging Containers and Their Methods of Manufacture," filed Feb. 17, 1993, in the names of Per Just Andersen, Ph.D., and Simon K. Hodson. For purposes of disclosure, the foregoing applications are incorporated herein by specific reference.

Second, the extruded sheets are "calendered" by passing them between at least one pair of rollers to form sheets with reduced but more uniform thickness and a generally smoother surface. The term "calender" refers to the process of passing the hydraulically material between one or more sets of rollers in order to reduce the thickness and/or finish the surface and/or dry the surface of the resulting sheet. Because the manufacturing processes described by the present invention do not necessarily require that each of these subprocesses be performed by rollers, the term "calender" can refer to any of these subprocesses alone or in combination with either or both of the other subprocesses.

If a series of rollers are used, the roller pairs have successively narrower gaps between them in order to create a progressively thinner sheet. The extrusion process in combination with the elongation of the sheet during the calendering process tends to orient the fibers in the "Y" "machine" cross machine direction. Conically shaped rollers can be used in order to widen the sheet and also orient some of the fibers in the "X" (cross machine) direction. In this way, it is possible to obtain a sheet with bidirectionally oriented fibers.

The rollers are preferably treated in order to prevent adhesion between the sheet and the rollers. This may be accomplished by coating the rollers with a nonstick substance, polishing the rollers, heating the rollers to form a steam barrier, cooling the rollers to form a condensation barrier or a combination of these. Heating the rollers also has the often desirable effect of driving off significant amounts of excess water within the sheets.

Third, the calendered sheet is substantially or completely dried by passing it through a series of individual rollers, passing it through one or more pairs of rollers, passing the sheet through a drying tunnel, or a combination thereof. The removal of water from the sheets imparts higher green strength and form stability, while the heat used to remove the water accelerates the rate of hydration or curing of the hydraulic binder. By significantly raising the temperature, it is possible to obtain substantially full strength development within a day or two after first mixing the hydraulically settable material.

After a significant portion of the water has been removed from the formed sheet, the sheet can optionally be compressed to remove unwanted voids within the structural matrix of a semi-hardened sheet, which densifies and strengthens the sheet. This is performed by passing a semi-dried sheet through at least one pair of compaction rollers; the gap between the rollers is called a "nip." As discussed in greater detail hereafter, the moisture content of the sheets just prior to compaction should be carefully controlled in order to ensure that the sheets are compacted rather than elongated as in the reduction process.

If the sheets are compacted while in a semi-dry condition, they may then be further dried using the same methods and apparatus described above for the first drying step.

In addition, the sheet can be compacted to the final thickness and "finished" by passing the sheet through at least one pair of finishing rollers consisting of a hard and soft roller. The "hard" roller is a highly polished roller which imparts a high degree of smoothness on the side of the sheet adjacent to the hard roller. The "soft" roller is an unpolished metal roller with enough friction to pull the sheet between the finishing rollers with adequate tension (the hard roller being essentially frictionless and unable to pull the sheet through the rollers) to cause the finishing rollers to slip over and slide over the surface of the sheet to create a smoother surface. Alternatively, a clay coating can be sprayed onto the sheet so that the finishing rollers smooth the surface using the coating.

Finally, the semi-hardened or hardened sheets can then be used much like paper or cardboard to manufacture a variety of containers, printed materials, or other objects, or they can be rolled onto a spool or cut and stacked onto a pallet and stored until needed. The sheets can be scored, score cut, or perforated in order to create a fold line, then folded and/or rolled into the desired shape of the container or other object. When folding or rolling the sheet, it will often be advantageous to remoisten the sheet in order to introduce temporary increased flexibility.

The rolled and/or folded sheet in the desired shape of the container or other object can be held together using any connection means known in the art. In some cases, the ends can be folded together or inserted into specially designed slots. Alternatively, the adjacent hydraulically settable surfaces can be subjected to high pressure to form a single thickness of material, thereby sealing or bonding the surfaces together. In other cases, it may be necessary to glue the corresponding ends together using adhesion means known in the art. These include glue, adhesive strips, thermoplastic materials, or a combination thereof.

The hydraulically settable sheets, containers, or other objects can be coated with a desired coating or printed using means known in the art of paper, plastic, or polystyrene use. This can be done at any appropriate stage of the manufacturing process.

Two or more sheets may be optionally sandwiched together to create a laminate sheet. In some cases, one or more of the sandwiched sheets may have been first corrugated by passing the sheet through a set of corrugated rollers. In this case, it is often advantageous (as in ordinary cardboard) to sandwich the corrugated sheet between two substantially flat sheets in order to combine flexibility, toughness, and low bulk density within the structure as a whole.

C. Sheets, Containers, and Other Objects.

The term "sheet" as used in this specification and the appended claims is intended to include any substantially flat, corrugated, curved, bent, or textured sheet made using the methods described herein. The only essential compositional limitation is that the structural matrix of at least part of the sheet includes a hydraulically settable mixture having a hydraulic binder and water. The sheet may include other materials such as paper, organic coatings, ink, or other nonhydraulically settable materials in addition to the hydraulically settable portion.

The term "container" as used in this specification and the appended claims is intended to include any receptacle or vessel utilized for packaging, storing, dispensing, portioning or shipping various types of products or objects (including, but not limited to, food and beverage products). Examples of such containers include boxes, cups, "clam shells," jars, bottles, plates, trays, cartons, cases, crates, dishes, egg cartons, lids, straws, envelopes, or other types of holders. In addition to integrally formed hydraulically settable containers, containment products used in conjunction with containers are also intended to be included within the term "containers." Such products include, for example, lids, liners, partitions, wrappers, cushioning materials, utensils, and any other product used in packaging, storing, shipping, portioning, serving, or dispensing an object within a container.

In addition to sheets and containers, any object that can be formed using the hydraulically settable sheets described herein are also within the scope of the present invention. These include, for example, model airplanes, toys, venetian blinds, rain gutters, mailing tubes, shirt packaging forms, and temporary car window shades.

The phrases "mass producible" or manufactured in a "commercial" or "economic" manner are intended in the specification and the appended claims to refer to a capability of the sheets described herein to be rapidly produced at a rate that make their manufacture economically comparable to sheets made from other materials, such as paper, cardboard, polystyrene, or metal. The present invention is directed to innovative compositions which solve the prior art problems of incorporating hydraulically settable binders into the matrices of products which can be rapidly manufactured or formed into sheets by machine rather than by manual formation.

Food or beverage products made from these sheets are intended to be competitive in the marketplace with food or beverage containers currently made of various materials such as paper, plastic, polystyrene, or metals. Hence, the sheets and containers of the present invention must be economical to manufacture (i.e., the cost usually does not exceed a few cents per container). Such cost restraints thus require automated production of thousands of the articles in a very short period of time. Hence, requiring the products of the present invention to be economically mass-producibly manufactured is a significant limitation on the qualities of the products.

D. Hydraulically Settable Materials.

The materials used to manufacture the hydraulically settable sheets of the present invention develop strength through the chemical reaction of water and a hydraulic binder, such as hydraulic cement, calcium sulfate (or gypsum) hemihydrate, and other substances which harden after being exposed to water. The term "hydraulically settable materials" as used in this specification and the appended claims includes any material with a structural matrix and strength properties that are derived from a hardening or curing of a hydraulic binder. These include cementitious materials, plasters, and other hydraulically settable materials as defined herein. The hydraulically settable binders used in the present invention are to be distinguished from other cements or binders such as polymerizable, water insoluble organic cements, glues, or adhesives.

The terms "hydraulically settable materials," "hydraulic cement materials," or "cementitious materials," as used herein, are intended to broadly define compositions and materials that contain both a hydraulically settable binder and water, regardless of the extent of hydration or curing that has taken place. Hence, it is intended that the term "hydraulically settable materials" shall include hydraulic paste or hydraulically settable mixtures in a green (i.e., unhardened) state, as well as hardened hydraulically settable or concrete products.

1. Hydraulically Settable Binders.

The terms "hydraulically settable binder" or "hydraulic binder" as used in this specification and the appended claims are intended to include any inorganic binder such as hydraulic cement, gypsum hemihydrate, or calcium oxide which develop strength properties and hardness by chemically reacting with water and, in some cases, with carbon dioxide in the air and water. The terms "hydraulic cement" or "cement" as used in this specification and the appended claims are intended to include clinker and crushed, ground, milled, and processed clinker in various stages of pulverization and in various particle sizes.

Examples of typical hydraulic cements known in the art include: the broad family of portland cements (including ordinary portland cement without gypsum), MDF cement, DSP cement, Densit-type cements, Pyrament-type cements, calcium aluminate cements (including calcium aluminate cements without set regulators), plasters, silicate cements (including β-dicalcium silicates, tricalcium silicates, and mixtures thereof), gypsum cements, phosphate cements, high alumina cements, microfine cements, slag cements, magnesium oxychloride cements, and aggregates coated with microfine cement particles.

The term "hydraulic cement" is also intended to include other cements known in the art, such as α-dicalcium silicate, which can be made hydraulic under hydrating conditions within the scope of the present invention. The basic chemical components of, e.g., portland cement include CaO, $SiO_2$, $Al_2O_3$, $Fe_2O_3$, MgO, $SO_3$, in various combinations and proportions. These react together in the presence of water in a series of complex reactions to form insoluble calcium silicate hydrates, carbonates (from $CO_2$ in the air and added water), sulfates, and other salts or products of calcium and magnesium, together with hydrates thereof. The aluminum and iron constituents are thought to be incorporated into elaborate complexes within the above mentioned insoluble salts. The cured cement product is a complex matrix of insoluble hydrates and salts which are complexed and linked together much like stone. This material is highly inert and has both physical and chemical properties similar to those of natural stone or dirt.

Gypsum is also a hydraulically settable binder that can be hydrated to form a hardened binding agent. One hydratable form of gypsum is calcium sulfate hemihydrate, commonly known as "gypsum hemihydrate." The hydrated form of gypsum is calcium sulfate dihydrate, commonly known as "gypsum dihydrate." Calcium sulfate hemihydrate can also be mixed with calcium sulfate anhydride, commonly known as "gypsum anhydrite" or simply "anhydrite."

Although gypsum binders or other hydraulic binders such as calcium oxide are generally not as strong as hydraulic cement, high strength may not be as important as other characteristics (e.g., the rate of hardening) in some applications. In terms of cost, gypsum and calcium oxide have an advantage over hydraulic cement because they are somewhat less expensive. Moreover, in the case where the hydraulically settable material contains a relatively high percentage of weak, lighter weight aggregates (such as perlite), the aggregates will often comprise a "weak link" within the structural matrix. At some point, adding a stronger binder may be inefficient because the binder no longer contributes its higher potential strength due to a high content of weaker aggregates.

In addition, gypsum hemihydrate is known to set up or harden in a much shorter time period than traditional cements. In fact, in use with the present invention, it will harden and attain most of its ultimate strength within about thirty minutes. Hence, gypsum hemihydrate can be used alone or in combination with other hydraulically settable materials within the scope of the present invention.

Terms such as "hydrated" or "cured" hydraulically settable mixture, material, or matrix refers to a level of substantial water-catalyzed reaction which is sufficient to produce a hydraulically settable product having a substantial amount of its potential or final maximum strength. Nevertheless, hydraulically settable materials may continue to hydrate long after they have attained significant hardness and a substantial amount of their final maximum strength.

Terms such as "green" or "green state" are used in conjunction with hydraulically settable mixtures which have not achieved a substantial amount of their final strength, regardless of whether such strength is derived from artificial drying, curing, or other means. Hydraulically settable mixtures are said to be "green" or in a "green state" just prior and subsequent to being molded into the desired shape. The moment when a hydraulically settable mixture is no longer "green" or in a "green state" is not necessarily a clear-cut line of demarcation, since such mixtures generally attain a substantial amount of their total strength only gradually over time. Hydraulically settable mixtures can, of course, show an increase in "green strength" and yet still be "green." For this reason, the discussion herein often refers to the form stability of the hydraulically settable material in the green state.

As mentioned above, preferable hydraulic binders include white cement, portland cement, microfine cement, high alumina cement, slag cement, gypsum hemihydrate, and calcium oxide, mainly because of their low cost and suitability for the manufacturing processes of the present invention. This list of cements is by no means exhaustive, nor in any way is it intended to limit the types of binders which would be useful in making the hydraulically settable containers within the scope of the claims appended hereto.

The present invention may include other types of cementitious compositions such as those discussed in copending patent application Ser. No. 07/981,615, filed Nov. 25, 1992 now U.S. Pat. No. 5,358,676 in the names of Hamlin M. Jennings, Ph.D., Per Just Andersen, Ph.D. and Simon K. Hodson, and entitled "Methods of Manufacture And Use For Hydraulically Bonded Cement," which is a continuation-in-part of patent application Ser. No. 07/856,257, filed Mar. 25, 1992, now abandoned, in the names of Hamlin M. Jennings, Ph.D. and Simon K. Hodson, and entitled "Hydraulically Bonded Cement Compositions and Their Methods of Manufacture and Use" (now abandoned), which was a file wrapper continuation of patent application Ser. No. 07/526,231 (also abandoned). In these applications, powdered hydraulic cement is placed in a near net final position and compacted prior to the addition of water for hydration. For purposes of disclosing the use of such compositions, the forgoing patents applications are incorporated herein by specific reference.

Additional types of hydraulic cement compositions include those wherein carbon dioxide is mixed with hydraulic cement and water. Hydraulic cement compositions made by this method are known for their ability to more rapidly achieve green strength. This type of hydraulic cement composition is discussed in copending patent application Ser. No. 07/418,027 filed Oct. 10, 1989, now U.S. Pat. No. 5,232,496 in the names of Hamlin M. Jennings, Ph.D. and Simon K. Hodson, and entitled "Process for Producing Improved Building Material and Products Thereof," wherein water and hydraulic cement are mixed in the presence of a carbonate source selected from the group consisting of carbon dioxide, carbon monoxide, carbonate salts, and mixtures thereof. For purposes of disclosure, the forgoing patent is incorporated herein by specific reference.

In many situations, it may not be desirable for the sheet (or a container made therefrom) to be water soluble. Unfortunately, certain materials which might be desirable to incorporate into such containers dissolve in water. An important advantage of using a hydraulically settable mixture is that the resulting structural matrix is generally water insoluble (at least over the period of time during which use of the product is intended), which allows it to encapsulate the water soluble aggregates or other materials added to the hydraulically settable mixture. Hence, an otherwise water soluble component can be incorporated into the greatly insoluble hydraulically settable matrix and impart its advantageous properties and characteristics to the final product.

Nevertheless, in order to design a sheet or container product which will more readily decompose or disintegrate after it has fulfilled its intended use, it may be desirable for the sheet or container to break down in the presence of water or moisture. One of the advantages of the microstructural engineering and materials science approach as applied to the materials of the present invention is the ability to design into the hydraulically settable structural matrix the desired properties of water resistance or solubility. In order to obtain a sheet or container that readily decomposes in the presence of water, it will generally be necessary to decrease the amount of hydraulic binder within the material. Hence, the degree of water solubility or insolubility is generally related to the concentration of hydraulic binder, particularly hydraulic cement, within the hydraulically settable mixture. In most cases, adding more hydraulic binder will make the container less soluble in water.

2. Hydraulic Paste.

In each embodiment of the present invention, the hydraulic paste or cement paste is the key constituent which eventually gives the container the ability to set up and develop strength properties. The term "hydraulic paste" shall refer to a hydraulic binder which has been mixed with water. More specifically, the term "cement paste" shall refer to hydraulic cement which has been mixed with water. The terms "hydraulically settable," "hydraulic," or "cementitious" mixture shall refer to a hydraulic cement paste to which aggregates, fibers, rheology-modifying agents, dispersants, or other materials has been added, whether in the green state or after it has hardened and/or cured. The other ingredients added to the hydraulic paste serve the purpose of altering the properties of the unhardened, as well as the final hardened product, including, but not limited to, strength, shrinkage, flexibility, bulk density, insulating ability, color, porosity, surface finish, and texture.

Although the hydraulic binder is understood as the component which allows the hydraulically settable mixture to set up, to harden, and to achieve much of the strength properties of the material, certain hydraulic binders also aid in the development of better early cohesion and green strength. For example, hydraulic cement particles are known to undergo early gelating reactions with water even before it becomes hard; this can contribute to the internal cohesion of the mixture.

It is believed that aluminates, such as those more prevalent in portland grey cement (in the form of tricalcium aluminates) are responsible for a colloidal interaction between the cement particles during the earlier stages of hydration. This in turn causes a level of flocculation/gelation to occur between the cement particles. The gelating, colloidal, and flocculating affects of such binders has been shown to increase the moldability (i.e., plasticity) of hydraulically settable mixtures made therefrom.

As set forth more fully below, additives such as fibers and rheology-modifying agents can make substantial contributions to the hydraulically settable materials in terms of tensile, flexural, and compressive strengths. Nevertheless, even where high concentrations of fibers and/or rheology-modifying agents are included and contribute substantially to the tensile and flexural strengths of the hardened material, it has been shown that the hydraulic binder nevertheless continues to add substantial amounts of compressive strength to the final hardened material. In the case of hydraulic cement, it also substantially reduces the solubility of the hardened material in water.

The percentage of hydraulic binder within the overall mixture varies depending on the identity of the other added constituents. However, the hydraulic binder is preferably added in an amount ranging from between about 5% to about 90% as a percentage by weight of the wet hydraulically settable mixture. From the disclosure and examples set forth herein, it will be understood that this wide range of weights covers hydraulically settable mixtures used to manufacture foam-like or clay-like sheets and containers.

It will be appreciated from the foregoing that embodiments within the scope of the present invention will vary from a very lightweight "foam-like" product to a somewhat higher density "clay-like" product. Either foam-like or clay-like materials can readily be molded into sheets which can be handled much like paper, cardboard, plastic, or even a sheet of metal. Within these broader categories will be other variations and differences which will require varying quantities and identities of the components. The components and their relative quantities may substantially vary depending upon the specific container or other product to be made.

Generally, when making a "foam-like" sheet product, it will be preferable to include the hydraulic binder within the range from between about 10% to about 90% by weight of the wet hydraulically settable mixture, and more preferably within the range from between about 20% to about 50%.

When making a "clay-like" sheet product, it will be preferable to include the hydraulic binder within the range from between about 5% to about 90% by weight of the green hydraulically settable mixture, preferably within the range from about 8% to about 50%, and most preferably within a range from about 10% to about 30%.

Despite the foregoing, it will be appreciated that all concentrations and amounts are critically dependent upon the qualities and characteristics that are desired in the final product. For example, in a very thin-walled structure (even as thin as 0.05 mm) where strength is needed, such as in a drinking straw, it may be more economical to have a very high percentage of hydraulic binder with little or no aggregate. In such a case, it may be desirable to include a high amount of fiber to impart flexibility and toughness.

Conversely, in a product in which high amounts of air are incorporated (such as a low density, lightweight, insulating cup), there may be a greater percentage of the rheology-modifying agent, a smaller amount of cement, and larger amounts of lightweight aggregates. Such materials can literally be as light as lightweight polystyrene foam products.

The other important constituent of hydraulic paste is water. By definition, water is an essential component of the hydraulically settable materials within the scope of the present invention. The hydration reaction between hydraulic binder and water yields reaction products which give the hydraulically settable materials the ability to set up and develop strength properties.

In most applications of the present invention, it is important that the water to cement ratio be carefully controlled in order to obtain a hydraulically settable mixture which after molding, extrusion, and/or calendering is self-supporting in the green state. Nevertheless, the amount of water to be used is dependent upon a variety of factors, including the types and amounts of hydraulic binder, aggregates, fibrous materials, rheology-modifying agents, and other materials or additives within the hydraulically settable mixture, as well as the molding or forming process to be used, the specific product to be made, and its properties.

The preferred amount of added water within any given application is primarily dependent upon two key variables:

(1) the amount of water which is required to react with and hydrate the binder; (2) the amount of water required to give the hydraulically settable mixture the necessary rheological properties and workability.

In order for the green hydraulically settable mixture to have adequate workability, water must generally be included in quantities sufficient to wet each of the particular components and also to at least partially fill the interstices or voids between the particles (including, e.g., binder particles, aggregates, and fibrous materials). If water soluble additives are included, enough water must be added to dissolve or otherwise react with the additive. In some cases, such as where a dispersant is added, workability can be increased while using less water.

The amount of water must be carefully balanced so that the hydraulically settable mixture is sufficiently workable, while at the same time recognizing that lowering the water content increases both the green strength and the final strength of the hardened product. Of course, if less water is initially included within the mixture, less water must be removed in order to allow the product to harden.

The appropriate rheology to meet these needs can be defined in terms of yield stress. The yield stress of the hydraulically settable mixture will usually be in the range from between about 5 kPa to about 5,000 kPa, with the more preferred mixtures having a yield stress within a range from about 100 kPa to about 1,000 kPa, and the most preferred mixtures having a yield stress in the range from about 200 kPa to about 700 kPa. The desired level of yield stress can be (and may necessarily have to be) adjusted depending on the particular molding process being used to form the food or beverage container.

In each of the molding processes, it may be desirable to initially include a relatively high water to cement ratio in light of the fact that the excess water can be removed by heating the molded products during or shortly after the molding process. One of the important features of the present invention as compared to the manufacture of paper is that the amount of water in the initial mixture is much less; hence, the yield stress is greater for the hydraulically settable mixtures. The result is that the total amount of water that must be removed from the initial mixture to obtain a self-supporting material (i.e., a form stable material) is much less in the case of the present invention when compared to the manufacture of paper.

Nevertheless, one skilled in the art will understand that when more aggregates or other water absorbing additives are included, a higher water to hydraulically settable binder ratio is necessary in order to provide the same level of workability and available water to hydrate the hydraulically settable binder. This is because a greater aggregate concentration provides a greater volume of interparticulate interstices or voids which must be filled by the water. Porous, lightweight aggregates can also internally absorb significant amounts of water due to their high void content.

Both of the competing goals of greater workability and high green strength can be accommodated by initially adding a relatively large amount of water and then driving off much of the water as steam during the molding process, usually by the use of heated rollers or drying tunnels.

Based on the foregoing qualifications, typically hydraulically settable mixtures within the scope of the present invention will have a water to cement ratio within a range from about 0.1 to about 4, preferably about 0.3 to about 3.5, and most preferably from about 1 to about 3. The total amount of water remaining after drying the material to remove excess water will range up to about 10% by weight with respect to the dry, hardened hydraulically settable sheet or container.

It should be understood that the hydraulic binder has an internal drying effect on the hydraulically settable mixture because binder particles chemically react with water and reduce the amount of free water within the interparticulate interstices. This internal drying effect can be enhanced by including faster reacting hydraulic binders such as gypsum hemihydrate along with slower reacting hydraulic cement.

According to a preferred embodiment of the present invention, it has been found desirable that the hydraulic binder and water be mixed in a high shear mixture such as that disclosed and claimed in U.S. Pat. No. 4,225,247 entitled "Mixing and Agitating Device"; U.S. Pat. No. 4,552,463 entitled "Method and Apparatus for Producing a Colloidal Mixture"; U.S. Pat. No. 4,889,428 entitled "Rotary Mill"; U.S. Pat. No. 4,944,595 entitled "Apparatus for Producing Cement Building Materials"; and U.S. Pat. No. 5,061,319 entitled "Process for Producing Cement Building Material." For purposes of disclosure, the forgoing patents are incorporated herein by specific reference. High shear mixers within the scope of these patents are available from E. Khashoggi Industries of Santa Barbara, Calif., the assignee of the present invention.

The use of a high shear mixer results in a more homogeneous hydraulically settable mixture, which results in a product with higher strength. Furthermore, these high shear mixes can be utilized to entrain significant amounts of air into the hydraulically settable mixture to create "foam-like" products.

E. Fibers.

As used in the specifications and appended claims, the terms "fibers" and "fibrous materials" include both inorganic fibers and organic fibers. Fibers are a particular kind of aggregate which may be added to the hydraulically settable mixture to increase the cohesion, elongation ability, deflection ability, toughness, fracture energy, and flexural, tensile, and, on occasion, even compressive strengths. Fibrous materials reduce the likelihood that the hydraulically settable sheet will shatter when a strong cross-sectional force is applied.

Fibers which may be incorporated into the structural matrix are preferably naturally occurring fibers, such as cellulosic fibers extracted from hemp, cotton, plant leaves, wood or stems, or fibers made from glass, silica, ceramic, or metal. Glass fibers are preferably pretreated to be alkali resistant.

Preferred fibers of choice include glass fibers, abaca, bagasse, wood fibers (both hardwood or softwood such as southern pine), ceramic fibers (such as alumina, silica nitride, silica carbide, graphite) and cotton. Recycled paper fibers can be used, but they are somewhat less desirable because of the fiber degradation that occurs during the original paper manufacturing process, as well as in the recycling process. Any equivalent fiber, however, which imparts strength and flexibility is also within the scope of the present invention. Abaca fibers are available from Isarog Inc. in the Philippines. Glass fibers such as Cemfill® are available from Pilkington Corp in England.

The fibers used to make the hydraulically settable sheets of the present invention preferably have a high length to width ratio (or "aspect ratio") because longer, narrower fibers can impart more strength to the matrix without significantly adding bulk and mass to the mixture. The fibers should have an aspect ratio of at least about 10:1, preferably at least about 100:1, and most preferably at least about 200:1.

Preferred fibers should also have a length that is several times the diameter of the hydraulic binder particles. Fibers having a length that is at least twice the average diameter of the hydraulic binder particles will work; fibers having a length at least 10 times the average diameter of the hydraulic binder particles is preferred, with at least 100 times being more preferred, and even 1000 times being very useful.

The amount of fibers added to the hydraulically settable matrix will vary depending upon the desired properties of the final product, with strength, toughness, flexibility, and cost being the principal criteria for determining the amount of fiber to be added in any mix design. In most cases, fibers will be added in an amount within the range from about 0.2% and to about 50% by volume of the green hydraulically settable mixture, more preferably within the range from about 1% to about 30% by volume, and most preferably within the range from about 5% to about 15% by volume.

It will be appreciated, however, that the strength of the fiber is a very important feature in determining the amount of the fiber to be used. The stronger the tensile strength of the fiber, the less the amount that must be used to obtain the same level of tensile strength in the resulting product. Of course, while some fibers have a high tensile strength, other types of fibers with a lower tensile strength may be more elastic. Hence, a combination of two or more fibers may be desirable in order to obtain a resulting product that maximizes multiple characteristics, such as high tensile strength and high elasticity.

In addition, while ceramic fibers are generally far more expensive than naturally occurring or glass fibers, their use will nevertheless be economical in some cases due to their far superior tensile strength properties. Obviously the use of more expensive fibers becomes more economical as the cost restraints of hydraulically settable sheet are relaxed, such as where a comparable sheet made from a competing materials is relatively expensive.

It should be understood that the fibers used within the scope of the present invention differ from fibers typically employed in making paper or cardboard sheets, primarily in the way in which the fibers are processed. In the manufacture of paper, either a Kraft or a sulphite process is typically used to form the pulp sheet. In the Kraft process, the pulp fibers are "cooked" in a NaOH process to break up the fibers. In a sulphite process, acid is used in the fiber disintegration process.

In both of these processes, the fibers are first processed in order to release lignins locked within the fiber walls. However, in order to release the lignins from the fiber, some of the strength of the fiber is lost. Because the sulfite process is even more severe, the strength of the paper made by a sulphite process will generally have only about 70% of the strength of paper made by the Kraft process. (Hence, to the extent wood fibers are included, those processes using a Kraft process would be preferred.)

Once the wood has been made into wood pulp by either a Kraft or a sulfite process, it is further processed in a beater in order to further release lignins and hemicellulose within the fibers and also to fray the fibers. A slurry generally containing 99.5% water and 0.5% wood pulp is subjected to heavy beating in order to release enough hemicellulose and fray the fibers sufficiently to form a fibrous mixture that is essentially self-binding through an intertwining web effect between the fibers.

The fibers are essentially self-binding through a web effect of the frayed fiber ends and the adhesive ability of the released lignins and hemicellulose, as well as the hydrogen bonding between the fibers. Hence, "web physics" and hydrogen bonding govern the forces maintaining the integrity of the resultant paper product. However, the cost of such harsh treatment is that the fibers develop major flaws along the entire length of the fiber, thereby resulting in a loss of much of their tensile, tear, and burst strengths.

In contrast, the fibers within the scope of the present invention undergo no such harsh treatment from the beater and, therefore, retain most of their initial strength. This is possible because they are bound together using a hydraulic binder. Hence, matrix to fiber adhesion rather than web physics forces are chiefly responsible for maintaining the integrity of the products of the present invention.

Consequently, far less fiber may be added to the hydraulically settable mixtures of the present invention while still deriving a high level of strength from the fibers. Employing less fiber while maintaining good strength properties allows a more economically produced sheet (as compared to paper) because (1) fiber is typically far more expensive than either the hydraulic binder or the aggregates, and (2) the capital investment for the processing equipment is much less.

It should also be understood that some fibers, such as southern pine and abaca, have high tear and burst strengths, while others, such as cotton, have lower strength but greater flexibility. In the case where both flexibility and high tear and burst strength is desired, a mixture of fibers having the various properties can be added to the mixture.

F. Rheology-modifying Agents.

The inclusion of a rheology-modifying agent acts to increase the plastic or cohesive nature of the hydraulically settable mixture so that it behaves more like a moldable clay. The rheology-modifying agent tends to thicken the hydraulically settable mixture by increasing the yield stress of the mixture without greatly increasing the viscosity of the mixture. Raising the yield stress in relation to the viscosity makes the material more plastic-like and moldable, while greatly increasing the subsequent form stability or green strength.

A variety of natural and synthetic organic rheology-modifying agents may be used which have a wide range of properties, including viscosity and solubility in water. For example, where it is desirable for the sheet or container to more quickly break down into environmentally benign components, it may be preferable to use a rheology-modifying agent which is more water soluble. Conversely, in order to design a material capable of withstanding prolonged exposure to water, it may be preferable to use a rheology-modifying agent which is less soluble in water or to use a high content of the hydraulic binder with respect to the rheology-modifying agent.

The various rheology-modifying agents contemplated by the present invention can be roughly organized into the following categories: (1) polysaccharides and derivatives thereof, (2) proteins and derivatives thereof, and (3) synthetic organic materials. Polysaccharide rheology-modifying agents can be further subdivided into (a) cellulose-based materials and derivatives thereof, (b) starch based materials and derivatives thereof, and (c) other polysaccharides.

Suitable cellulose-based rheology-modifying agents include, for example, methylhydroxyethylcellulose, hydroxymethylethylcellulose, carboxymethylcellulose, methylcellulose, ethylcellulose, hydroxyethylcellulose, hydroxyethylpropylcellulose, etc. The entire range of possible permutations is enormous and cannot be listed here, but other cellulose materials which have the same or similar properties as these would also work well.

Suitable starch based materials include, for example, amylopectin, amylose, seagel, starch acetates, starch hydroxyethyl ethers, ionic starches, long-chain alkylstarches, dextrins, amine starches, phosphate starches, and dialdehyde starches.

Other natural polysaccharide based rheology-modifying agents include, for example, alginic acid, phycocolloids, agar, gum arabic, guar gum, locust bean gum, gum karaya, and gum tragacanth.

Suitable protein-based rheology-modifying agents include, for example, Zein® (a prolamine derived from corn), collagen derivatives extracted from animal connective tissue such as gelatin and glue, and casein (the principal protein in cow's milk).

Finally, suitable synthetic organic plasticizers include, for example, polyvinyl pyrrolidone, polyethylene glycol, polyvinyl alcohol, polyvinylmethyl ether, polyacrylic acids, polyacrylic acid salts, polyvinylacrylic acids, polyvinylacrylic acid salts, polyacrylimides, ethylene oxide polymers, polylactic acid, synthetic clay, and latex, which is a styrene-butadiene copolymer.

The rheology of polylactic acid is significantly modified by heat and could be used alone or in combination with any other of the foregoing rheology-modifying agents.

A currently preferred rheology-modifying agent is methylhydroxyethylcellulose, examples of which are Tylose® FL 15002 and Tylose® 4000, both of which are available from Hoechst Aktiengesellschaft of Frankfurt, Germany. Lower molecular weight rheology-modifying agents such as Tylose® 4000 can act to plasticize the mixture rather than thicken it, which helps during extrusion or rolling procedures.

More particularly, lower molecular weight rheology-modifying agents improve the internal flow of the hydraulically settable mixture during molding processes by lubricating the particles. This reduces the friction between the particles as well as between the mixture and the adjacent mold surfaces. Although a methylhydroxyethylcellulose rheology-modifying agent is preferred, almost any non-toxic rheology-modifying agent (including any listed above) which imparts the desired properties would be appropriate.

Another preferred rheology-modifying agent that can be used instead of, or in conjunction with, Tylose® is polyethylene glycol having a molecular weight of between 20,000 and 35,000. Polyethylene glycol works more as a lubricant and adds a smoother consistency to the mixture. For this reason, polyethylene glycol might be referred more precisely as a "plasticizer." In addition, it gives the molded hydraulically settable material a smoother surface. Finally, polyethylene glycol can create a coating around soluble components of the mixture and thereby render the hardened product less water soluble.

Finally, starch-based rheology-modifying agents are of particular interest within the scope of the present invention because of their comparatively low cost compared to cellulose-based rheology-modifying agents such as Tylose®. Although starches typically require heat and/or pressure in order to gelate, starches may by modified and prereacted so that they can gel at room temperature. The fact that starches, as well as many of the other rheology-modifying agents listed above, have a variety of solubilities, viscosities, and rheologies allows for the careful tailoring of the desired properties of a mix design so that it will conform to the particular manufacturing and performance criteria of a particular food or beverage container.

The rheology-modifying agent within the hydraulically settable materials of the present invention can be included in an amount up to about 50% by weight of the mixture. Generally, however, the preferable concentration is up to about 20%, with less than about 10% being more preferable.

G. Dispersants.

The term "dispersant" is used hereinafter to refer to the class of materials which can be added to reduce the viscosity and yield stress of the hydraulically settable mixture. A more detailed description of the use of dispersants may be found in the Master's Thesis of Andersen, P. J., "Effects of Organic Superplasticizing Admixtures and Their Components on Zeta Potential and Related Properties of Cement Materials" (1987). For purposes of disclosure, the above-referenced article is incorporated herein by specific reference.

Dispersants generally work by being adsorbed onto the surface of the hydraulic binder particles and/or into the near colloid double layer of the binder particles. This creates a negative charge around the surfaces of particles, causing them to repel each other. This repulsion of the particles adds "lubrication" by reducing the "friction" or attractive forces that would otherwise cause the particles to have greater interaction. Because of this, less water can be added initially while maintaining the workability of the hydraulically settable mixture.

Greatly reducing the viscosity and yield stress may be desirable where clay-like properties, cohesiveness, and/or form stability are less important. Adding a dispersant aids in keeping the hydraulically settable mixture workable even when very little water is added, particularly where there is a "deficiency" of water. Hence, adding a dispersant allows for an even greater deficiency of water, although the molded sheet may have somewhat less form stability if too much dispersant is used. Nevertheless, including less water initially will theoretically yield a stronger final cured sheet according to the Feret Equation.

Whether or not there is a deficiency of water is both a function of the stoichiometric amount of water required to hydrate the binder and the amount of water needed to occupy the interstices between the particles in the hydraulically settable mixture, including the hydraulically binder particles themselves and the particles within the aggregate material and/or fibrous material. As stated above, improved particle packing reduces the volume of the interstices between the hydraulic binder and aggregate particles and, hence, the amount of water necessary to fully hydrate the binder and maintain the workability of the hydraulically settable mixture by filling the interstitial space.

However, due to the nature of the coating mechanism of the dispersant, the order in which the dispersant is added to the mixture is often critical. If a flocculating/gelating agent such as Tylose® is added, the dispersant must be added first and the flocculating agent second. Otherwise, the dispersant will not be able to become adsorbed on the surface of the hydraulic binder particles as the Tylose® will be irreversibly adsorbed onto the surface of the particles, thereby bridging them together rather than causing them to repel each other.

A preferred dispersant is sulfonated naphthaleneformaldehyde condensate, an example of which is WRDA 19, which is available from W. R. Grace, Inc. located in Baltimore, Md. Other dispersants which would work well include sulfonated melamine-formaldehyde condensate, lignosulfonate, and acrylic acid.

The amount of added dispersant will generally range up to about 5% by weight of the hydraulic cement, more preferably within the range of between about 0.25% to about 4%, and most preferably within the range of between about 0.5% to about 2%. However, it is important not to include too much dispersant as it tends to retard the hydration reactions between, e.g., hydraulic cement and water. Adding too much dispersant can, in fact, prevent hydration, thereby destroying the binding ability of the cement paste altogether.

The dispersants contemplated within the present invention have sometimes been referred to in the concrete industry as "superplasticizers." In order to better distinguish dispersants from rheology-modifying agents, which often act as plasticizers, the term "superplasticizer" will not be used in this specification.

H. Aggregates.

Aggregates common in the concrete industry may be used in the hydraulically settable mixtures of the present invention, except that they often must be more finely ground due to the size limitations imposed by the generally thin-walled structures of the present invention. The diameter of the aggregates used will most often be less than about 25% of the smallest cross-section of the structural matrix of the sheet.

Aggregates may be added to increase the strength, decrease the cost by acting as a filler, decrease the weight, and/or increase the insulation ability of the resultant hydraulically settable materials. Aggregates are also useful for creating a smooth surface finish, particularly plate-like aggregates. Examples of useful aggregates include perlite, vermiculite, sand, gravel, rock, limestone, sandstone, glass beads, aerogels, xerogels, seagel, mica, clay, synthetic clay, alumina, silica, fly ash, silica fume, tabular alumina, kaolin, micro spheres, hollow glass spheres, porous ceramic spheres, gypsum dihydrate, calcium carbonate, calcium aluminate, cork, seeds, lightweight polymers, xonotlite (a crystalline calcium silicate gel), lightweight expanded clays, unreacted cement particles, pumice, exfoliated rock and other geologic materials. Unreacted cement particles may also be considered to be "aggregates" in the broadest sense of the term. Even discarded hydraulically settable materials, such as discarded sheets, containers, or other objects of the present invention can be employed as aggregate fillers and strengtheners.

The amount of the aggregate will vary depending upon the particular application or purpose, and can vary greatly from no added aggregate up to about 80% by weight of the green or wet hydraulically settable mixture, more preferably within the range from between about 3% to about 50% by weight, and most preferably from between about 20% to about 35% by weight of the green mixture.

Both clay and gypsum are particularly important aggregate materials because of their ready availability, extreme low cost, workability, ease of formation, and because they can also provide a degree of binding and strength if added in high enough amounts. Clay is a general term used to identify all earths that form a paste with water and harden when dried. The predominant clays include silica and alumina (used for making pottery, tiles, brick, and pipes) and kaolinite. The two kaolinitic clays are anauxite, which has the chemical formula $Al_2O_3 \cdot 3SiO_2 \cdot 2H_2O$, and montmorillonite, which has the chemical formula $Al_2O_3 \cdot 4SiO_2 \cdot H_2O$. However, clays may contain a wide variety of other substances such as iron oxide, titanium oxide, calcium oxide, zirconium oxide, and pyrite.

In addition, although clays have been used for millennia and can obtain hardness even without being fired, such unfired clays are vulnerable to water degradation and exposure, are extremely brittle, and have low strength. Nevertheless, clay makes a good, inexpensive aggregate within the hydraulically settable structural matrix. In fact, clay may even contribute a degree of binding to the hydraulically settable mixture if included in large enough amounts.

Similarly, gypsum hemihydrate is also hydratable and forms the dihydrate of calcium sulfate in the presence of water. Thus, gypsum may exhibit the characteristics of both an aggregate and a binder depending on whether (and the concentration of) the hemihydrate or dihydrate form is added to a hydraulically settable mixture.

It is often preferable according to the present invention to include a plurality of differently sized and graded aggregates capable of more completely filling the interstices between the aggregate and hydraulic binder particles. Optimizing the particle packing density reduces the amount of water necessary to obtain adequate workability by eliminating spaces which would otherwise be filled with interstitial water, often referred to as "capillary water." In addition, using less water increases the strength of the final hardened product (according to the Feret Equation).

In order to optimize the packing density, differently sized aggregates with particle sizes ranging from as small as about 0.5 microns to as large as about 2 mm may be used. (Of course, the desired purpose and thickness of the resulting product will dictate the appropriate particle sizes of the various aggregates to be used.)

In certain preferred embodiments of the present invention, it may be desirable to maximize the amount of the aggregates within the hydraulically settable mixture in order to maximize the properties and characteristics of the aggregates (such as qualities of strength, low density, or high insulation). The use of particle packing techniques may be employed within the hydraulically settable material in order to maximize the amount of the aggregates.

A detailed discussion of particle packing can be found in the following article coauthored by one of the inventors of the present invention: Johansen, V. & Andersen, P. J., "Particle Packing and Concrete Properties," *Materials Science of Concrete II* at 111-147, The American Ceramic Society (1991). Further information is available in the Doctoral Dissertation of Andersen, P. J. "Control and Monitoring of Concrete Production—A Study of Particle Packing and Rheology," The Danish Academy of Technical Sciences. For purposes of teaching particle packing techniques, the disclosures of the foregoing article and thesis are incorporated herein by specific reference.

In embodiments in which it is desirable to obtain a food or beverage container with high insulation capability, it may be preferable to incorporate into the hydraulically settable matrix a lightweight aggregate which has a low thermal conductivity, or "k-factor" (defined as W/m.K), which is roughly the reciprocal of the expression commonly used in the United States for thermal resistance, or "R-factor," which is generally defined as having units of hr-ft$^2$°F./BTU. The term "R-factor" is most commonly used in the United States to describe the overall thermal resistance of a given material without regard to the thickness of the material. However, for purposes of comparison, it is common to normalize the R-factor to describe thermal resistance per inch of thickness of the material in question, or hr-ft$^2$°F./BTU-in.

For purposes of this application, the insulation ability of a given material will hereinafter be expressed only in terms of the IUPAC method of describing thermal conductivity, or k-factor. The conversion of thermal resistance expressed in British units (hr-ft$^2$°F./BTU-in) to IUPAC units can be performed by multiplying the normalized R-factor by 6.9335 and then taking the reciprocal of the product. Generally, aggregates having a very low k-factor also contain large amounts of trapped interstitial space or air, which also tends to greatly reduce the strength of such aggregates. Therefore, concerns for insulation and strength tend to compete and should be carefully balanced when designing a particular mix design.

I. Air Voids.

Where insulation, not strength, is the overriding factor, it may be desirable to incorporate tiny air voids within the hydraulically settable structural matrix. Air voids can be introduced by adding an air entraining agent and mixing the hydraulically settable mixture in a high speed mixer, such as those discussed above. Suitable entrainment agents include commonly used surfactants. One currently preferred surfactant is a polypeptide alkylene polyol (Mearlcrete® Foam Liquid).

In conjunction with the surfactant, it will be necessary to stabilize the entrained air within the material using a stabilizing agent like Mearlcel 3532®, a synthetic liquid anionic biodegradable solution. Both Mearlcrete® and Mearlcel® are available from the Mearl Corporation in New Jersey. Another foaming and air-entraining agent is vinsol resin. In addition, the rheology-modifying agent can act to stabilize the entrained air. Different air-entraining agents and stabilizing agents impart different degrees of foam stability to the hydraulically settable mixture, and they should be chosen in order to impart the properties that are best suited for a particular manufacturing process.

During the entrainment of air, the atmosphere above the high speed mixer can be saturated with a gas such as carbon dioxide, which has been found to cause an early false setting and create form and foam stability of the hydraulically settable mixture. The early false setting and foam stability is thought to result from the reaction of $CO_2$ and hydroxide ions within the hydraulically settable mixture to form carbonate ions, which in turn can form insoluble precipitates with calcium and other cations within the mixture.

Foam stability helps maintain the dispersion, and prevents the agglomeration, of the air voids within the uncured hydraulically settable mixture. Failure to prevent the coalescence of the air voids actually decreases the insulation effect, while greatly decreasing the strength, of the cured hydraulically settable mixture. Raising the pH, increasing the concentration of soluble alkali metals such as sodium or potassium, adding a stabilizing agent such as a polysaccharide rheology-modifying agent, and carefully adjusting the concentrations of surfactant and water within the hydraulically settable mixture all help to increase the foam stability of the mixture.

Air voids may alternatively be introduced into the hydraulically settable mixture by adding an easily oxidized metal, such as aluminum, magnesium, zinc, or tin into a hydraulic mixture that is either naturally alkaline, such as a cementitious or calcium oxide containing mixture, or one that has been made alkaline, such as those containing gypsum or another lower alkaline hydraulic binder. This reaction results in the evolution of tiny hydrogen bubbles throughout the hydraulically settable mixture. Adding a base such as sodium hydroxide to, and/or heating, the hydraulically settable mixture increases the rate of hydrogen bubble generation.

Finally, air voids can be introduced into the hydraulically settable mixture during the molding process by adding a blowing agent to the mixture, which will expand when heat is added to the mixture. Blowing agents typically consist of a low boiling point liquid and finely divided calcium carbonate (talc). The talc and blowing agent are uniformly mixed into the hydraulically settable mixture. The liquid blowing agent penetrates into the pores of the individual talc particles, which act as points from which the blowing agent can then be atomized upon thermal expansion of the blowing agent.

During the molding or extrusion process, the mixture is heated while at same time it is compressed. While the heat would normally cause the blowing agent to vaporize, the increase in pressure temporarily prevents the agent from vaporizing, thereby temporarily creating an equilibrium. When the pressure is released after the molding or extrusion of the material the blowing agent vaporizes, thereby expanding or "blowing" the hydraulically settable material. The hydraulically settable material eventually hardens with very finely dispersed voids throughout the structural matrix. Water can also act as a blowing agent as long as the mixture is heated above the boiling point of water and kept under pressure.

Air voids increase the insulative properties of the insulation barriers and also greatly decrease the bulk specific gravity, and hence the weight, of the final product. This reduces the overall mass of the resultant product, which reduces the amount of material that is required for the manufacture of the containers and which reduces the mass of material that will eventually be discarded in the case of disposable containers.

J. Set Accelerators.

In some cases it may be desirable to accelerate the initial set of the hydraulically settable mixture by adding to the mixture an appropriate set accelerator. These include $Na_2CO_3$, $KCO_3$, $KOH$, $NaOH$, $CaCl_2$, $CO_2$, triethanolamine, aluminates, and the inorganic alkali salts of strong acids, such as $HCl$, $HNO_3$, and $H_2SO_4$. In fact, any compound which increases the solubility of gypsum and $Ca(OH)_2$ will tend to accelerate the initial set of hydraulically settable mixtures, particularly cementitious mixtures.

The amount of set accelerator which may be added to a particular hydraulically settable mixture will depend upon the degree of set acceleration that is desired. This in turn will depend on a variety of factors, including the mix design, the time interval between the steps of mixing the components and molding or extruding the hydraulically settable mixture, the temperature of the mixture, and the identity of the set accelerator. One of ordinary skill in the art will be able to adjust the amount of added set accelerator according to the parameters of a particular manufacturing process in order to optimize the setting time of the hydraulically settable mixture.

K. Coatings.

It is within the scope of the present invention to coat the hydraulically settable sheets (and containers made therefrom) with sealing materials and other protective coatings. One such coating is calcium carbonate, which also allows the printing of indicia on the surface of the sheets or containers. Other coatings which might be appropriate include melamine, polyvinyl chloride, polyvinyl alcohol, polyvinyl acetate, polyacrylate, hydroxypropylmethylcellulose, polyethylene glycol, acrylics, polyurethane, polyethylene, synthetic polymers, polylactic acid, Biopol® (a polyhydroxybutyrate-hydroxyvalerate copolymer), waxes (such as beeswax or petroleum based wax), elastomers, kaolin clay, polyacrylates, and synthetic polymers including biodegradable polymers. Biopol® is manufactured by ICI in the United Kingdom.

In some cases, it may be preferable for the coating to be elastomeric, deformable, or waterproof. Some coatings may also be used to strengthen places where the hydraulically settable sheets are more severely bent, such as where the sheet has been scored. In such cases, a pliable, possibly elastomeric, coating may be preferred. Besides these coatings, any appropriate coating material would work depending on the application involved.

For example, a coating comprised of sodium silicate, which is acid resistant, is a particularly useful coating.

Resistance to acidity is important, for example, where the container is exposed to foods or drinks having a high acid content, such as soft drinks or juices. Where it is desirable to protect the container from basic substances, the containers can be coated with an appropriate polymer or wax, such as are used to coat paper containers. If the sheets are used to manufacture containers or other products intended to come into contact with foodstuffs the coating material will preferably comprise an FDA-approved coating.

The coatings may be applied to the sheets using any coating means known in the art of paper or cardboard making. Coatings may be applied by spraying the sheet, container, or other object with any of the above-referenced coating materials, or it may be advantageous to apply the coating by dipping the sheet, container, or other object into a vat containing an appropriate coating material. In the case where a coating material is sprayed onto the surface of a sheet, the coating material may be spread or smoothed by means of a doctor blade which is held a particular distance above the sheet, or which rides directly on the sheet surface.

In addition, coatings may be coextruded along with the sheet in order to integrate the coating process with the extrusion process. In other cases, the coating can be applied to the surface of the sheet by means of a gravure roller, often in conjunction with a doctor blade in order to smooth or adjust the thickness of the coating.

II. Manufacturing Sheets From Hydraulically Settable Mixtures

A comprehensive production sequence of the present invention is set forth in FIG. 1, including apparatus for carrying out the following manufacturing steps: (1) mixing the hydraulically settable mixture; (2) extruding the mixture into a flat sheet, pipe, or other object through an appropriate extruder die; (3) calendering the extruded sheet by passing it through a series of paired rollers in order to reduce the thickness and improve the surface qualities of the sheet; (4) at least partially drying the sheet by rolling it onto one or more drying rollers (e.g., "Yankee" rollers); (5) optionally compacting the sheet while in a slightly moist condition in order to eliminate unwanted spaces within the structural matrix of the sheet and to increase the density and resulting strength of the sheet; (6) optionally drying the sheet after it has been compacted; (7) optionally finishing the sheet by passing it between one or more pairs of rollers, including one hard and one soft roller; and (8) optionally rolling the substantially hardened and dried sheet onto a spool to form a roll which can be stored and used when needed.

In the case where the hydraulic mixture is extruded into any object other than a sheet, it will often be necessary to "open up" the object into a sheet (such as continuously cutting a pipe to form a sheet). If another shape is extruded, other procedures (such as the use of additional rolling processes) may need to be employed. However, the same principles described herein would apply to other extruded shapes. Each of these manufacturing steps is set forth more fully hereinbelow.

A. Preparing The Hydraulically Settable Mixture.

The first step in the manufacture of sheets involves the formation of a suitable hydraulically settable mixture having the desired workability, green strength, and final properties after hardening. Using a microstructural engineering approach, one skilled in the art can select the components, as well as their relative concentrations, in order to obtain a hydraulically settable mixture having the desired properties.

Some of the properties considered to be generally desirable with regard to the hydraulically settable mixture are adequate workability, plastic-like qualities, and green strength for a given extrusion, rolling, and/or molding process. As set forth above, the level of water, rheology-modifying agent, and (optionally) dispersant will determine the level of workability and extrudability of the mixture, as will the other components within the mixture, such as aggregates, fibers, set accelerators, etc. Based on the teachings of the copending applications incorporated herein by references, one skilled in the art will be able to adjust the identities and amounts of the various components in order to optimize the workability, plastic-like behavior, and green strength necessary to carry out any particular sheet forming process.

With regard to the final cured or hardened product, some of the properties considered generally desirable to design into the structural matrix of the sheet include high tensile strength (in general or along particular vectors), flexural strength, flexibility, and ability to elongate, deflect or bend. In some cases, it may be desirable to obtain sheets which substantially incorporate the properties of existing paper or cardboard products. However, in other cases it may be desirable to obtain a structural matrix having properties not obtainable using ordinary wood pulp or other traditional paper-making starting materials. These may include increased toughness, higher modulus, water resistance, or lower bulk density.

The flexibility, tensile strength, flexural strength, or modulus can be tailored to the particular performance criteria of the sheet, container, or other object in question by adjusting the components and relative concentrations of the components within the hydraulically settable mixture. In some cases, higher tensile strength may be an important feature. In others, it may be less significant. Some sheets should preferably be more flexible, while others will be stiff. The important thing is to achieve a material which has properties adequate for a particular use, while remaining cognizant of cost and other practical production line parameters. While having "too much" or "too little" of a particular property may be inconsequential from the standpoint of performance, from a cost standpoint it may be wasteful or inefficient to provide for the particular property.

The hydraulically settable sheets formed using the compositions described above will preferably have a tensile strength within the range from about 0.05 MPa to about 70 MPa, and more preferably within the range from about 5 MPa to about 25 MPa. In addition, the sheets will preferably have a bulk density within the range from about 0.1 g/cm$^3$ to about 2 g/cm$^3$. Whether a sheet will have a density at the lower, intermediate, or higher end of this range will generally depend on the desired performance criteria for a given usage. Finally, the hydraulically settable sheets of the present invention will preferably have a tensile strength to bulk density ratio within the range from between about 2 MPa-cm$^3$/g to about 70 MPa-cm$^3$/g, and more preferably within the range from between about 3 MPa-cm$^3$/g to about 25 MPa-cm$^3$/g.

The term "elongate" as used in the specification and appended claims with regard to the hydraulically settable sheet means that the structural matrix of the sheet is capable of being stretched without rupturing and still have a finished surface. In other words, the structural matrix of the sheet is capable of moving or changing shape without rupture by application of a force such as pulling or stretching. The ability of the structural matrix of the sheet to elongate before rupture is measured by an Instron tensile test and a stress strain test.

By optimizing the mix design, it is possible to manufacture a sheet which has a structural matrix capable of elongating up to about 20% in the fresh sheet before tearing or rupturing occurs and from about 0.5% to 8% in the dry sheet. This is usually accomplished by optimizing the amount of fiber and/or rheology-modifying agent within the hydraulically settable mixture. Producing a sheet which has a structural matrix capable of elongating within the specified range can be accomplished by including fibers within the hydraulic mixture in an amount up to about 50% by volume of the hydraulically settable mixture. The greater the amount of fibers or rheology-modifying agent added, the more elongation that can generally be achieved without rupture to the sheet. In addition, the elongation of a dry sheet can be increased by adding steam or moisture to the sheet in the order of up to 10% by weight of the dry weight of the sheet. However, this remoistening reduces the ultimate strength of the sheet.

Rheology-modifying agents added to mixtures having fibrous materials can be added in an amount of up to about 50% by weight of the hydraulically settable mixture, and more preferably within a range from about 0.1% to about 10% by weight of the green hydraulically settable mixture. In an alternative embodiment where fibers are not included, the rheology-modifying agent will be included in an amount within the range from about 0.5% to about 5% by weight of the hydraulically settable mixture.

It should be understood that higher tensile strength, as well as greater elongation, will generally be obtained by increasing the amount of fibers within the structural matrix. This can be accomplished by adding more fibers to the hydraulically settable mixture or, alternatively, by attaching a layer of fibers (such as a sheet of paper) on the surface or within the interior of a hydraulically settable sheet.

The term "deflect" as used in the specification and appended claims with regard to the hydraulically settable sheet means that the sheet has a structural matrix capable of bending and rolling without rupture and still have a finished surface. The ability of the sheet to deflect is measured by measuring the elasticity modulus and the fracture energy of the sheet using means known in the art. As with any material, the bending ability of a sheet manufactured according to the present invention is largely dependant upon the thickness of the sheet.

One way to measure deflection without regard to sheet thickness is to define deflection as the relative elongation of one side of the sheet compared to the other side of the sheet. As a sheet is rolled or bent around an axis, the length of the outer side of the sheet will elongate, while the inner side of sheet generally will not. Consequently, a thinner sheet can be bent a far greater degree even though the relative elongation of the outer side compared to the elongation of the inner side is about the same as in a thicker sheet which cannot bend nearly as far. As a general rule, the degree of elongation of an outer side before fracture is independent of the thickness of the sheet although properties of bendability would be expected to increase as the thickness of the sheet decreases and approaches the thickness of the individual fibers within the structural matrix of the sheet.

As a general rule, sheets within the scope of the present invention can be made which will have a structural matrix capable so that one side can elongate with respect to the other side of the sheet. This ability of the sheet to deflect is related to the sheet's ability to elongate; consequently, the optimal mix designs for achieving the desired deflection range are similar to the mix designs for achieving the desired level of elongation. Nevertheless, during the process of forming the sheet into an appropriate food or beverage container or other object the bendability of the sheet can be temporarily increased by remoistening the sheet. The water is believed to be absorbed by the fibers, rheology-modifying agent, and the interstices between the cement and aggregate particles. Upon drying the formed sheet, the level of bendability will generally decrease while the toughness and hardness of the sheet will generally increase.

In order to obtain a sheet having the desired properties of strength, bendability, insulation, toughness, weight, or other performance criteria, the thickness of the sheet can be altered by adjusting the space between the rollers, as set forth more fully below. Depending on the thickness and desired performance criteria, the components and their relative concentrations can be adjusted in order to accommodate a particular sheet thickness. The sheets of the present invention may be designed to have a thickness of a very wide range; however, most products using a thin-walled material will generally have a thickness in the range from to about 0.01 mm to about 3 mm.

The preferred thickness of the sheets of the present invention will vary depending on the intended use of the hydraulically settable sheet, container, or object to be made. As a matter of example only, where high deflectability is desired, a thinner sheet will generally be preferred. Conversely, where strength, durability, and/or insulation and not deflectability are the overriding concerns, a thicker sheet will generally be preferred. Nevertheless, where it is desired to bend the sheets along a score, or at least roll them into containers, the hydraulically settable sheets will preferably have a thickness within the range from about 0.05 mm to about 2 mm, and more preferably within the range from about 0.2 mm to about 1 mm.

Where a sheet is be used to print magazines or other reading material it will have a thickness that is comparable to conventional paper products, which typically have a thickness of about 0.05 mm. Printable sheets having greater flexibility and lower stiffness will typically have a thickness of about 0.025–0.075 mm, while those requiring greater strength, stiffness, and lower flexibility will have a thickness of about 0.75–2 mm. The thickness and flexibility of any particular sheet will depend on the desired performance criteria of the reading or other printed material in question.

Another aspect of the present invention is the ability of the extruded and calendered material to have high green strength. This can be achieved by adding a rheology-modifying agent such as a polysaccharide- or protein-based material in order to increase the yield stress of the hydraulically settable mixture. A preferred polysaccharide additive is Tylose®, which is a commercial embodiment of methylhydroxyethylcellulose. Tylose® also creates a more plastic-like, workable material, which is believed to involve the bridging of the individual hydraulic binder particles by the Tylose®, which is adsorbed onto the surfaces of the particles.

Although it is preferable that the molded product have a relatively low water to cement ratio, in the initial mixing stage of the hydraulically settable mixture it is possible, and often desirable, to have a relatively high water to cement ratio, often as high as 4:1. This is because in the preferred method of molding the sheet, which is discussed more fully below, the hydraulically settable mixture is usually passed through a series of heated rollers which drive off a significant amount of water and aid in molding a sheet with high green strength. Nevertheless, one skilled in the art may adjust the water content so that the hydraulic mixture has an appropriate rheology so than it will be easily and effectively extruded through a particular die.

In order to prepare a desired hydraulically settable mixture, the fiber, water, rheology-modifying agent, and other additives are preferably blended together in a high shear mixer in order to form a well-dispersed, homogeneous mixture. High shear mixing is used for the addition of fibrous material to insure that the fibrous materials are well dispersed throughout the mixture. This results in a more uniformly blended mixture, which improves the consistency of the uncured mixture as well as increasing the strength of the final cured product. It may be preferable to also add the hydraulic binder, as well as certain lower concentration aggregates such as mica, during the high shear mixing step in order to get a homogenous mixture in the shortest possible time.

The addition of fibrous materials by normal cement mixing techniques usually results in the conglomeration of the fibers, leading to deformities in the resulting sheets or articles. Standard mixers, such as drum mixers, combine the components of the desired mixture by applying low energy stirring or rotating to the components. In contrast, high shear mixers are capable of rapidly blending the mixture so as to apply high shearing forces on the particles within the hydraulically settable materials and the added fibrous materials. As a result, the fibrous materials and particles are uniformly dispersed throughout the mixture, thereby creating a more homogenous structural matrix within the hardened sheets. Fine particulate aggregates of relative high strength, such as sand, silica, or alumina, can also be blended using a high speed mixer, although not if included in such high concentrations to cause the hydraulic mixture to have a relatively low water content and high viscosity.

Thereafter, aggregates included in higher concentrations (and sometimes the hydraulic binder) are blended into the mixture using a low shear mixer. This is particularly true where lightweight aggregates are added which cannot withstand high shear conditions without breaking, such as perlite or hollow glass spheres. It is preferable that the size of the aggregates not exceed about 30% of the final thickness of the sheet, since oversized aggregates could damage the rollers and create flaws within the sheet surface.

Whether or not the hydraulic binder is added during the steps of high or low shear mixing depends on the nature of the hydraulic binder as well as how the mixture is handled. It is believed that high shear mixing of the hydraulic cement after the formation of a particulate hydrosol gel can disrupt the gel and result in a final hardened product with dramatically lower compressive and tensile strengths.

In alternative embodiments, other additives such as air-entraining agents and reactive metals can be incorporated into the mixture in order to obtain a final material with lower density and higher insulating ability.

In a typical mixing process in the laboratory, the appropriate components are blended using a high shear, high speed mixer for about 1 minute. Thereafter, the remaining components are blended into the mixture using a low shear, low speed mixer for about 5 minutes. The total mixing time per batch of material is therefore about 6 minutes, although this may be varied depending upon the nature of the hydraulically settable mixture. Industrially, this mixture can be shortened by the use of appropriate mixers; specifically, the currently preferred method of mixing being a continuous mixing system.

In one embodiment, a cement mixer capable of both high and low shear mixing is used to meter and mix the materials in a batch mode. This mixer can handle up to 350 l of material per batch and, assuming a 6 minute mix cycle, is capable of producing 2,000 kg of a hydraulically settable mixture per hour assuming 0.5 g/cm$^3$ per cubic foot.

In an alternative embodiment, high speed, high shear mixers described in U.S. Pat. No. 4,225,247 entitled "Mixing and Agitating Device" and U.S. Pat. No. 4,552,463 entitled "Methods and Apparatus for Producing a Colloidal Mixture," can be used for mixing the hydraulically settable mixture. Thereafter, the mixture can be transferred to a low speed, low shear mixer in order to complete the mixing process. The mixing step may also be combined with the extrusion step (discussed below) using modern extrusion equipment that includes a high shear mixing chamber.

The currently preferred embodiment for the industrial setting is equipment in which the materials incorporated into the hydraulically settable mixture are automatically and continuously metered, mixed, deaired, and extruded by a twin auger extruder apparatus. A twin auger extruder apparatus has sections with specific purposes such as low shear mixing, high shear mixing, vacuuming, and pumping. A twin auger extruder apparatus has different flight pitches and orientations which permits the sections to accomplish their specific purposes.

It is also possible to premix some of the components in a vessel, as needed, and pump the premixed components into the twin auger extruder apparatus. The preferable twin auger extruder apparatus utilizes uniform rotational augers wherein the augers rotate in the same direction. Counter-rotational twin-auger extruders, wherein the augers rotate in the opposite directions, accomplish the same purposes. A pugmil may also be utilized for the same purposes. Equipment meeting these specifications are available from Buhler-Miag, Inc., located in Minneapolis, Minn.

The internal components of the mixer can be made of stainless steel because the abrasion to the mixer is not too great in light of the high water content. However, if the mixer components can be carbide coated for extended life, thereby resisting any abrasion and the strongly basic conditions expected from a mixture containing aggregates and a hydraulic cement.

The various component materials that will be combined within the hydraulically settable mixtures of the present invention are readily available and may be purchased inexpensively in bulk quantities. They may be shipped and stored in bags, bins, or train cars, and later moved or unloaded using conventional means known in the art. In addition, the materials can be stored in large storage silos and then withdrawn and transported by means of conveyors to the mixing site.

As previously discussed, the hydraulically settable mixture is microstructurally engineered to have certain desired properties. Consequently, it is important to accurately meter the amount of material that is added during any batch or continuous admixing of the components.

B. Molding Sheets from the Hydraulically Settable Mixture.

Once the hydraulically settable mixture has been properly blended, it is then transported to the sheet forming apparatus, which will typically comprise an extruder and a set or series of rollers. In some cases an apparatus which both mixes and extrudes the hydraulically settable mixture may be used in order to streamline the operation and minimize the coordination of the various components within the system. Reference is now made to FIG. 1, which illustrates a currently preferred system for manufacturing sheets from a hydraulically settable mixture. The system includes a mixing apparatus 10, an extruder 20, reduction rollers 40, drying rollers 50, optional compaction rollers 60, second drying rollers 70 (optional), optional finishing rollers 80, and optional spooler 90.

In the first currently preferred sheet forming step, the hydraulically settable mixture can be formed into sheets of precise thickness by first extruding the material through an appropriate extruder die and then passing the extruded material through one or more pairs of reduction rollers (FIG. 1).

Figure 2:
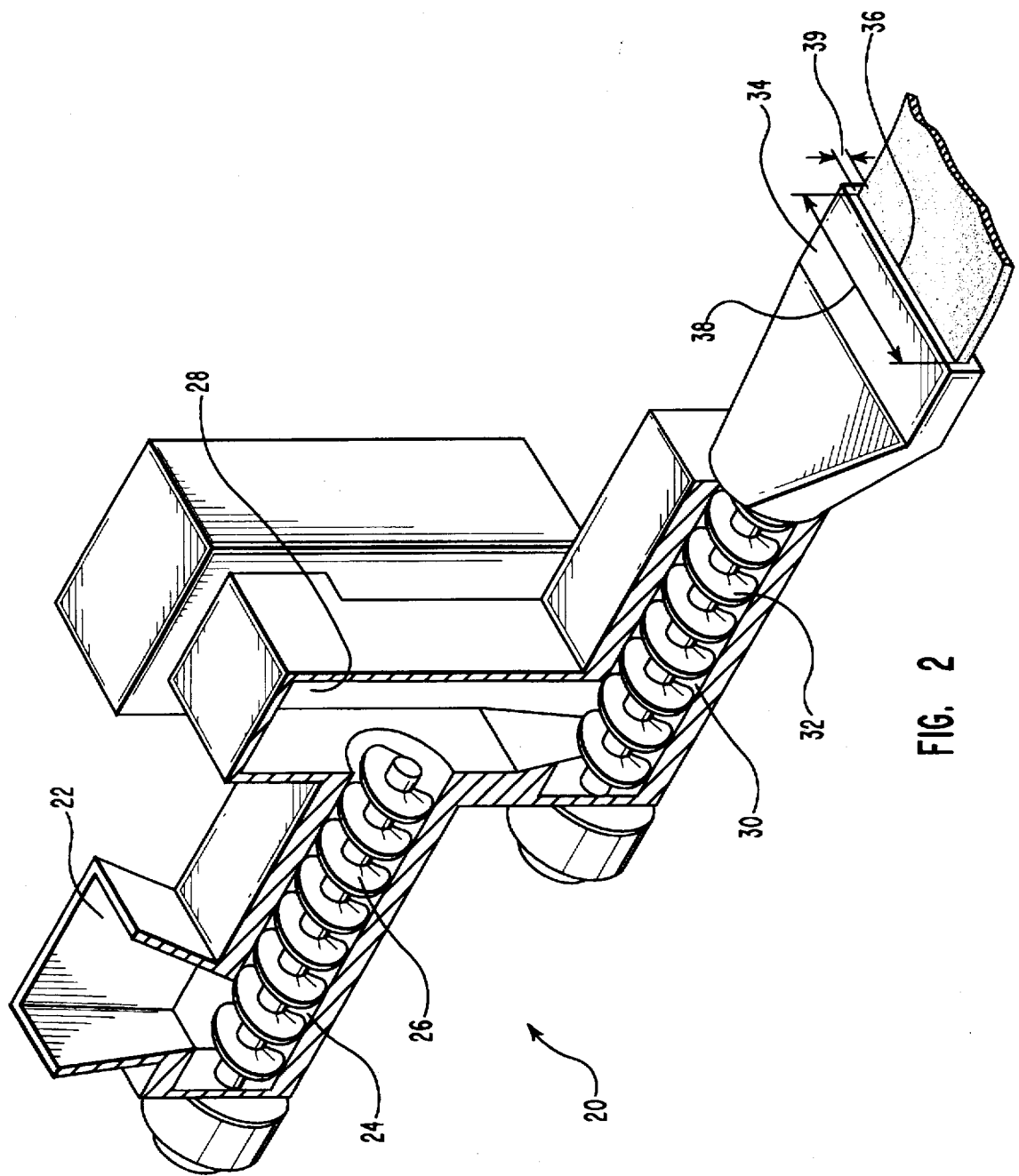
FIG. 2 is a perspective view with cutaway of an auger extruder with evacuation chamber and die head.

FIG. 2 is a closeup view of an auger extruder 20, which includes a feeder 22 that feeds the hydraulically settable mixture into a first interior chamber 24 within the extruder 20. Within the first interior chamber 24 is a first auger screw 26 which exerts forward pressure on and advances the hydraulically settable mixture through the first interior chamber 24 toward an evacuation chamber 28. Typically, a negative pressure or vacuum will be applied to the evacuation chamber 28 in order to remove unwanted air voids within the hydraulically settable mixture.

Thereafter, the hydraulically settable mixture will be fed in a second interior chamber 30. A second auger screw 32 will advance the mixture toward a die head 34 having a transverse slit 36 with a die width 38 and a die thickness 39. The cross-sectional shape of the die slit 36 is configured to create a sheet of a desired width and thickness that will generally correspond to the die width 38 and die thickness 39.

Figure 3:
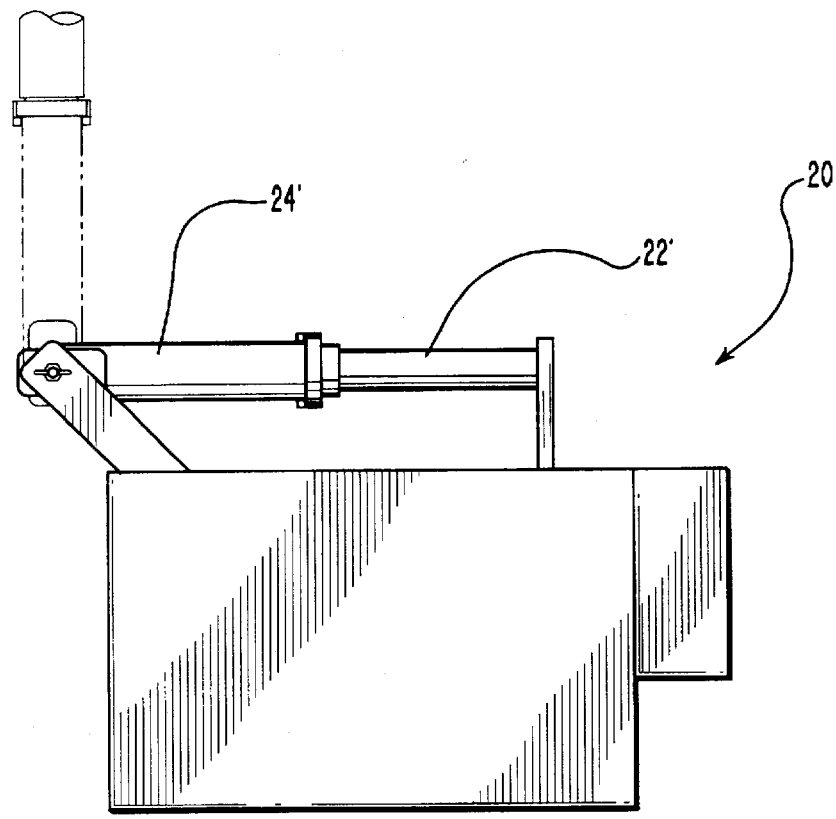
FIG. 3 is a side view of a piston extruder with die head.

Alternatively, as seen in FIG. 3, the extruder may comprise a piston extruder 20' instead of an auger extruder 20. A piston extruder utilizes a piston 22' instead of an auger screw 22 in order to exert forward pressure on and advance the hydraulically settable mixture through the interior chamber 24'. An advantage of using a piston extruder is the ability to exert much greater pressures upon the hydraulically settable mixture. Nevertheless, due to the highly plastic-like nature of mixtures typically employed in the present invention, it is not generally necessary, or even advantageous, to exert pressures greater than those achieved using an auger extruder.

In contrast, an important advantage of using an auger extruder is that it allows for a continuous extrusion process, whereas a piston extruder will generally be useful for extruding in batches. In addition, an auger extruder has the ability to remove unwanted macroscopic air voids within the hydraulically settable mixture. Failure to remove unwanted air voids can result in the sheet having a defective or nonhomogeneous structural matrix. During subsequent drying steps, particularly where relatively high heat is used, unwanted air pockets can greatly expand and cause air bubble defects. (However, such defects will generally not occur in the case where finely divided air voids are incorporated within the hydraulically settable mixture.)

Removal of the air voids may be accomplished using conventional venting means known in the extrusion art as shown in FIG. 2, wherein the mixture is first passed into an evacuation chamber 28 by a first auger screw 26, and then extruded through the extruder die head 34 by means of a second auger screw 32.

Alternatively, the unwanted air voids may by removed from the hydraulically settable mixture by a process known as "venting" wherein the excess air collects under pressure within the interior chamber and escapes from the extruder by passing through the space defined by the walls of the interior chamber and the outer edges of the auger screw.

Although the preferred width and thickness of the die will depend upon the width and thickness of the particular sheet to be manufactured, the thickness of the extruded sheet will usually be at least twice, and sometime many times, the thickness of the final calendered sheet. The amount of reduction (and, correspondingly, the thickness multiplier) will depend upon the properties of the sheet in question. Because the reduction process helps control fiber orientation, the amount of reduction will often correspond to the degree of desired orientation. In addition, the greater the thickness reduction, the greater the elongation of the sheet. In a typical manufacturing process an extruded sheet with a thickness of about 6 mm may be calendered to a sheet with a thickness between about 0.2 mm and about 0.5 mm.

Figure 4:
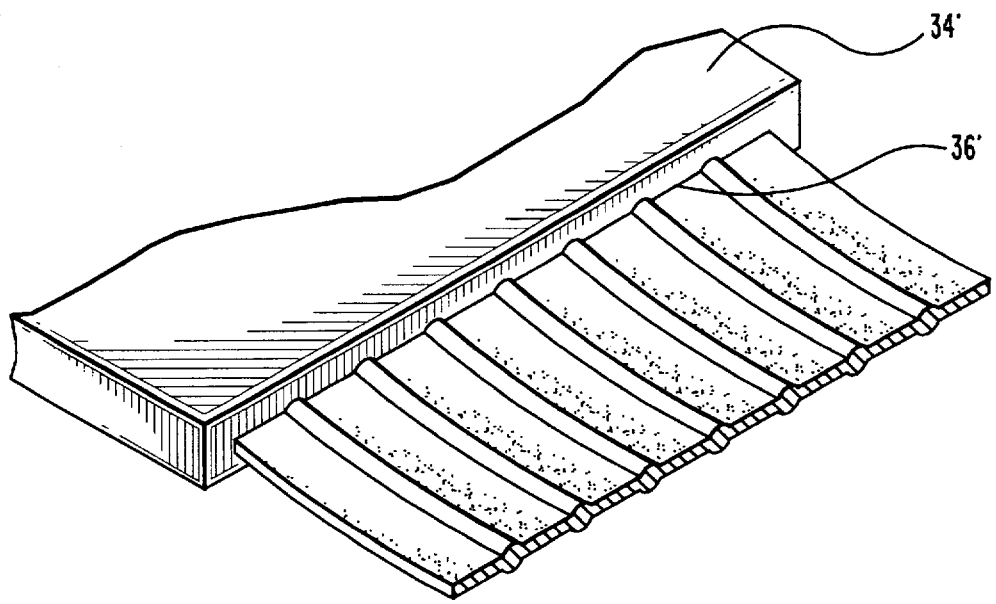
FIG. 4 is a perspective view of a die head with a slit having a varying gap along the length.
Figure 5:
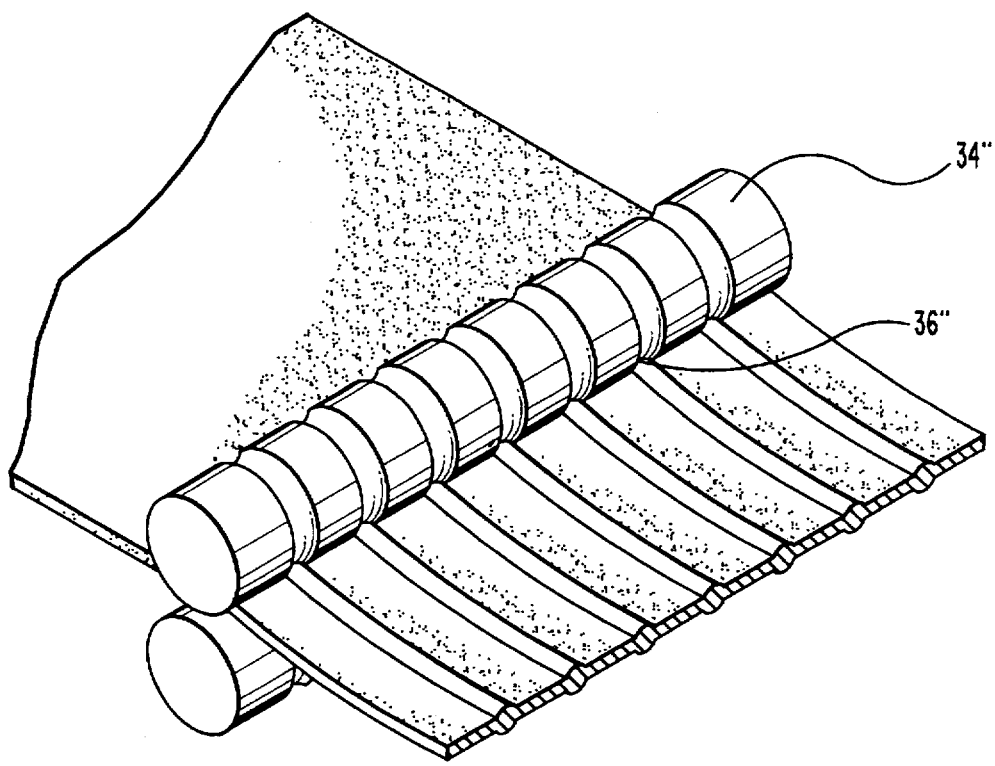
FIG. 5 is a perspective view of nonuniformly cylindrical rollers used to make a nonplanar sheet.

Although the die slit is generally rectangularly shaped, it may contain areas of increased thickness along its width (FIG. 4) in order to form an extruded sheet having varying thickness along its width. In this case, if rollers are used in conjunction with the extrusion process they will preferably have recesses or gap variations which correspond to the areas of increased thickness within the extruded sheet (FIG. 5). In this way a sheet having reinforced areas of increased strength and stiffness can be produced.

In an alternative embodiment, it is envisioned that the width of the die slit can be selectively varied as a function of time as the mixture is extruded through the slit. This permits the extrusion of a sheet having thickness along the length of the sheet. In this scenario, it will generally be necessary to provide rollers which also have varying gap distances as a function of time. However, because of the greater difficulty of perfectly synchronizing the rollers to accommodate the rate of extrusion of sheet of varying thickness, this option is less preferable than creating a sheet with varying thickness along the width as described above.

In addition to narrow die slits to form flat sheets, other dies may be used to form other objects or shapes. The only criterion being that the extruded shape be capable of being thereafter formed into a sheet. For example, in some cases it may not be desirable to extrude an extremely wide sheet. Instead, a pipe may be extruded and continuously cut and unfolded using a knife located just outside the die head.

The amount of pressure that is applied in order to extrude the hydraulically settable mixture will generally depend on the pressure needed to force the mixture through the die head, as well as the desired rate of extrusion. It should be understood that the rate of extrusion must be carefully controlled in order for the rate of sheet formation to correspond to the speed at which the sheet is subsequently passed through the calendering rollers during the calendering step. If the rate of extrusion is too high, excess hydraulically settable material will tend to build up behind the calendering rollers, which will eventually cause a clogging of the system. Conversely, if the rate of extrusion is too low, the calendering rollers will tend to stretch the extruded sheet, which can result in a fractured or uneven structural matrix, or worse, breakage or tearing of the sheet. The latter can also result in a complete breakdown of the continuous sheet forming process.

It will be understood that an important factor which determines the optimum speed or rate of extrusion is the final thickness of the sheet. A thicker sheet contains more material and will require a higher rate of extrusion to provide the necessary material. Conversely, a thinner sheet contains less material and will require a lower rate of extrusion in order to provide the necessary material.

The ability of the hydraulically settable mixture to be extruded through the die head, as well as the rate at which it is extruded, is generally a function of the rheology of the mixture, as well as the operating parameters and properties of the machinery. Factors such as the amount of water, rheology-modifying agent, dispersant, or the level of initial hydration of the hydraulic binder all affect the rheological properties of the mixture. Therefore, in order to control the rate of extrusion it will be preferable to carefully control the mix design and the rate of setting of the hydraulically settable mixture.

Because it will sometimes not be possible to control all of the variables that can affect the rate of extrusion, it may be preferable to have an integrated system of transducers which measure the rate of extrusion, or which can detect any buildup of excess material behind the calendering rollers. This information can then be fed into a computer processor which can then send signals to the extruder in order to adjust the pressure and rate of extrusion in order to fine tune the overall system. As set forth below, a properly integrated system will also be capable of monitoring and adjusting the roller speed as well.

As set forth above, adequate pressure is necessary in order to temporarily increase the workability of the hydraulically settable mixture in the case where the mixture has a deficiency of water and has a degree of particle packing optimization. In a mixture that is water deficient, the spaces (or interstices) between the particles contain insufficient water to lubricate the particles in order to create adequate workability under ordinary conditions.

However, as the mixture is compressed within the extruder, the compressive forces force the particles together, thereby reducing the interstitial space between the particles and increasing the apparent amount of water that is available to lubricate the particles. In this way, workability is increased until the mixture has been extruded through the die head, at which point the reduced pressure causes the mixture to exhibit an almost immediate increase in stiffness and green strength, which is generally desirable.

It should be understood that the pressure exerted on the hydraulically settable mixture during the extrusion process should not be so great so as to crush or fracture the lightweight, lower strength aggregates (such as perlite, hollow glass spheres, pumice, or exfoliated rock). Crushing or otherwise destroying the structural integrity of these or similar lightweight aggregates containing a large amount of voids will decrease their insulating effect by eliminating the voids. Nevertheless, because perlite, exfoliated rock, or other such materials are relatively inexpensive, some level of crushing or fracturing of the aggregate particles is acceptable. However, at some point excess pressure will eliminate the lightweight and/or insulative effect of the lightweight aggregate, at which point it would be more economical to simply include a less expensive aggregate such as sand.

In light of each of the factors listed above, the amount of pressure which will be applied by the extruder in order to extrude the hydraulically settable mixture will preferably be within the range from between about 50 kPa to about 70 MPa, more preferably within the range from between about 150 kPa to about 30 MPa, and most preferably within the range from between about 350 kPa to about 3.5 MPa.

In some cases, particularly where a lower density, higher insulating sheet is desired, it may be advantageous to employ a blowing agent which is added to the mixture prior to the extrusion process.

It will be understood that the extrusion of hydraulically settable binder through the die head will tend to unidirectionally orient the individual fibers within the hydraulically settable mixture along the "Y" axis, or in the lengthwise direction of the extruded sheet. As will be seen herein below, the calendering process will further orient the fibers in the "Y" "or machine" direction as the sheet is further elongated during the reduction process. In addition, by employing rollers having varying gap distances in the "Z" direction (such as conical rollers) some of the fibers can also be oriented in the "X" direction (or cross-machine), i.e., along the width of the sheet. Thus, it is possible to create a sheet by extrusion, coupled with calendering, which will have bidirectionally oriented fibers.

C. The Calendering Process.

In most embodiments of the present invention, it will be preferable to "calender" the extruded sheet bypassing it between at least one pair of rollers, the purpose of which is to improve the uniformity and surface quality of the sheet and also usually reduce the thickness of the sheet. In some embodiments, the calendering step will only reduce the thickness of the sheet by a small amount, if at all. In other cases, the calendering process will substantially reduce the thickness of the sheet. In cases where it is desirable to greatly reduce the thickness of the hydraulically settable sheet, it will often be necessary to reduce the thickness of the sheet in steps, wherein the sheet is passed through several pairs of rollers each pair having progressively narrower gap distances therebetween.

Figure 6:
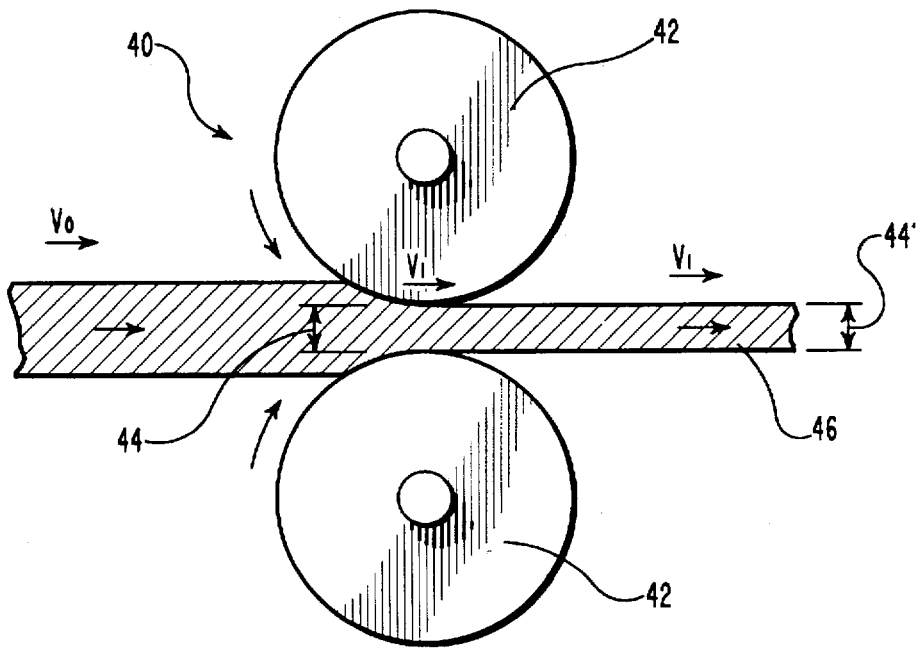
FIG. 6 is a side view of a pair of reduction rollers and a sheet being reduced in thickness by the rollers.

Reference should be made to FIG. 1 which shows one embodiment of the present invention in which a series of three pairs of rollers are employed during the calendering step. The rollers within each of the three roller pairs have similar diameters, although in some cases it may be preferable to use smaller diameter rollers in combination with larger diameter rollers. As seen in FIG. 6, a set or pair of rollers 40 normally includes two individual rollers 42 positioned adjacent to one another with a predetermined gap distance 44 therebetween. The gap distance 44 between the two individual rollers 42 corresponds to the desired thickness 44' of the reduced sheet 46 after it passes between the set of rollers.

As the thickness of the sheet is reduced upon passing through a pair of rollers, it will also elongate in the forward moving (or "Y") direction. One consequence of sheet elongation is that the fibers will further be oriented or lined up in the "Y" direction. In this way, the reduction process in combination with the initial extrusion process will create a sheet having substantially unidirectionally oriented fibers in the "Y", or lengthwise, direction.

Another consequence of sheet elongation is that the sheet will "speed up" as it passes between a pair of reduction rollers. Reference is again made to FIG. 6 to illustrate that the rotational speed $v_1$ of the rollers will closely correspond to the speed $v_1$ of the reduced, elongated sheet as it exits the rollers, not the speed of the sheet, as it enters the gap between the rollers. More precisely, the tangential speed of the outer surfaces of the rollers at the point where the radius of the rollers is perpendicular to the surface of the sheet will be substantially equal to the speed of the sheet as it exits the pair of rollers. The consequence of this is that the roller speed will be "faster" relative to the speed of the sheet as it enters into the rollers.

By way of example, if the sheet thickness is reduced by 50% and assuming there is no widening of the sheet during the reduction process the sheet will elongate to twice its original length. This corresponds to a doubling of the sheet's velocity before it enters the rollers compared to when it exits the rollers. Thus, as in FIG. 7, if the sheet thickness is reduced by 50%, then $v_1=2\times v_0$; the velocity doubles from point "a" to point "b".

The average acceleration of the sheet corresponds to the time it takes for the sheet to pass from point "a" to point "b", although the actual acceleration of the sheet will necessarily be greater as the sheet first passes through the rollers. Because the downward angle of the roller is greater as the sheet first passes between the rollers, the shearing forces and also the acceleration are also greater.

The sheet "speeds up" while passing between a pair of rollers by being squeezed or pressed into a thinner sheet by the rotating rollers. This process of squeezing or pressing the sheet, as well as the speed differential between the entering sheet and the rollers, creates a certain amount of shearing forces on the sheet. The application of an excessively large shearing force can disrupt the integrity of the structural matrix of the sheet and create flaws within the sheet, thereby weakening the sheet. Because of this, the thickness of the sheet should be reduced in steps small enough to prevent undue damage to the sheet. In light of typical production parameters (such as, e.g., minimizing the number of reduction steps, orienting the fibers, and controlling the rheology of the hydraulically settable mixture) the reduction in thickness of a sheet will preferably not exceed about 75% during any single reduction step (i.e., while passing between any one set of rollers), more preferably no greater than about 50%, and most preferably no greater than about 30%.

The diameter of each of the rollers should be optimized depending on the properties of the hydraulically settable mixture and the amount of thickness reduction of the hydraulically settable sheets. When optimizing the diameter of the rollers two competing interests should be considered. The first relates to the fact that smaller diameter rollers tend to impart a greater amount of shearing force into the sheet as it passes between the rollers. This is because the downward angle of compression onto the sheet is on average greater than when using a larger diameter roller (FIG. 7).

Figure 7:
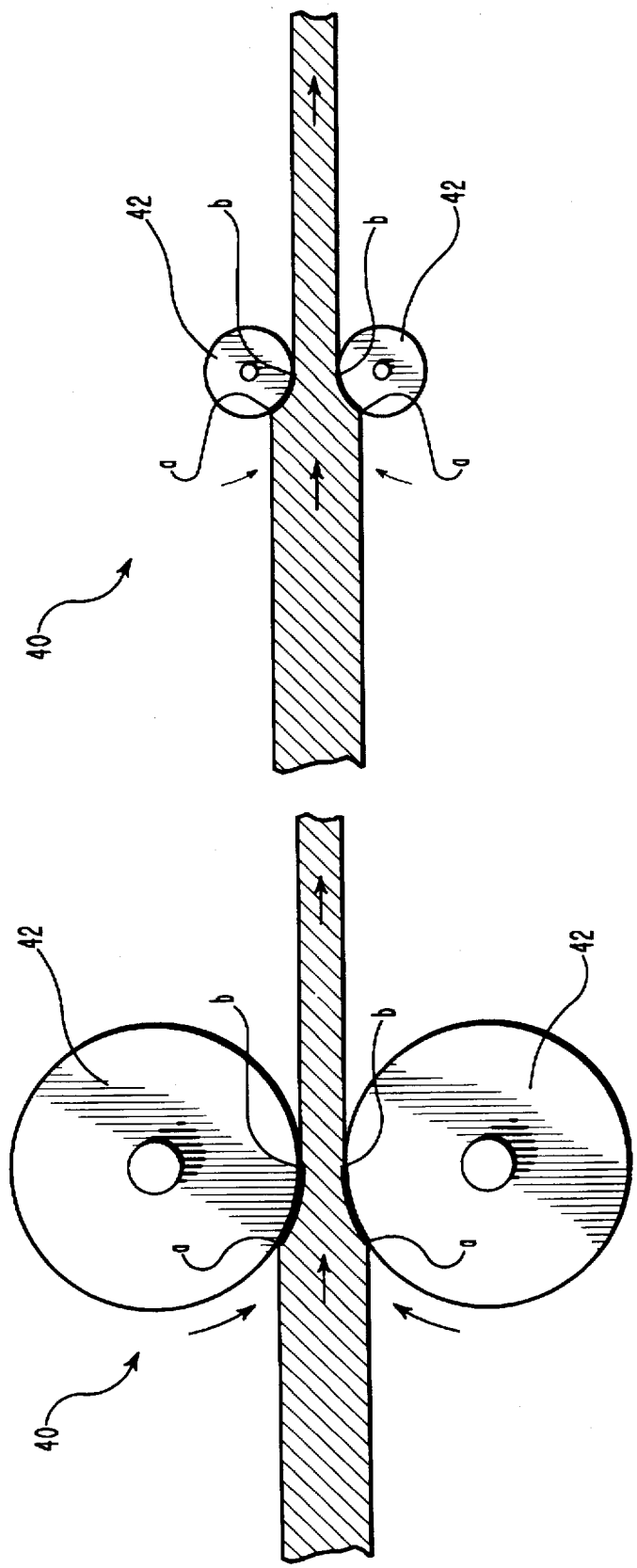
FIG. 7 is a side view comparing the effect on sheet reduction of narrow and broad rollers.

Reference to FIG. 7 illustrates that not only is the downward angle of compression less severe in a larger diameter roller, the distance (and by analogy, the time) during which the sheet is being accelerated is greater when using larger diameter rollers. Because it takes longer for the sheet to pass from point "a" to point "b" when using broader rollers, the rate of acceleration is decreased, as are the shearing forces associated with the reduction in sheet thickness. Consequently, from this perspective, larger diameter rollers appear to be advantageous compared to smaller diameter rollers because less shearing forces would be expected to introduce fewer flaws into the hydraulically settable structural matrix.

However, the use of larger diameter rollers has the drawback of the hydraulically settable material coming into contact with the roller for a greater period of time, thereby resulting in an increase in drying of the sheet during the calendering process in the case where the rollers are heated to prevent adhesion. (Because more of the sheet comes into contact with a larger diameter roller, heating is even more important when using larger diameter rollers to prevent adhesion). While some drying is advantageous, drying the sheet too quickly during the calendering process could result in the introduction of fractures and other flaws within the structural matrix. A dryer sheet is less able to conform to a new shape without a rupture in the matrix compared to a wetter sheet subjected to the same level of shearing forces. Consequently, from this perspective the use of smaller diameter rollers is advantageous for reducing the drying effect of the reduction rollers.

In light of this, the diameter of the rollers should preferably be optimized and be sufficiently small to prevent overdrying of the material during the calendering process, while also being sufficiently large to reduce the amount of shearing force imparted to the sheet, thereby allowing a greater reduction of sheet thickness during each reduction step.

The optimization of the roller diameters in order to achieve the greatest amount of reduction of sheet thickness, while at the same time preventing overdrying of the hydraulically settable sheet, is preferred in order to reduce the number of reduction steps in a manufacturing process.

Besides reducing the number of working parts, reducing the number of reduction steps also eliminates the number of rollers whose speed must be carefully synchronized in order to prevent sheet buildup behind the rollers (in the case of rollers rotating too slow) or sheet tearing (in the case of rollers rotating too fast).

Because each of the roller pairs reduces the thickness of the sheet as it passes therebetween, the sheet will speed up each time it passes through a set of rollers. Therefore, each of the roller pairs must independently rotate at the proper speed in order to prevent interruption of the calendering process. Eliminating the number of reduction steps greatly simplifies this synchronization problem.

The shearing force that is applied by the rollers on the sheets also corresponds to the speed of the rollers, including the differential between the sheet as it passes between a pair of rollers and the speed of the rollers. As the sheets are fed through the rollers at higher speeds, the amount of shear that is applied also increases. Therefore, the speed with which the hydraulically settable mixture is extruded and subsequently calendered can be optimized in order to reduce flaws caused by excess shear while maintaining the highest speed possible in order to maximize production of sheets. The optimal speed with which a hydraulically settable mixture is first extruded and then calendered depends upon a number of interrelated variables including, for example, the rheology and other properties of the mixture, the thickness of the extruded sheet, the amount of reduction of the sheet, and the level of adhesion between the mixture and the rollers. In light of the various parameters, there is no preferred speed with which the sheet is extruded and then calendered.

As set forth above, it is preferable to treat the roller surfaces in order to prevent sticking or adhesion of the hydraulically settable sheet to the rollers. One method entails heating the rollers, which causes some of the water within the hydraulic mixture to evaporate and to create a steam barrier between the sheet and the rollers. Evaporation of some of the water also reduces the amount of water within the hydraulically settable mixture, thereby increasing the green strength of the sheet. The temperature of the rollers, however, must not be so high as to dry or harden the surface of the sheet to the point which would create residual stresses, fractures, flaking, or other deformities or irregularities in the sheet. Accordingly, it is preferable to heat the rollers to a temperature within the range from between about 50° C. to about 140° C., more preferably to between about 70° C. to about 120° C., and most preferably to between about 85° C. to about 105° C.

In addition, the rate of drying of the sheet can be reduced by incorporating aggregates having a low specific surface area. Aggregates which have a greater specific surface area can more readily release any water absorbed within the aggregate compared to aggregates having a lower specific surface area.

Generally, the stickiness of the hydraulically settable mixture increases as the amount of water in the mixture is increased. Therefore, the rollers should generally be heated to a higher temperature in cases where the mixture contains more water, which is advantageous because sheets containing a higher water content must generally have more of the water removed in order to obtain adequate green strength. Higher temperature rollers will increase the rate of water evaporation.

Finally, it has been found that heating the hydraulically settable mixtures of the present invention increases the rate of the hydration reaction between the hydraulic binder and water. It is known in the art that concrete normally takes about 28 days to achieve its optimum strength. However, heating the hydraulic mixtures of the present invention makes it possible to obtain substantial hydration of the hydraulic binder in as little as one day. Because a substantial amount of the final strength can be obtained even before the hydration reaction has reached the standard 28 day level, heated hydraulically settable sheets of the present invention can achieve a substantial amount of their final strength within as little as 10 minutes.

Because heated rollers can drive off significant amounts of water and improve the form stability, the amount of acceptable sheet thickness reduction will generally decrease in each successive reduction step as the sheet becomes drier. This is because a drier, stiffer sheet can tolerate less shear before flaws are introduced into the structural matrix.

In an alternative embodiment, adhesion between the hydraulically settable sheets and rollers can be reduced by cooling the rollers to or below room temperature. Heating the mixture in the extruder to a relatively high temperature, for example, and then cooling the sheet surface causes the vaporizing water to condense, which is thought to create a thin film of water between the sheet and the roller. The rollers should be cool enough to prevent the surface of the sheet from adhering to the rollers, but not so cold to cause the sheet to freeze or become so stiff or inflexible that it will fracture or shatter during the calendering process.

Overcooling the material can also greatly retard the hydration reaction, although this may be desirable in some cases. Accordingly, it is preferable to cool the rollers to a temperature within the range from between about −20° C. to about 40° C., more preferably to between about 0° C. to about 35° C., and most preferably to between about 5° C. to about 30° C.

In order to obtain the beneficial nonadhesive effects of cooling the rollers, it will generally be necessary to first heat the hydraulically settable mixture before or during the extrusion process to a temperature that is significantly higher than the temperature of the cooled rollers. This allows for the beneficial condensation of water vapor from the heated mixture onto the cooled rollers, thereby creating a thin layer of lubricating water between the rollers and the hydraulically settable mixture. Accordingly, it will generally be preferable to heat the extruding mixture to a temperature within the range from between about 20° C. to about 80° C. The temperature will correlate with the temperature of the rollers.

Another way to reduce the level of adhesion between the rollers and the hydraulically settable sheet is to treat the roller surfaces in order to make them less amenable to adhesion. Rollers are typically made from polished stainless steel and coated with a nonstick material such as polished chrome, nickel, or teflon.

Figure 8:
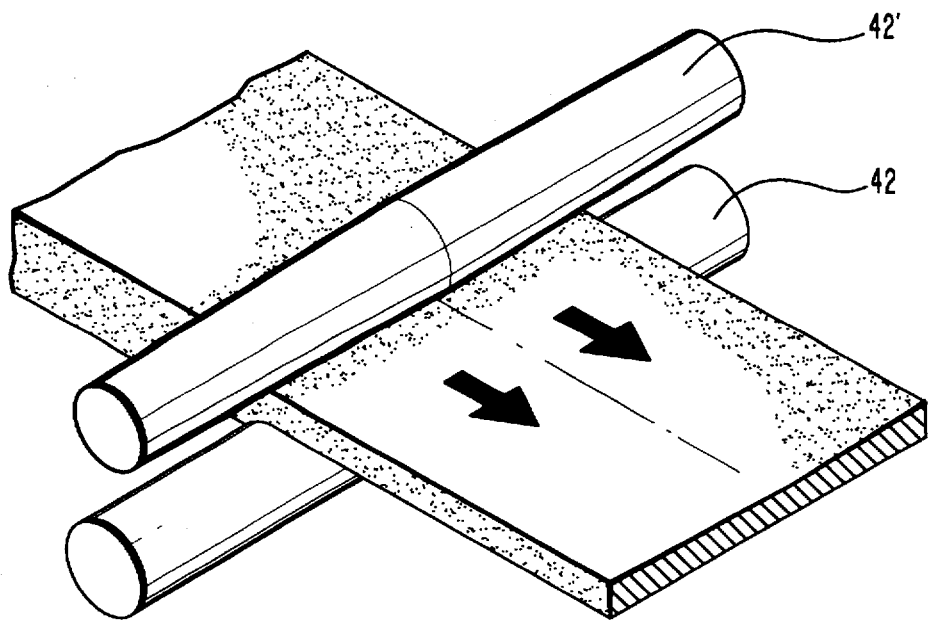
FIG. 8 is a perspective view of a slightly pitched conical roller used to reduce the shearing force applied to a sheet being reduced in thickness.

It has been discovered that the amount of shear and downward pressure of the rollers can be reduced, while still deriving the same amount of sheet reduction, by employing a shear reduction roller 42' having a slightly conical shape in conjunction with a conventional roller 42 (FIG. 8). However, the degree of gap differential in the "Z" direction as a result of the conical shape should be controlled to prevent spreading or widening of the sheet in the "X" direction (unless such widening is desired). However, small amounts of widening is not usually desired because the widened portion is not usually of a constant thickness and must typically be trimmed and discarded. By using conical rollers, it is possible to obtain higher elongation and sheet reduction without applying more shear to the sheet.

Figure 9:
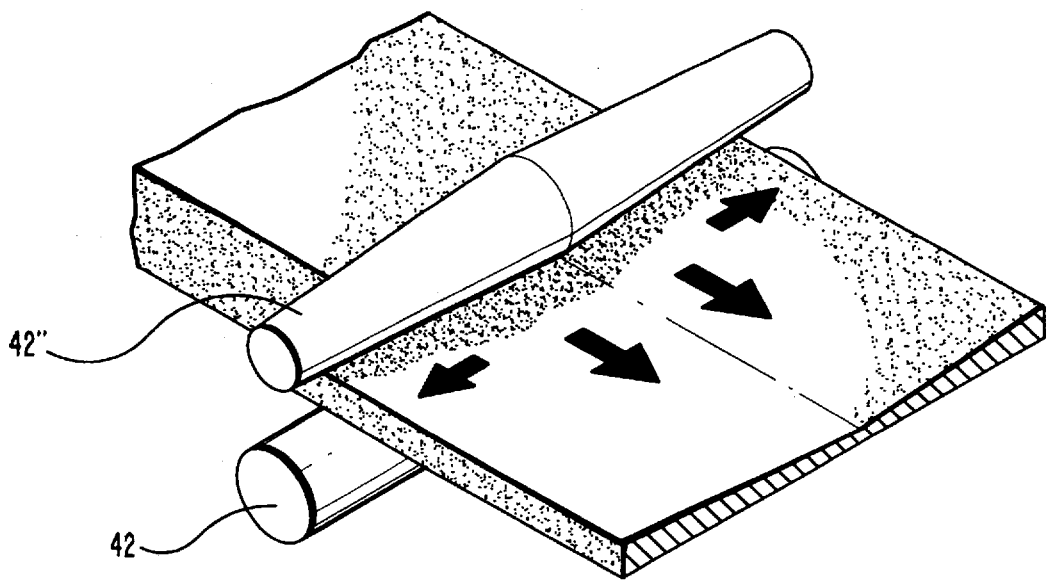
FIG. 9 is a perspective view of a substantially pitched conical roller used to widen the sheet passing therethrough in the "X" direction.
Figure 10:
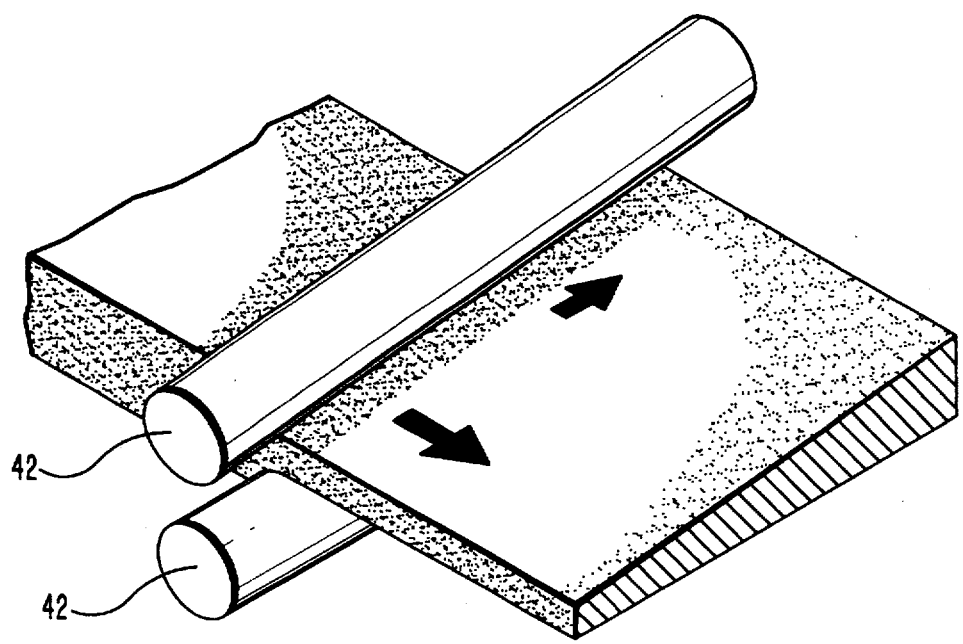
FIG. 10 is a perspective view of a set of rollers with altered "Z" orientation to form a varying gap along the "X" direction and widen the sheet.

Of course, as seen in FIG. 9, it may be desirable to widen or spread the sheet in the "X" direction through the use of a more sharply angled conical roller 42" that creates a gap differential between the rollers along the "X direction. By varying the gap between the rollers, it is possible to cause the hydraulically settable sheet to spread or widen in the "X" direction from the point where the gap is more narrow toward the point where the gap is wider. In addition to conical rollers, it is possible to orient the individual rollers 42 in the "Z" direction in order to provide the rollers with a smaller gap distance at one end than at the other (FIG. 10).

Spreading or widening the sheet in the "X" direction also has the beneficial effect of reorienting some of the fibers in the "X" direction, thereby creating a sheet with bidirectionally oriented fibers (in the "X" and "Y" directions). Orienting the fibers maximizes the tensile strength imparting properties of the fibers in the direction of orientation.

In addition, orienting the fibers is particularly useful in order to reinforce a hinge or score within the sheet. Fibers which are greater in length than the width of the fold or bend can act as a bridge to connect the material on either side of the fold or bend even if the matrix is partially or even substantially fractured along the fold or bend. This bridging effect is enhanced if the fibers are generally aligned perpendicular to the fold or bend.

Finally, it should be understood that due to the plastic nature and relatively high level of workability of the hydraulically settable mixture, the calendering process will usually not result in much compression of the sheet. In other words, the density of the sheet will remain substantially the same throughout the calendering process, although some compaction would be expected, particularly where the sheet has been significantly dried while passing between other reduction rollers. Where compaction is desired, the sheet can be passed between a pair of compaction rollers 60 following a drying step, as set forth more fully below.

One of ordinary skill in the art will appreciate that the extrusion step need not formerly employ the use of an "extruder" as the term is used in the art. The purpose of the extrusion step is to provide a continuous, well-regulated supply of hydraulically settable material to the rollers. The extrusion step preferably orients the fibers in the direction of the flow of the material. These may be achieved by other mechanisms know to those skilled in the art to effect the "extrusion" or flow of material through an appropriate opening. The force needed to cause a hydraulically settable mixture to flow may, for example, be supplied by gravity.

D. The Drying Process.

Although the calendering step often results in partial or even substantial drying of the hydraulically settable sheet, it will be preferable to further dry the sheet in order to obtain a sheet with the desired properties of tensile strength and toughness. This may be accomplished in a number of ways, each of which involves heating the sheet in order to drive off the excess water. A preferred method of drying the sheet involves the use of large diameter, heated drying rollers sometimes known in the art as "Yankee" rollers, although a series of smaller rollers may also be employed. The main concern is that the combined surface areas of the rollers be adequate to efficiently effectuate drying of the sheet.

In contrast to the reduction rollers, which are generally aligned in pairs of rollers, the drying rollers are individually aligned so that the sheet passes over the surface of each roller individually in sequence. In this way, the two sides of the hydraulically settable sheet are alternatively dried in steps. While the sheet passes between the reduction rollers during the calendering step in a generally linear path, the sheet follows a generally sinusoidal path when wrapping around and through the drying rollers during the drying step.

Referring to FIG. 1, the side adjacent to the first drying roller is heated by the drying roller while the other side is exposed to the air. The heated sheet loses water in the form of vapor, which can escape out the sides of the roller or the surface of the sheet opposite the roller. The vapor also provides a nonstick barrier between the sheet and roller. The drying rollers may have tiny holes within the surface in order to allow some of the water vapor to escape through the holes during the drying step.

As the sheet continues on its path it is rolled onto a second drying roller where the other side comes into contact with the roller surface and is dried (FIG. 1). This process may be continued for as many steps as needed in order to dry the sheet in the desired amount. The amount of drying will depend on a number of factors, including the amount of water within the sheet, the thickness of the sheet, the time that the sheet is in contact with the roller surface, the temperature of the rollers, and the desired properties of the sheet. In some cases it may be preferable to dry one side of the sheet more than the other. This may be accomplished by designing a system which maximizes the contact of one side of the sheet with the drying rollers while minimizing the contact of the other side.

The temperature of the drying rollers will depend on a number of factors, including the moisture content of the sheet as it passes over a particular roller. In any event, the temperature of the drying rollers should be less than about 300° C. Although the hydraulically settable material should not be heated above 250° C. in order to prevent the destruction of the organic constituents (such as rheology-modifying agent or fibers), rollers heated to above this temperature may be used so long as there is adequate water within the mixture which can cool the material as the water vaporizes. Nevertheless, as the amount of water decreases during the drying process, the temperature of the rollers should be reduced to prevent overheating of the material.

In some cases, it may be preferable to use a drying tunnel or chamber in conjunction with the drying rollers. In order to obtain the full effect of heat convection drying, it is often preferable to circulate the heated air in order to speed up the drying process. The temperature within the drying tunnel, as well as the residence or dwell time of the sheet within the tunnel, will determine the amount and rate of evaporation of the water within the hydraulically settable mixture.

In order to achieve quick drying of the surface, it may be preferable to more quickly pass the sheet through a very hot drying tunnel. Conversely, in order to achieve a more uniform and deep drying of the sheet, it might be desirable to pass the sheet more slowly through the drying tunnel. However, the drying tunnel should not usually exceed 250° C. in order to prevent the destruction of the cellulose fibers and rheology-modifying agents. In light of the foregoing, the drying tunnel will preferably be heated to a temperature within the range from between about 50° C. to about 250° C., and more preferably within the range from between about 100° C. to about 200° C.

In some cases, the drying process set forth above will be the final step before the sheet is either used to form a container or other object or, alternatively, rolled onto a spool or stacked as sheets until needed. In other cases, particularly where a sheet with a smoother, more paper-like finish is desired, this drying step will be followed by one or more additional steps set forth more fully below, including a compacting step and/or a finishing step. In the case of compaction, it is generally preferable to leave the sheets with some amount of moisture to prevent fracturing of the matrix during the optional compaction step. Otherwise, if the drying step is not followed by a compaction step, it is generally desired to substantially dry out the sheet in order to quickly maximize the tensile strength and toughness of the sheet.

E. Optional Finishing Processes.

Figure 11:
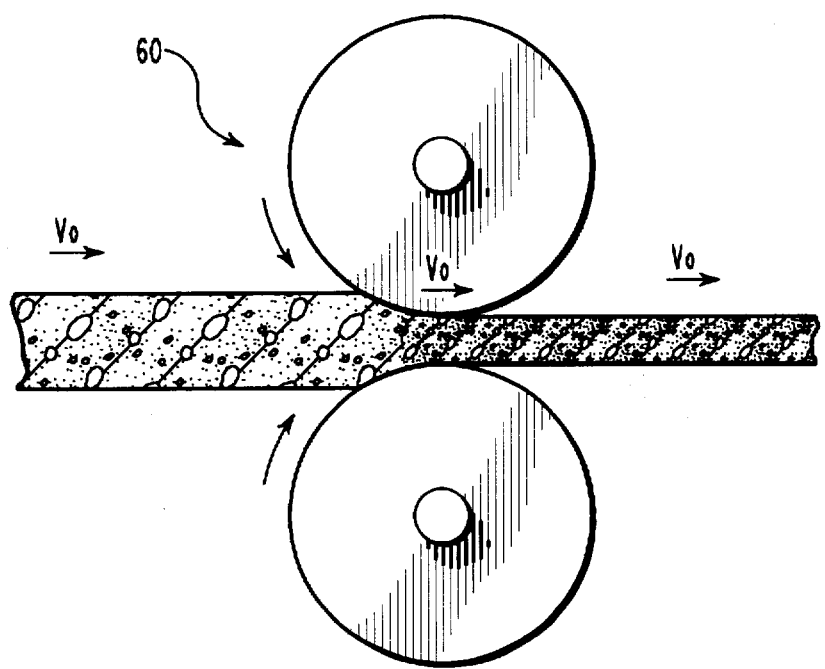
FIG. 11 is a side view of a pair of compaction rollers with a sheet being compacted therebetween.

In many cases, it may be desirable to compact the hydraulically settable sheet in order to achieve the final thickness, tolerance, and surface finish. In addition, the compaction process can be used to remove unwanted voids within the structural matrix. Referring to FIG. 11, the sheet may optionally passed between a pair of compaction rollers 60 after being substantially dried during the drying process. The compaction process generally yields a sheet with higher density and strength, fewer surface defects, and a smaller thickness (FIG. 11). The amount of compressive force of the compaction rollers will be adjusted to correspond to the particular properties of the sheet.

The compaction process preferably yields a sheet of reduced thickness and increased density without causing further elongation of the sheet and without negatively disrupting or weakening the structural matrix. In order to achieve compaction without elongating the sheet and without weakening the structural matrix, it is important to control the drying process so that the sheet contains an amount of water within an optimum range. If the sheet contains too much water, the compaction rollers will elongate the sheet in similar fashion as the reduction rollers. In fact, the compaction rollers are substantially the same as the reduction rollers, the only difference being that compaction, rather than elongation will occur if the sheet is dry enough.

On the other hand, overdrying the sheet prior to the compaction step can yield a weaker sheet. At some point the hydraulically settable sheet can become so dry and hard that the structural matrix cannot be compressed without fracturing. The fracturing of the structural matrix can diminish the final strength of the sheet even if the fractures are microscopic and not visible to the naked eye. Nevertheless, the compaction process of a dry sheet may be improved by spraying the surface of the sheet with water, which provides the sheet with adequate moisture and also fixes and aligns the compacted particles within the sheet surface.

Because the compaction process (including one or more compaction steps) usually involves a slightly moist sheet, it is usually preferable after the compaction step to further dry the sheet in a manner similar to the drying process outlined above using optional drying rollers 70. This optional drying step may be carried out using drying rollers, a drying tunnel, or a combination of the two. Nevertheless, in some cases the sheet may be further processed without a second drying step, such as where the sheet is immediately used to form a container or other object, is scored, or where it is otherwise advantageous to have a slightly moist sheet.

Figure 12:
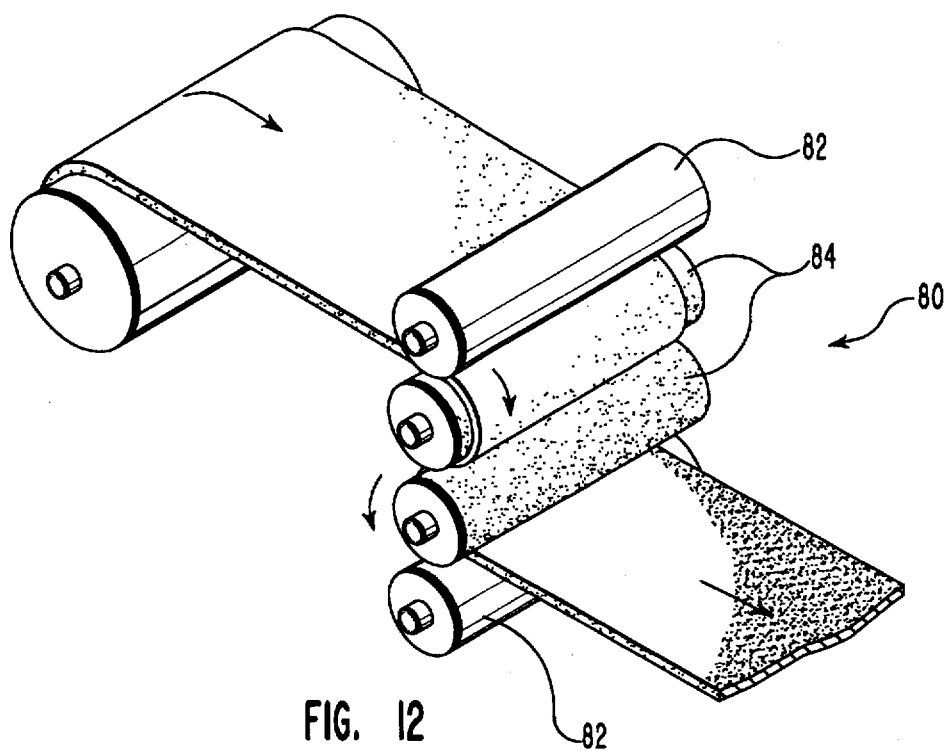
FIG. 12 is a perspective view of a pair of finishing rollers including a "hard" roller and a "soft" roller.

It may also be preferable to further alter the surface of the hydraulically settable sheet by passing the sheet between one or more pairs of finishing rollers 80. For example, in order to create a sheet with a very smooth surface on one or both sides, the sheet may be passed between a pair of hard and soft rollers (FIG. 12). The term "hard roller" refers to a roller 82 having a very polished surface and which leaves the side of the sheet in contact with the hard roller very smooth. The term "soft roller" refers to a roller 84 having a surface capable of creating enough friction between the soft roller 84 and the sheet that it pulls the sheet through the hard and soft roller pair. This is necessary because the hard roller 82 is usually too slick to pull the dry sheet through a pair of hard rollers. Besides, some slippage of the hard roller 82 is advantageous in order to align the particles on the surface of the sheet. The finishing process may be optionally facilitated by spraying water on the sheet surface, and/or by coating the surface with clay, calcium carbonate, or other appropriate coating materials known to one of ordinary skill in the art.

In other embodiments, the finishing rollers can impart a desired texture such as a meshed or checkered surface. Instead of using a hard and a soft roller, rollers which can imprint the sheets with the desired finish may be used. If desired, the rollers can imprint the surface of the sheet with a logo or other design. Special rollers capable of imparting a water mark can be used alone or in conjunction with any of these other rollers.

Figure 13:
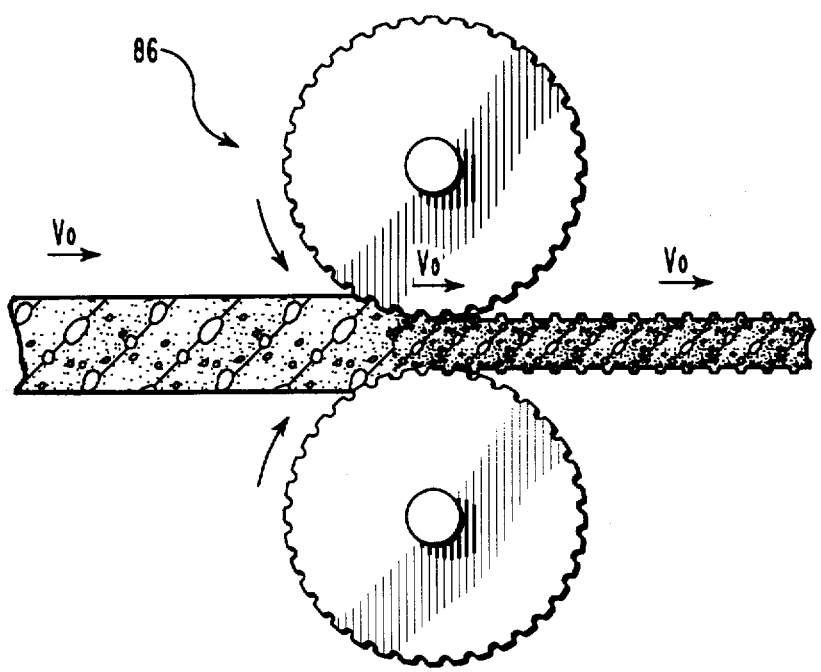
FIG. 13 is a side view of a pair of corrugated rollers used to form a corrugated sheet.

It may be desired to corrugate the sheets in a manner similar to corrugated cardboard. This is accomplished by passing a semi-moist sheet between a pair of corrugated rollers 86 (FIG. 13). The moisture content of the sheet should be controlled so that the corrugation process does not result in a sheet with a damaged structural matrix. This may typically be carried out using steam in the area around the sheet to be corrugated. If the sheet is too dry, the corrugation process can damage the structural matrix, and in some cases may even result in the tearing or splitting of the sheet. Conversely, if the sheet is too moist, the corrugated sheet may lack the green strength necessary to maintain the corrugated shape.

As in the manufacture of corrugated cardboard sheets suitable for boxes or other uses, it may be preferable to sandwich the corrugated hydraulically settable sheet between two flat sheets. This is accomplished using means known in the art of making corrugated cardboard. In addition, one or more of the sandwiched sheets may be made of another material such as paper or cardboard. The choice of material depends on a variety of factors, including the desired performance criteria, cost, and intended method of discarding the sheet when its use has been completed.

F. Coating Processes.

It may be preferable to coat the hydraulically settable sheet prepared using the processes set forth above. Coatings can be used to alter the surface characteristics of the hydraulic sheet in a number of ways. They may provide protection against moisture, base, acid, or oil-based solvents. They may also provide a smoother or glossier surface. They may even reinforce the hydraulically settable sheet, particularly at a bend or fold line. As set forth above, some coatings can be applied to the surface of the sheet during the sheet forming process, in which case the process is an "on-machine" process. However, it may be preferable to apply the coating after the sheet forming process, in which case the process is an "off-machine" process.

The object of the coating process is usually to achieve a uniform film with minimum defects on the surface of the sheet. The selection of a particular coating process depends on a number of substrate (i.e., sheet) variables, as well as coating formulation variables. The substrate variables include the strength, wettability, porosity, density, smoothness, and uniformity of the sheet. The coating formulation variables include total solids content, solvent base (including water solubility and volatility), surface tension, and rheology. Coating processes known in the art that may be used to coat the hydraulically settable sheets of the present invention include blade, puddle, air-knife, printing, and gravure coating.

Figure 14:
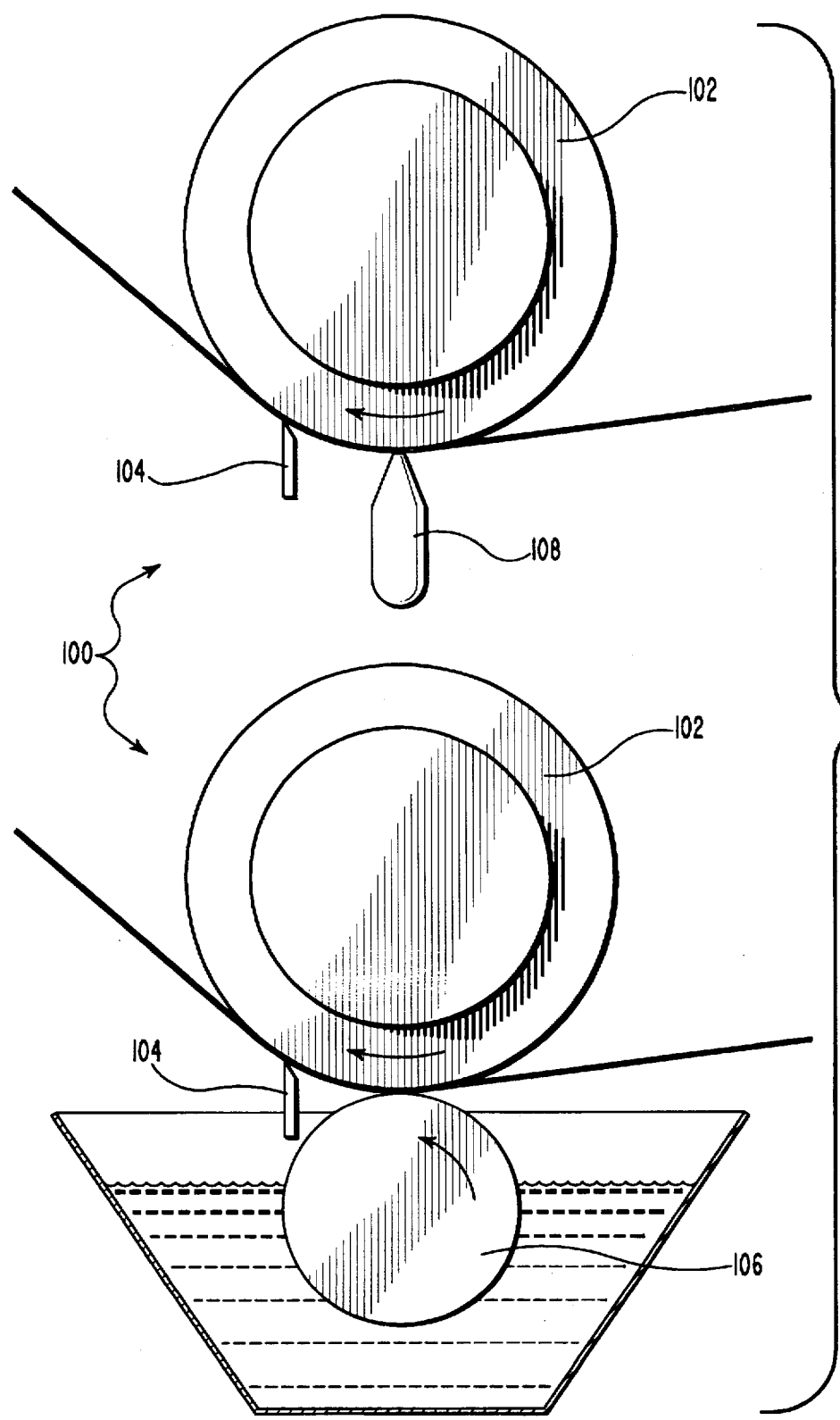
FIG. 14 is a side view of a blade coating apparatus.

The blade coating process utilizes a blade coater 100 as seen in FIG. 14. The blade coater 100 consists of a rubber-covered backup roller 102, usually about 90–125 cm in diameter, against which a flexible doctor blade 104 is mounted. The hydraulically settable sheet is advanced through the coating mechanism by the rotation of the backup roller 102. The coating applicator, which can either be a roller 106 or fountain feed 108, applies an excess amount of coating material to the sheet and then the doctor blade 104 removes the excess amount as the sheet passes between the blade 104 and the backup roller 102.

Figure 15:
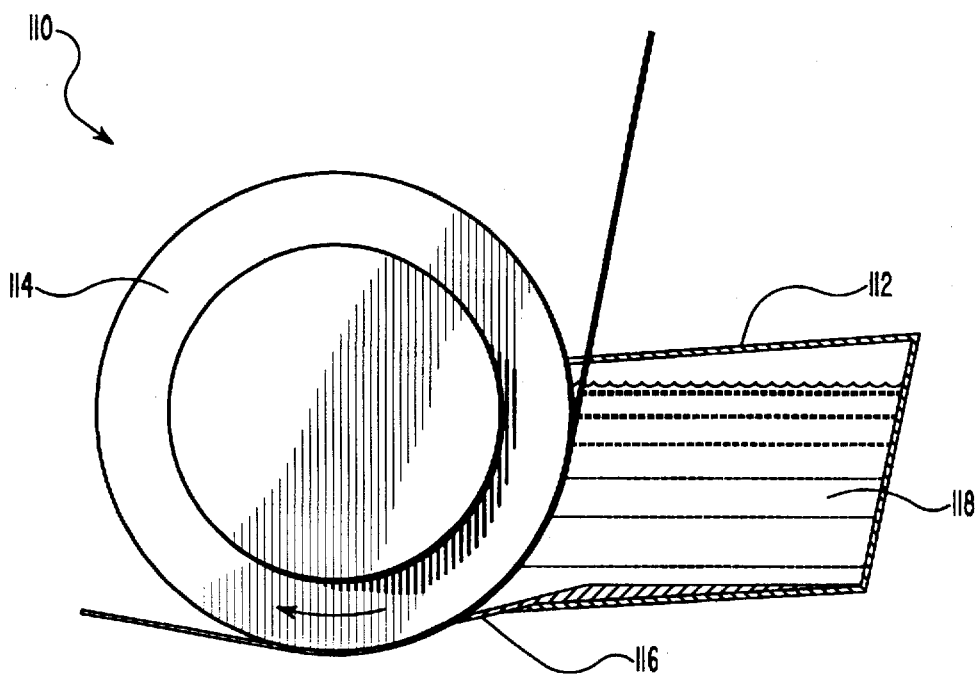
FIG. 15 is a side view of a puddle coating apparatus.

Referring to FIG. 15, the puddle coater 110 combines the applicator and the blade in a single unit. The puddle coater 110 consists of a box 112 fitted to a backup roller 114 with a trailing doctor blade 116 sealing the box 112 against the backup roller 114. Within the box 112 is enclosed a reservoir of coating material 118. As the sheet advances by rotation of the backup roller 114, the outer side of the sheet is coated with an excess amount of coating as it passes through the interface between the backup roller 114 and the box 112. The excess coating material is doctored off by the blade 116. The puddle coater has a very simple design and has a very short dwell and soak-in time for the coating. However, turbulence in the reservoir 118 can be a problem at higher speeds.

Figure 16:
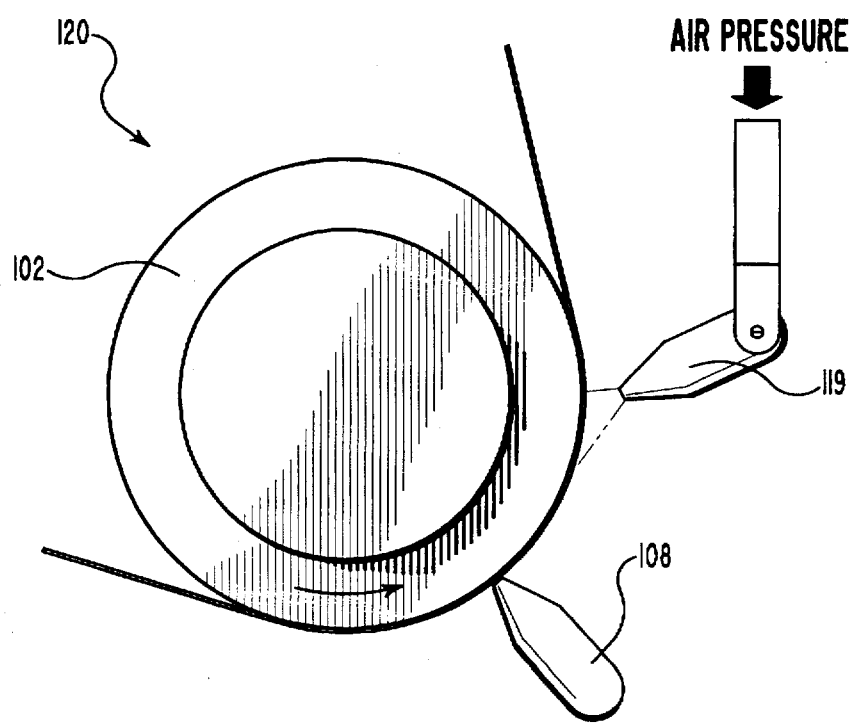
FIG. 16 is a side view of an air-knife coating apparatus.

The air-knife coating apparatus 120 (FIG. 16) is similar to the puddle coater except that the excess coating material is doctored off by an air jet through a slotted nozzle 112. The thickness of the coating is controlled by altering the air pressure of the air jet, although a doctor blade may by used in combination to achieve the desired results.

Figure 17:
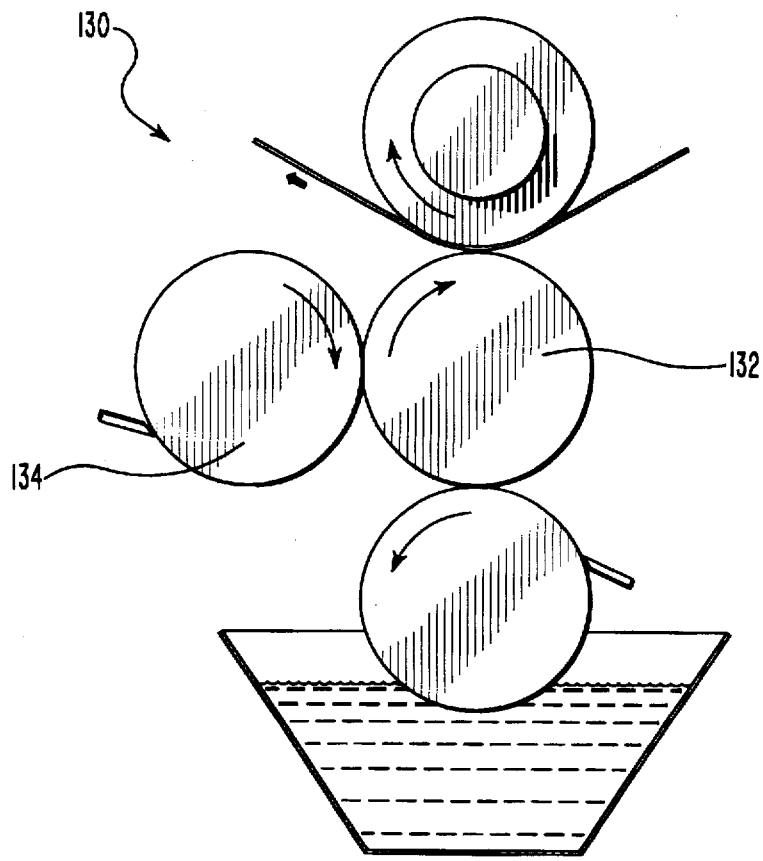
FIG. 17 is a side view of a printer coating apparatus in which excess coating is removed from the application roller.
Figure 18:
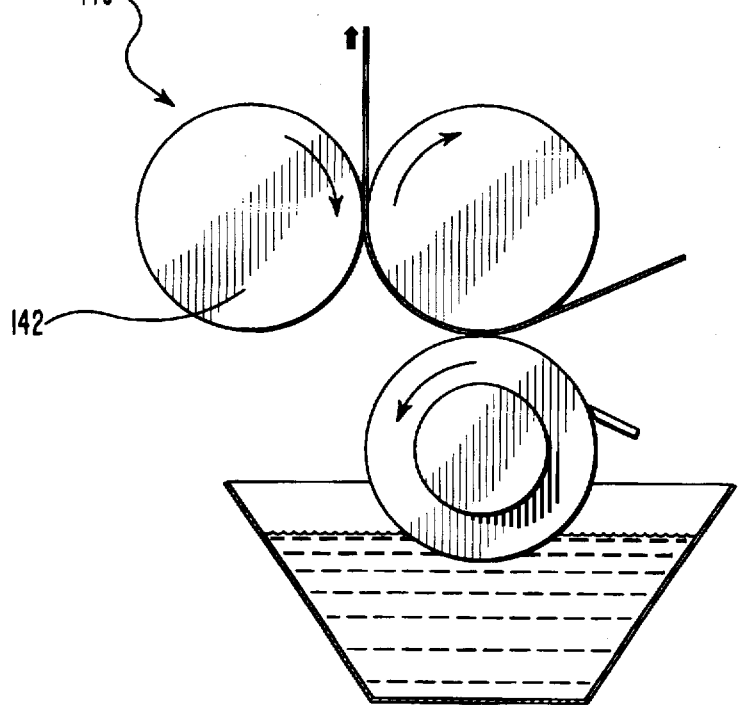
FIG. 18 is a side view of a printer coating apparatus in which excess coating is removed from the sheet.

The printing coater (FIGS. 17 and 18) works much like a printing press in that a predetermined amount of coating can be applied and doctored off from the sheet. In a first printing coater configuration 130 shown in FIG. 17, the excess coating is doctored off of the application roller 132 by means of a precision nip roller 134 before the coating is applied to the sheet. In a second printing coater configuration 140 shown in FIG. 18 the precision nip roller 142 doctors off excess coating material after it has been applied to the sheet.

The Dahlgren coater 150 shown in FIG. 19 uses a hydrophilic variable speed transfer roller 152 to lay down a predetermined amount of coating material onto the surface of the sheet.

The gravure coating process utilizes the gravure coater 160 shown in FIGS. 20 and 21. In this modified printing coating process the coating is metered by the recessed area 162 that is etched onto the surface of the gravure roller 164. The recessed area is flooded with coating material and the excess not held inside the recessed area is wiped off by a doctor blade 166. The application of the coating material may be by direct application by the gravure roller 164 as shown in FIG. 20, or by means of an offset roller 168 as shown in FIG. 21.

In other cases, it may be preferable to spray the coating onto the surface of the sheet using spraying means known in the art.

G. Scoring and Perforation Processes.

Figure 23:
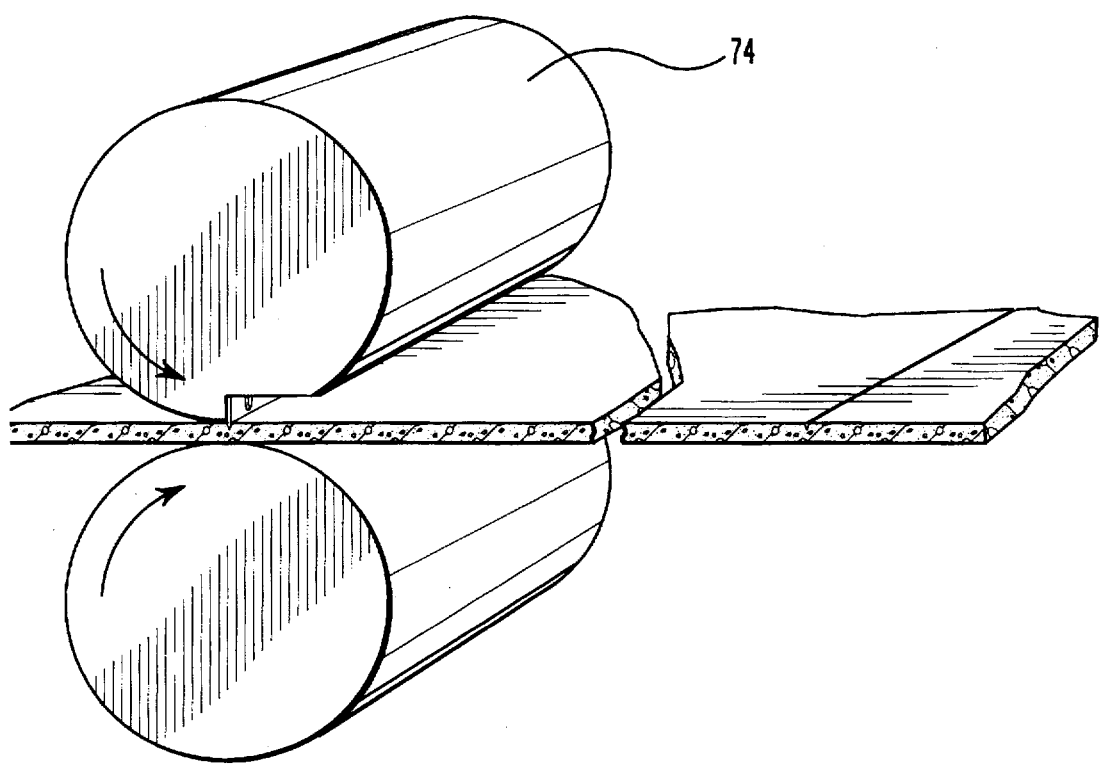
FIG. 23 is a perspective view of a sheet being score cut by a continuous die cut roller.
Figure 24:
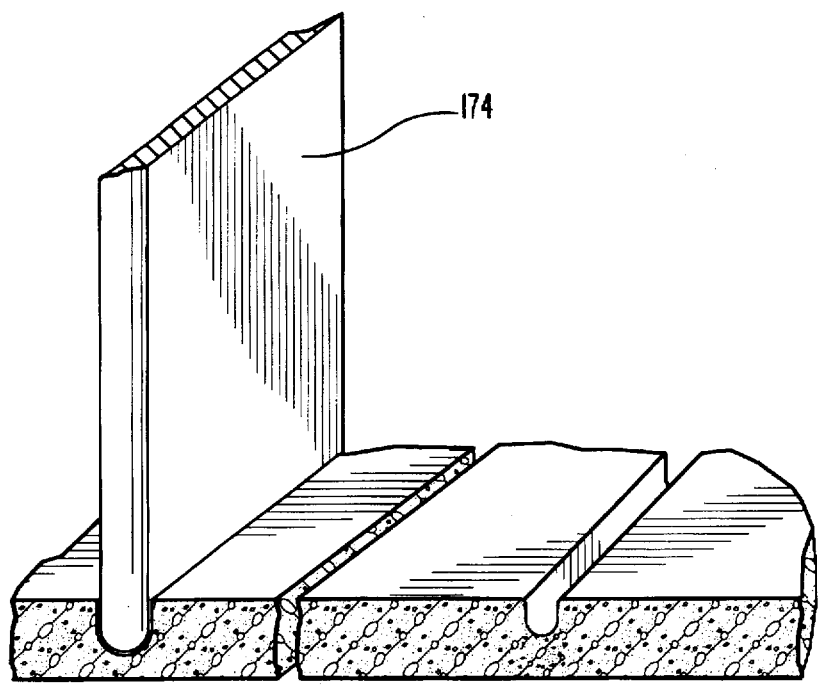
FIG. 24 is a perspective view of a score being pressed into a sheet by a scoring die.
Figure 25:
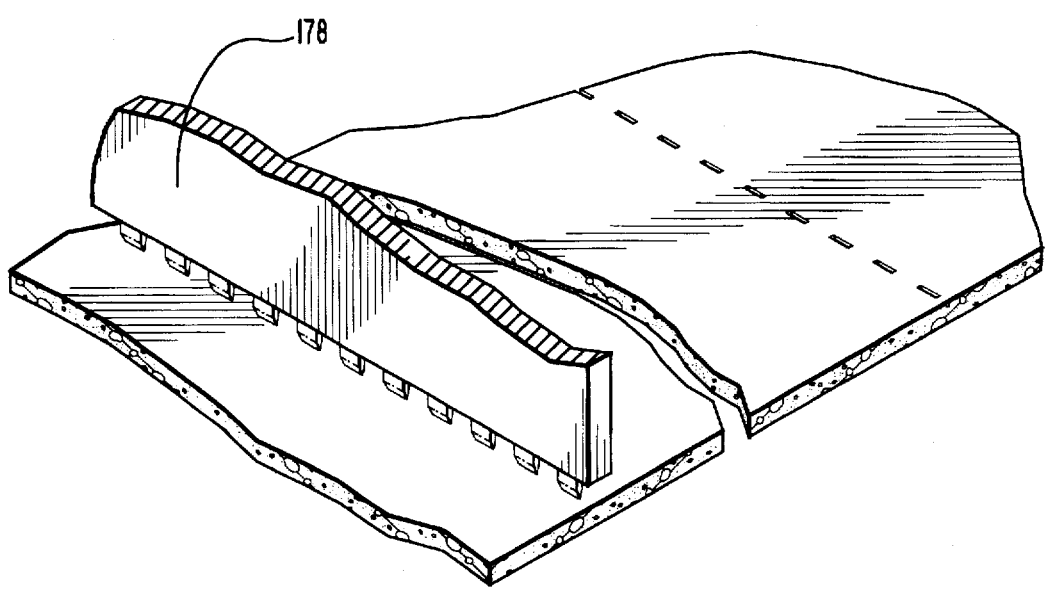
FIG. 25 is a perspective view of a sheet being perforated by a perforation cutter.

In some cases it may be desirable to alternatively score, score cut, or perforate the sheet in order to define a line upon which the sheet may fold or bend. A score cut can be made by using a knife blade cutter 170 (FIG. 22) mounted on a score press, or it can be accomplished using a continuous die cut roller 172 as shown in FIG. 23. A score may be pressed into the sheet by means of a scoring die 174 as shown in FIG. 24. Finally, a perforation may be made by means of a perforation cutter 178 depicted in FIG. 25.

The purpose of the score, score cut, or perforation is to create a location on the hydraulically settable sheet where the sheet can be bent or folded. This creates a "hinge" within the sheet with far greater bendability and resilience than possible with an unscored or unperforated hydraulically settable sheet. In some cases multiple score cuts or perforations may be desirable.

Figure 26:
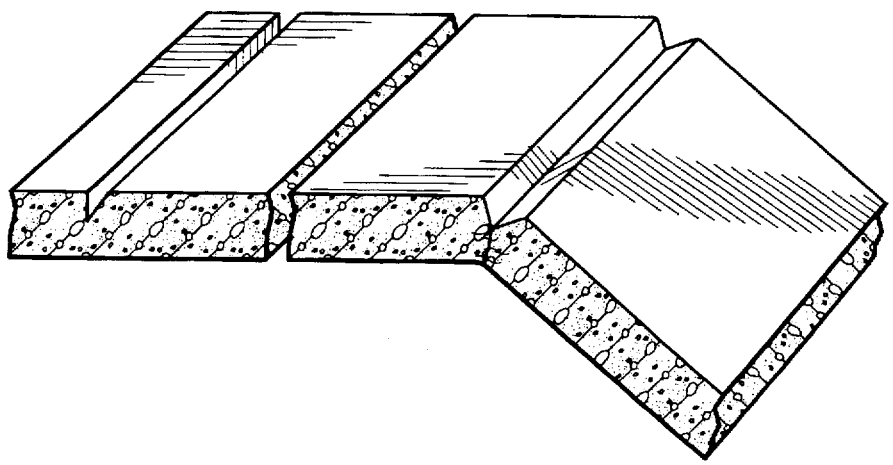
FIG. 26 is a perspective view showing how a sheet with a score cut more easily bends at the score cut.

Cutting a score line or perforation within the sheet creates a better fold line or hinge for a number of reasons. First, it provides a place where the sheet might more naturally bend or fold. Second, cutting a score makes the sheet at the score line thinner than the rest of the sheet, which reduces the amount of lengthwise elongation of the surface while bending the sheet. The reduction of surface elongation reduces the tendency of the structural matrix to fracture upon being folded or bent (FIG. 26). Third, the score cut or perforation allows for a controlled crack formation within the matrix in the event that fracture of the structural matrix occurs.

It may sometimes be preferable to concentrate more fibers at the place in which the score cut or perforation will be made. This can be accomplished by co-extruding a second layer of hydraulically settable material containing a higher fiber content at predetermined timed intervals to correspond with the location of the score cut or perforation. In addition, fibers can be placed on top of, or injected within, the sheet during the extrusion or calendering processes in order to achieve a higher fiber concentration at the desired location.

The hydraulically settable sheet will be preferably be in a substantially dry or semi-hardened state during the scoring or perforation process. This is desirable to prevent the score or perforation from closing up through the migration of moist material into the score cut. Since scoring generally (and perforation always) involves cutting through a portion of the structural matrix, the sheet can even be totally dry without the scoring or perforation process harming the sheet. However, in cases where a score is pressed rather than cut into the sheet surface, the sheet should be moist enough to prevent fracture due to the dislocation of the structural matrix.

The depth of the score cut will generally depend on the type of score, the thickness of the hydraulically settable sheet, and the degree of bending along the score line. The scoring mechanism should be adjusted to provide for a score of the desired depth. Of course, the die tap should not be so large as to actually cut through the sheet or render it too thin to withstand the anticipated forces (unless an easily tearable score is desired). Preferably, the score cut should be just deep enough to adequately serve its purpose. A combination of score cuts on alternative sides of the sheet may be preferred in some cases to increase the range of bending motion.

In most cases where a thinner sheet (<1 mm) is being score cut, the cut will have a depth relative to the thickness of the sheet that is within the range from between about 10% to about 50%, more preferably within the range from between about 20% to about 355. In the case of thicker sheets, the score cut will usually be deeper due to the decrease in bendability of the thicker sheet.

It should be understood that the hydraulically settable sheets of the present invention will bend away from a score cut or perforation, while bending toward a score that is pressed into the surface of the sheet. That is, the sides of the sheet defined by a score cut or perforation will close together in the side opposite the score cut or perforation. Conversely, like paper or cardboard products, the sides of the hydraulically settable sheet defined by a score pressed into the sheet surface will close together on the side of the score.

H. Other Processes.

It may be desirable to apply print or other indicia on the surface of the sheet such as a watermark, company identification mark, logo, or trademark. This can be accomplished using printing means known in the art of printing paper or cardboard products. Because the sheets have a relatively high porosity like paper or cardboard, the applied ink will tend to dry rapidly. In addition, decals, labels or other indicia can be attached or adhered to the hydraulically settable sheet using methods known in the art.

Figure 27:
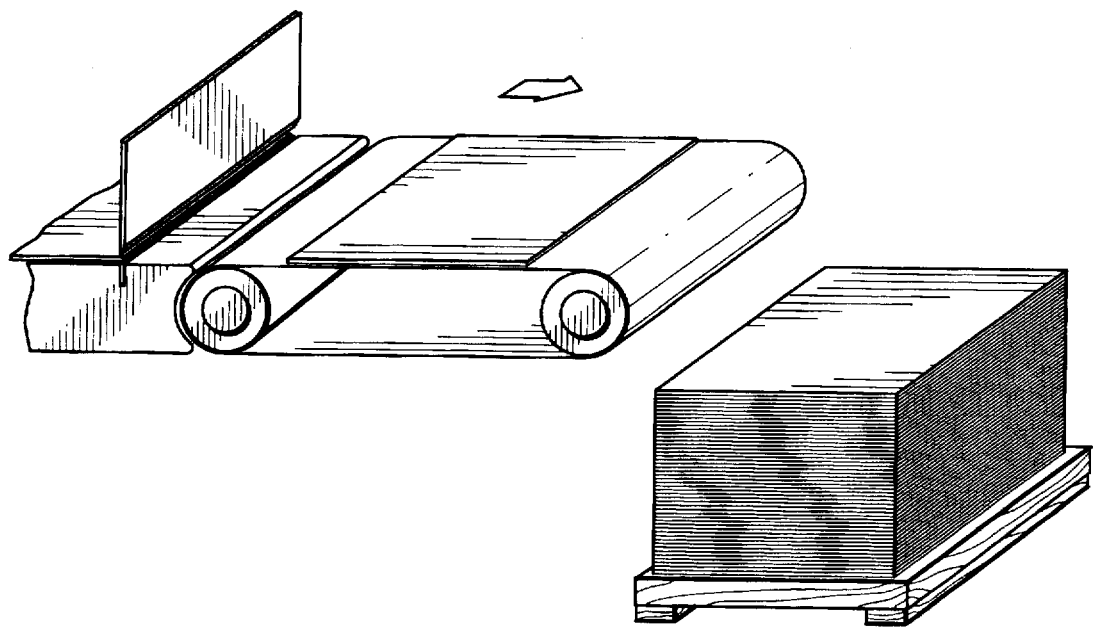
FIG. 27 is a perspective view showing a continuous sheet being cut and stacked as individual sheets.

Finally, the substantially hardened sheets can be immediately used to form containers, printed materials, or other objects, or they may be stored until needed such as, for example, by winding the sheets into a spooler 90 (FIG. 1) or cutting and stacking individual sheets into a pile (FIG. 27).

The hydraulically settable sheets made according to the processes set forth above can then be used just like paper or cardboard and can be fashioned into an endless variety of containers or other useful objects. One particularly valuable use of the sheets of the present invention is in the manufacture of disposable food or beverage containers used in the fast food industry. Such containers can be manufactured at a fraction of the cost of comparable containers made from paper or polystyrene. In addition, such containers are far more environmentally friendly because they readily decompose into mainly common inorganic substances found naturally within the earth. The organic components such as fibers or rheology-modifying agents are readily biodegradable and, in any event, comprise only a fraction of the overall mass of the containers made from the sheets of the present invention.

III. Examples of the Preferred Methods of Manufacture

To date, numerous tests have been performed comparing the properties of sheets of varying thickness using a number of mix designs and sheet forming techniques. The following examples are presented in order to more specifically teach the method of forming sheets according to the present invention.

In the earlier examples, hydraulically settable mixtures were molded into relatively thick-walled sheets (2–4 mm) in order to create plate-like objects having relatively high insulation ability. The goal of these earlier experiments was primarily to discover mix designs which would yield strong, yet highly insulative plates and other food or beverage container products. Nevertheless, during the course of these early tests it was discovered that hydraulically settable mixtures could be formed into thinner, stronger, more flexible sheets than what was previously thought. Later examples using more refined mix designs yielded greatly improved hydraulically settable sheets.

EXAMPLES 1–4

Hydraulically settable sheets were formed from the following cementitious mixtures containing hollow glass spheres (diameter <100 microns) as the aggregate in order to form lightweight plate-like objects.

| Example | Cement | Water   | Tylose ® FL 15002 | Glass Spheres |
|---------|--------|---------|-------------------|---------------|
| 1       | 4 kg   | 2.18 kg | 200 g             | 445 g         |
| 2       | 3 kg   | 1.85 kg | 150 g             | 572 g         |
| 3       | 2 kg   | 1.57 kg | 100 g             | 857 g         |
| 4       | 1 kg   | 1.55 kg | 100 g             | 905 g         |

The cementitious mixtures were prepared by first combining the hydraulic cement, Tylose®, and water together using a high shear mixer for 5 minutes. Thereafter, the glass spheres were added and mixed for 5 minutes using a low shear mixer. The resultant cementitious mixtures in Examples 1–4 had water to cement ratios of approximately 0.55, 0.62, 0.79, and 1.58, respectively. Even with the high water to cement ratio of Example 4, the cementitious mixture was form stable in the green state and readily moldable. The percentage by weight of the glass spheres in each of Examples 1–4 was 6.5%, 10.3%, 18.9%, and 25.3%, respectively.

The cementitious mixtures were formed into relatively thick sheets having a thickness ranging from 2.0–4.0 mm. The resulting sheets were extremely lightweight, having densities in the range from about 0.25 to 0.5. Tests showed that these extremely lightweight materials were highly insulating. In fact, 2.0 mm thick sheets were placed in an oven at 150° C. for three hours; thereafter, they could be removed by hand. This means that the surface temperature was significantly less than 60° C., which may be due to the relatively low specific heat of the lightweight hydraulically settable materials made in these examples.

EXAMPLES 5–8

The cementitious mixtures of Examples 1–4 were altered by adding varying amounts of abaca fiber, which were blended in during the high shear mixing step.

| Example | Corresponding Example | Amount of Abaca fiber |
|---|---|---|
| 5 | 1 | 149 g |
| 6 | 2 | 152 g |
| 7 | 3 | 180 g |
| 8 | 4 | 181 g |

The resultant percentage by weight of the abaca fibers in Examples 5–8 was 2.1%, 2.7%, 3.8%, and 4.8%, respectively. These hydraulically settable sheets formed therefrom were as lightweight and insulative as those made in Examples 7–10, but were much tougher and had a higher fracture energy. In addition, adding more fibers made the sheets somewhat more flexible, which would make them more useful in, e.g., containers having hinged flaps or other closure mechanisms. Hence, this example demonstrated that the use of abaca fibers, as well as other types of fibers, allowed the formation of hydraulically settable sheets having more flexibility, ductility, and toughness than what was previously thought possible.

EXAMPLES 9–11

Hydraulically settable sheets were prepared using the mix design and procedures set forth in Example 1 (i.e., 4 kg of portland white cement), with the exception that aluminum powder (<100 mesh) and NaOH were added to the cementitious mixtures in the following amounts:

| Example | Aluminum | NaOH |
|---|---|---|
| 9 | 4 g | 21.9 g |
| 10 | 6 g | 34.7 g |
| 11 | 8 g | 34.7 g |

The NaOH was added to the cementitious mixture to activate the aluminum by establishing a pH in the preferable range of about 13.1–13.8. In addition, the molded plate-like sheets were heated to about 80° C. for 30–60 minutes. This resulted in a final hardened material with increased porosity, decreased bulk density, and higher insulation ability. It was also shown that the rate and extent of the reaction of aluminum metal can be altered by adjusting the amount of aluminum and heat that are added. As more of each is added, the material becomes lighter, fluffier and softer, making good cushioning material.

It is important to note that shrinkage cracks were not observed in the sheets of Examples 9–11, even though the cementitious mixtures were heated and much of the water was driven off rapidly.

EXAMPLES 12–14

Hydraulically settable sheets were formed from cementitious mixtures containing 4 kg of portland white cement, 1.4 kg of water, and 40 g of Tylose® FL 15002, along with the following amounts of aluminum, NaOH, and abaca fibers, in order to form lightweight plate-like objects:

| Example | Aluminum | NaOH | Abaca Fibers |
|---|---|---|---|
| 12 | 10.0 g | 22.3 g | 60 g |
| 13 | 15.0 g | 22.3 g | 60 g |
| 14 | 22.5 g | 22.3 g | 60 g |

The cementitious mixtures were prepared substantially according to the procedures set forth in Example 1, with the exception that fibers rather than hollow glass spheres added. Like the cementitious mixtures of Examples 9–11, these materials were extremely lightweight and are very insulative because of the amount of air that was incorporated into the hydraulically settable mixtures. However, the hydraulically settable sheets of these examples have increased toughness and fracture energy because of the addition of the fibers.

EXAMPLES 15–18

Hydraulically settable sheets were formed from cementitious mixtures containing 4 kg of portland white cement, 1.96 kg of water, 200 g of Tylose® FL 15002, and 60 g of abaca fiber, along with the following amounts of aluminum, NaOH, and hollow glass spheres, in order to form lightweight plate-like objects:

| | Glass Spheres | | | | |
|---|---|---|---|---|---|
| Example | Fine | Medium | Coarse | Aluminum | NaOH |
| 15 | 133 g | 317 g | 207 g | 4.0 g | 19.7 g |
| 16 | 133 g | 317 g | 207 g | 6.0 g | 31.2 g |
| 17 | 133 g | 317 g | 207 g | 8.0 g | 31.2 g |
| 18 | 133 g | 317 g | 207 g | 0.0 g | 0 g |

The cementitious mixtures were prepared substantially according to the procedures set forth in Examples 9–11, with the exception that hollow glass spheres having three different diameters were used. The average diameter of the hollow glass spheres designated as "fine" was 30 microns; of the "medium" was 47 microns; and of the "course" was 67 microns. The percentage by weight of the total amount of glass spheres in each of the cementitious mixtures of Examples 15–17 was 2.1%. Of course, Example 18 does not incorporate aluminum and NaOH.

The hydraulically settable sheets formed therefrom were relatively thick, (2.5 mm), were extremely lightweight (specific gravity<0.7) and were very insulative because of the amount of air and the effective packing of the glass balls incorporated into the mixtures. The cementitious mixtures of these examples demonstrated the value of packing the aggregates in order to maximize their effect in the resultant composition. While the cementitious mixture of Example 18 is a good composition for many circumstances, its insulative capabilities are not as great as the cementitious mixtures of Examples 15–17.

EXAMPLES 19–20

Cementitious mixtures containing the following components were used to make hydraulically settable sheets:

| Example | Cement | Water | Tylose® FL 15002 | Abaca Fibers | Surfactant |
| --- | --- | --- | --- | --- | --- |
| 19 | 10 kg | 23.0 kg | 300 g | 200 g | 300 g |
| 20 | 10 kg | 20.0 kg | 300 g | 200 g | 300 g |

In these examples, microfine cement was utilized to make the hydraulically settable sheets. The cementitious mixtures were made by mixing the components for about 10 minutes in a high energy mixer of the type discussed above, which is available from E. Khashoggi Industries. This high energy and high speed mixer introduced significant amounts of air into the cementitious mixtures; this air was entrained within the cementitious mixture by use of the surfactant and stabilized by the Tylose®. The resulting cementitious mixtures were passed between a pair of rollers and formed into relatively thin sheets (1 mm). The sheets were more quickly dried by passing them through a heat tunnel. These sheets had a specific gravity of between 0.25 and 0.4.

The sheets were subsequently scored, folded into the shape of a cereal box, and glued together using adhesive techniques known in the art. From these examples it was learned that scoring relatively thin hydraulically settable sheets allowed the sheets to be folded or bent much like paper or cardboard products of the same general thickness.

EXAMPLES 21-22

Cementitious mixtures containing the following components were used to make hydraulically settable sheets:

| Example | Cement | Water | Tylose® FL 15002 | Graphite Fibers | Surfactant |
| --- | --- | --- | --- | --- | --- |
| 21 | 4.23 kg | 8.1 kg | 120 g | 260 g | 135 g |
| 22 | 10.0 kg | 20.0 kg | 300 g | 300 g | 300 g |

In these examples, microfine cement was utilized. Like the products of Examples 19 and 20, the hydraulically settable mixtures of these examples were made by mixing the components for about 10 minutes in a high shear mixer of the type discussed above. This high speed mixer introduced significant amounts of air into the cementitious mixtures; this air was entrained within the cementitious mixture by the surfactant.

However, due to the graphite fibers, the mixture was not as easily foamed and was not as lightweight and insulative as materials containing no graphite fibers. The resulting cementitious mixtures were passed between a pair of rollers and formed into relatively thin sheets (1 mm), which were subsequently scored, folded into the shape of a cereal box, and glued together using adhesive techniques known in the art.

EXAMPLE 23

A hydraulically settable plate-like sheet was formed from a cementitious mixture and using the procedure set forth in Example 19, with the exception that about 1.2 kg of glass spheres was added to the "foamed" mixture of cement, water, and Tylose®. The resultant sheet (2 mm thick) had an insulative ability not significantly different from standard polystyrene foam plates. The plate-like sheet made in this example was placed in an oven for three hours at 150° C. and could still be removed with bare fingers.

EXAMPLE 24

Relatively thin hydraulically settable sheets were formed by molding a cementitious mixture which included the following:

| | |
| --- | --- |
| Portland White Cement | 1.0 kg |
| Water | 2.5 kg |
| Tylose® FL 15002 | 200 g |
| Hollow Glass Spheres (<100 microns) | 1.0 kg |
| Abaca Fiber | 10% by volume |

The cementitious mixture was made by prewetting the abaca fiber (which was pretreated by the manufacturer so that greater than 85% of the cellulose is α-hydroxycellulose) and then adding the excess water and the fibers to a mixture of Tylose® and portland cement. This mixture was mixed at a relatively high speed for about 10 minutes, and then at a relatively slow speed for 10 minutes after the hollow glass spheres were added. The resulting cementitious mixture had a water to cement ratio of approximately 2.5.

This mixture was passed between a pair of rollers and formed into relatively thin sheets having a thickness of about 1 mm. Wet sheets were scored and then folded in an attempt to create a box. However, there was a fair amount of splitting and a box with sufficient strength and integrity could not be formed.

Thereafter, sheets were first allowed to harden and then were scored, folded into the shape of a box, and glued together by cementing or gluing methods well-known in the paper art. The amount of splitting at the fold was negligible, which demonstrated that it is preferable to score and then fold the thin sheets after they have been allowed to harden or solidify somewhat. The thin sheets were formed into a box that had the shape, look and weight of a dry cereal box presently manufactured from cardboard stock.

EXAMPLE 25

The dried sheets formed in Example 24 were cut into the appropriate shape, rolled to form a cup, and glued using adhesive means known in the art. Examples 24 and 25 demonstrate that it is possible to make boxes, cups, or other containers of similar shape presently made from cardboard, paper, or plastic.

The following examples demonstrate that highly flexible hydraulically settable sheets having high toughness and strength can be manufactured. They are useful in containment applications where cushioning and flexibility are of particular interest.

EXAMPLES 26-30

Flexible, cushioning sheets were formed from cementitious mixtures containing the following:

| Example | Plastic Spheres | Cement | Water | Tylose® |
| --- | --- | --- | --- | --- |
| 26 | 0.12 kg | 1.0 kg | 2.0 kg | 0.1 kg |
| 27 | 0.1213 kg | 0.8 kg | 2.0 kg | 0.1 kg |
| 28 | 0.1225 kg | 0.6 kg | 2.0 kg | 0.1 kg |
| 29 | 0.1238 kg | 0.4 kg | 2.0 kg | 0.1 kg |
| 30 | 0.1251 kg | 0.2 kg | 2.0 kg | 0.1 kg |

The "plastic spheres" are made from polypropylene and have average particle sizes less than 100 microns and an average density of 0.02 g/cm$^3$. The cementitious mixtures were mixed and then formed into sheets according to the procedure set forth in Example 24. The hydraulically settable sheets were relatively strong and very flexible compared to previous mix designs. The compressive strength of the plate made according to Example 26 was 2 MPa and the tensile strength was 1 MPa. The surprising feature is that the compressive and tensile strengths are of the same magnitude, which is very unusual for most cement products. Usually the compressive strength is far greater than tensile strength. As less cement is added, the compressive and tensile strengths decrease in increments, with the plate of Example 30 having a tensile strength of 0.5 MPa.

These packaging materials could be physically compressed without crumbling like their nonflexible, hydraulically settable counterparts in earlier examples, even when subject to forces that were greater than forces normally experienced by polystyrene containment materials. The flexible hydraulically settable materials were alternatively extruded into the shape of rectangular shaped bars, which more dramatically demonstrated the degree of flexibility made possible by this mixture.

The densities of the hydraulically settable packaging materials made in these examples ranged between 0.1 and 0.6 g/cm$^3$, with the density decreasing as less cement is used.

EXAMPLES 31–35

Flexible hydraulically settable sheets were made according to Examples 26–30, except that prewetted abaca fibers were added to the cementitious mixture in the following amounts, as measured by unit volume:

| Example | Abaca Fiber |
| --- | --- |
| 31 | 2% |
| 32 | 4% |
| 33 | 6% |
| 34 | 8% |
| 35 | 10% |

The fibers were well-dispersed throughout the hydraulically settable mixture using a high shear mixer. The resulting hydraulically settable sheets made therefrom had substantially the same densities and flexibilities as those in Examples 26–30, but with increasing tensile strengths as the amount of abaca fiber was increased. The tensile strengths of the materials formed herein ranged up to 5 MPa.

EXAMPLE 36

Hydraulically settable containers are formed using any of the compositions and procedures set forth in Examples 26–35, except that the plastic balls are concentrated near the surface of the cementitious mixture, yielding a molded material in which the plastic balls are concentrated at or near the surfaces of the final hardened product. The sheets and containers formed therefrom have a higher concentration of plastic balls near the surface of the cement matrix where flexibility is more important, and virtually no plastic balls in the center of the objects where flexibility is less important. The advantage of this is greater flexibility at the surfaces with the same amounts or less of plastic balls in the overall compositions. At the same time, the rigidity of the center of the container walls makes them as durable and tough as the more rigid containers above.

EXAMPLE 37

Using any of the foregoing compositions, corrugated hydraulically settable sheets containing a fluted inner structure sandwiched between two flat sheets are formed. The flat outer sheets are formed by calendering a sheet of the material into a flat sheet of the appropriate thickness. The corrugated, or fluted inner sheet (which is similar to the fluted or corrugated inner sheet of an ordinary cardboard box) is formed by passing either a hardened or remoistened flat hydraulically settable sheet of the appropriate thickness through a pair of rollers with intermeshing corrugated surfaces or teeth.

Glue is applied to the surfaces of the corrugated sheet, which is then sandwiched between two flat sheets and allowed to harden.

EXAMPLE 38

Using any of the foregoing compositions, a hydraulically settable sheet is molded and then fashioned into the shape of a carton. Depending on the composition, the carton will exhibit high strength, durability, flexibility, low weight, and/or low density.

EXAMPLE 39

Using any of the foregoing compositions, a hydraulically settable sheet is molded and then fashioned into the shape of a lid. Depending on the composition, the lid will exhibit high strength, durability, flexibility, low weight, and/or low density.

EXAMPLE 40

Using any of the foregoing compositions, a hydraulically settable sheet is molded and then fashioned into the shape of a partition. Depending on the composition, the partition will exhibit high strength, durability, flexibility, low weight, and/or low density.

EXAMPLE 41

Using any of the foregoing compositions, a hydraulically settable sheet is molded and then fashioned into the shape of a liner. Depending on the composition, the liner will exhibit high strength, durability, flexibility, low weight, and/or low density.

EXAMPLE 42

Using any of the foregoing compositions, a hydraulically settable sheet is molded and then fashioned into the shape of a box. This may be carried out by extrusion, and/or calendering, and/or score cutting, and/or folding. Depending on the composition, the box will exhibit high strength, durability, flexibility, low weight, and/or low density.

In the following examples, very thin sheets were formed (0.1–0.5 mm) which had many characteristics and properties which made them suitable for use much like paper, cardboard, plastic, polystyrene, or metal sheets of similar thickness and weight. The desired properties were designed into the sheets using a microstructural engineering approach. This allowed for the manufacture of sheets having a variety of desirable properties, including properties not generally possible using mass-produced sheet-like objects presently manufactured from the foregoing materials.

EXAMPLES 43–60

Sheets capable of being formed into a variety of objects (including food and beverage containers) were manufactured from a moldable cementitious mixture which contained the following components:

| Portland Cement | 1.0 kg |
| --- | --- |
| Perlite | 0.5 kg |
| Mica | 0.5 kg |
| Fiber (Southern pine) | 0.25 kg |
| Tylose® FL 15002 | 0.2 kg |
| Water | 2.5 kg |

The portland cement, mica, fiber, Tylose®, and water were mixed together in a high shear mixer for 5 minutes, after which the perlite was added and the resulting mixture mixed for an additional 5 minutes in a low shear mixer. The cementitious mixture was then placed into an auger extruder and extruded through a die having an opening in the shape of a slit. Continuous sheets having a width of 300 mm and a thickness of 6 mm were extruded.

The sheets were thereafter passed between one or more pairs of reduction rollers in order to obtain sheets having final thicknesses of 0.2 mm, 0.25 mm, 0.3 mm, 0.35 mm, 0.4 mm, 0.45 mm, and 0.5 mm, respectively. The rollers had a diameter of 17 cm and were made of stainless steel coated with polished nickel to aid in preventing the cementitious mixture from sticking to the rollers. In addition, the rollers were heated to a temperature of 110° C. to further prevent sticking between the mixture and the rollers.

In order to obtain sheets having the desired thickness, the extruded sheets were reduced in steps by using reduction roller pairs having progressively smaller gap distances between the rollers. The sheet thicknesses were reduced as follows:

6 mm→2 mm→0.5 mm→final thickness
 (0.45 mm, 0.4 mm, 0.35 mm, 0.3 mm, 0.25 mm, or 0.2 mm)

A combination of the extrusion process and the calendering process yielded sheets with substantially unidirectionally oriented fibers along the length (or direction of elongation) of the sheet. Because of this, the sheets had higher tensile strength in the lengthwise direction (10–12 MPa) compared to the widthwise direction (5–6 MPa).

The hardened hydraulically settable sheets were finished, coated, and then formed into a number of different food and beverage containers. For example, a "cold cup" (such as those in which cold soft drinks are dispensed at fast food restaurants) was made by cutting an appropriate shape from a sheet, rolling the shape into the shape of a cup, adhering the ends of the rolled sheet using conventional water-based glue, placing a disc at the bottom of the cup and then crimping the bottom of the rolled wall portion in order to hold the bottom in place, and curling the rim of the cup to strengthen the rim and create a smoother drinking surface. Sheets having thicknesses of 0.3 mm and 0.4 mm were used to make the cups.

The amount of deflection when applying a constant force 1 inch below the rim was comparable to conventional paper cups. The uncoated hydraulically settable cups did not leak when an aqueous solution containing methylene blue and 0.1% surfactant was placed inside the cup for 5 minutes. Of course, any leakage that may occur could be prevented by an appropriate coating.

A "clam shell" container (such as those presently used in the fast food industry to package hamburgers) was made by cutting an appropriate shape from a sheet, score cutting the sheet to form the desired fold lines, folding the sheet into the shape of a clam shell container, and adhering the ends of the folded sheet (using both adhesive and interlocking flap means) to preserve the integrity of the container. Sheets having thicknesses of 0.4 mm and 0.5 mm were used to make the clam shell containers.

The sheet was found to more easily bend or close together on the side of the sheet opposite the score cut. It should be noted that normal scores in conventional materials generally allow the sheet to more easily bend or close together on the side of the score. The resulting clam shell containers exhibited comparable or superior insulating ability compared to paper clam shells.

A french fry container (such as those used to serve cooked french fries in the fast food industry) was made by cutting an appropriate shape from a sheet, score cutting the sheet to form the desired fold lines, folding the sheet into the shape of a french fry container, and adhering the ends of the folded sheet using adhesive means to preserve the integrity of the container. Sheets having thicknesses of 0.25 mm, 0.3 mm, 0.35 mm, 0.4 mm, 0.45 mm, and 0.5 mm were used to make the french fry containers.

A frozen food box (such as those used by supermarkets to package frozen foods such as vegetables or french fries) was made by cutting an appropriate shape from a sheet, score cutting the sheet to form the desired fold lines, folding the sheet into the shape of a frozen food box, and adhering the ends of the folded sheet using adhesive means to preserve the integrity of the box. Sheets having thicknesses of 0.25 mm, 0.3 mm, 0.35 mm, 0.4 mm, 0.45 mm, and 0.5 mm were used to make the frozen food boxes.

A cold cereal box was made by cutting an appropriate shape from a 0.3 mm thick sheet, score cutting the sheet to form the desired fold lines, folding the sheet into the shape of a cold cereal box, and adhering the ends of the folded sheet using adhesive means to preserve the integrity of the cereal box.

A straw was made by rolling a piece of a 0.25 mm sheet into the form of a straw and adhering the ends together using adhesion means known in the art. In making the straw, as in making each of the containers set forth above, it was advantageous to remoisten the sheet somewhat in order to temporarily introduce a higher level of flexibility into the sheet. This minimized splitting and tearing of the sheet. Nevertheless, the cup could be rolled and crimped without the remoistening of the sheet without visible tearing and splitting.

The containers were found to break down in the presence of water over time, with 1 day being the average time of disintegration. The excess waste material that was trimmed from the sheets when making the containers was easily recycled by simply breaking it up and mixing it back into the hydraulically settable mixture.

The various containers that were made are set forth as follows, including the thickness of the sheet used to make each container:

| Example | Container | Sheet Thickness |
| --- | --- | --- |
| 43 | cold cup | 0.3 mm |
| 44 | cold cup | 0.4 mm |
| 45 | clam shell | 0.4 mm |
| 46 | clam shell | 0.5 mm |
| 47 | french fry box | 0.25 mm |
| 48 | french fry box | 0.3 mm |
| 49 | french fry box | 0.35 mm |
| 50 | french fry box | 0.4 mm |
| 51 | french fry box | 0.45 mm |
| 52 | french fry box | 0.5 mm |
| 53 | frozen food box | 0.25 mm |
| 54 | frozen food box | 0.3 mm |
| 55 | frozen food box | 0.35 mm |
| 56 | frozen food box | 0.4 mm |
| 57 | frozen food box | 0.45 mm |

-continued

| Example | Container | Sheet Thickness |
| --- | --- | --- |
| 58 | frozen food box | 0.5 mm |
| 59 | cold cereal box | 0.3 mm |
| 60 | drinking straw | 0.25 mm |

EXAMPLE 61

The hydraulically settable sheets used to manufacture the containers in Examples 43–60 were printed using conventional printing presses used to print conventional paper sheets. The ink was able to dry as fast or faster compared to when using conventional paper sheets. The printed sheets could then be formed into any of the containers listed above the same as without being printed.

EXAMPLE 62

A printed hydraulically settable sheet obtained in Example 61 was formed into the shape of a cup according to the procedure set forth in Example 43, except that the top rim was treated with a mineral oil lubricant prior to the step of curling the top of the cup. Nevertheless, as above, curling was possible without mineral oil. The cup had all of the necessary properties of weight, strength, and water resistance for commercial use in the fast food industry, as well as including identifying information.

EXAMPLE 63

Clam shell containers were made using the sheets made according to Examples 43–60. The sheets were tested to determine the optimum score cut depth which would allow for the easiest bend, while at the same time leaving a hinge with the highest strength and resilience. Score depths ranging between 20% to 50% were tested, with a score depth of 25% yielding the best results. In addition, it was found that thicker sheets (0.4–0.5 mm) gave a better score and yielded a stronger, more rigid clam shell container.

EXAMPLE 64

A clam shell was made using the sheets of Examples 43–60, except that a triple reverse hinge was used. That is, a series of three score cuts were cut into the outer side of the claim shell container. Because this decreased the distance that each individual score line had to bend, the resulting hinge could be opened and closed more times without breaking compared to a single score cut hinge.

EXAMPLE 65

Cold cups made according to Examples 43 and 44 were passed through a commercial wax coating machine, whereby a uniform layer of wax was applied to the surface. The layer of wax completely sealed the surface of the cup to moisture and rendered it watertight.

EXAMPLE 66

Cold cups made according to Examples 43 and 44 were coated with an acrylic coating using a fine spraying nozzle. As did the wax in Example 65, the layer of acrylic coating completely sealed the surface of the cup to moisture and rendered it watertight. However, the acrylic coating had the advantage that it was not as visible as the wax coating. Because a thinner acrylic coating was possible, the cup looked almost as if it were uncoated. The glossiness of the cup could be controlled by using different types of acrylic coatings.

EXAMPLE 67

Cold cups made according to Examples 43 and 44 were coated with a commercially used melamine coating using a fine spraying nozzle. As in Examples 65 and 66, the layer of melamine coating completely sealed the surface of the cup to moisture and rendered it watertight. However, the melamine coating was also less visible and could be applied in a thinner coat compared to the wax coating. The glossiness of the cup could be controlled by using different types of melamine coatings.

EXAMPLE 68

Cold cups made according to Examples 43 and 44 were coated with a totally environmentally sound coating consisting of a mixture of hydroxymethylcellulose plasticized with polyethylene glycol. This coating completely sealed the surface of the cup to moisture and rendered it watertight. However, the surface looked even more natural and less glossy compared to cups coated with wax, acrylic, or melamine.

EXAMPLES 69–72

Clam shell containers made according to Examples 45 and 46 were alternatively coated with the same coating materials used to coat the cold cups in Examples 65–68. The results were substantially identical to those achieved with the coated cups.

| Example | Coating Material |
| --- | --- |
| 69 | wax |
| 70 | acrylic |
| 71 | melamine |
| 72 | plasticized hydroxymethylcellulose |

EXAMPLES 73–76

French fry containers made according to Examples 47–52 were alternatively coated with the same coating materials used to coat the cold cups in Examples 65–68. The results were substantially identical to those achieved with the coated cups.

| Example | Coating Material |
| --- | --- |
| 73 | wax |
| 74 | acrylic |
| 75 | melamine |
| 76 | plasticized hydroxymethylcellulose |

EXAMPLES 77–80

Frozen food containers made according to Examples 53–58 were alternatively coated with the same coating materials used to coat the cold cups in Examples 65–68. The results were substantially identical to those achieved with the coated cups.

| Example | Coating Material |
|---|---|
| 77 | wax |
| 78 | acrylic |
| 79 | melamine |
| 80 | plasticized hydroxymethylcellulose |

EXAMPLES 81–84

Cold cereal boxes made according to Example 59 were alternatively coated with the same coating materials used to coat the cold cups in Examples 65–68. The results were substantially identical to those achieved with the coated cups.

| Example | Coating Material |
|---|---|
| 81 | wax |
| 82 | acrylic |
| 83 | melamine |
| 84 | plasticized hydroxymethylcellulose |

EXAMPLES 85–88

Drinking straws made according to Example 60 are alternatively coated with the same coating materials used to coat the cold cups in Examples 65–68. The results are substantially identical to those achieved with the coated cups with regard to the outer surface of the straws, although it is more difficult to adequately coat the inside of the straw in this manner.

| Example | Coating Material |
|---|---|
| 85 | wax |
| 86 | acrylic |
| 87 | melamine |
| 88 | plasticized hydroxymethylcellulose |

EXAMPLE 89

The same mix design set forth in Examples 43–60 was used to manufacture sheets of varying thickness between 0.25 mm and 0.5 mm. The mixing, extrusion, and calendering processes were in every way the same. Dry sheets of each thickness were cut into circular shapes and formed into a paper plate using a commercial mechanical press fitted with a progressive die used to make such plates out of paper stock. The details of the stamped hydraulically settable plates stood out perfectly and were substantially similar in shape, strength and appearance compared to conventional paper plates. However, the hydraulically settable plates were found to be more rigid than conventional paper plates and, hence, possess more structural integrity when food is placed on or within the plates.

EXAMPLE 90

Dry sheets obtained in Example 89 were first wetted to contain 5% additional water by weight of the initially dry sheet before they were pressed into plates (keeping in mind that the apparently "dry" sheets contain water within the hydraulically settable structural matrix even when they feel dry and possess maximum stiffness). The added water helped the sheets become more flexible (i.e., higher elongation before rupture) which resulted in a plate that had a better impression and detail compared to conventional paper plates formed by the same process. The press was heated to 200° C. and the extra water evaporated during the very short press time (<1 sec) through vent holes in the heated mold, yielding a dry product of higher stiffness than paper.

EXAMPLE 91

Dry sheets obtained in Example 89 were first wetted to contain 10% additional water by weight of the initially dry sheet before they were pressed into plates. The added water helped the sheets become even more flexible, although the impressions and detail were comparable to the results of Example 90. As a result of adding extra water, the molding took a little more time in order to drive off the extra water and form a plate that was substantially dry. It was found that the molding time could be reduced by increasing the temperature of the mold. The final product was stiffer than comparable paper plates.

EXAMPLE 92

Dry sheets obtained in Example 89 were first wetted to contain 20% additional water by weight of the initially dry sheet before they were pressed into plates. The added water helped the sheets become even more flexible than the sheets in Example 91 to the point where the molding process could be classified as a wet sheet molding process rather than dry sheet stamping. The resulting product was superior to a paper stamping process because there were no fold lines whatsoever in the pressed material. The final product was stiffer than comparable paper plates.

EXAMPLE 93

Dry sheets obtained in Example 89 were first wetted to contain 30% additional water by weight of the initially dry sheet before they were pressed into plates. The added water helped the sheets become slightly more flexible than the sheets in Example 92, although the molding process and results were similar. The resulting product was superior to a paper stamping process because there were no fold lines whatsoever in the pressed material. Because of the extra water, the molding process took a little longer than when less water was used to moisten the sheets. Heating the molds to a higher temperature was found to reduce molding times. The final product was stiffer than comparable paper plates.

EXAMPLE 94

The processes of Examples 89–93 were repeated in every way except that a commercial acrylic coating was applied to one side of the sheets prior to their being pressed into plates as above. In the case where a sheet was remoistened, the water was sprayed on the side opposite the side onto which the coating was placed. The coating provided the plates with a glossier surface and rendered them more water resistant.

EXAMPLE 95

The processes of Examples 89–93 were repeated in every way except that a commercial polyethylene coating was applied to one side of the sheets prior to their being pressed into plates as above. In the case where a sheet was remoistened, the water was sprayed on the side opposite the side onto which the coating was placed. The coating provided the plates with a glossier surface and rendered them more water resistant.

EXAMPLES 96–102

The processes set forth in Examples 89–95 were repeated except that the sheets were pressed into the shape of a bowl using a conventional press used to manufacture disposable paper bowls from paper stock. The hydraulically settable bowls had a diameter of 15 cm and a depth of 3 cm. Because of the deeper impression and greater degree of bending and deformation necessary to form a bowl from a flat sheet, sheets having an added moisture content less than 10% yielded some defects. However, the use of at least 10% added water gave a good product with better impressions, no folding and a smoother surface compared to bowls made from paper.

| Example | Added Water | Coating |
|---|---|---|
| 96 | 0% | none |
| 97 | 5% | none |
| 98 | 10% | none |
| 99 | 20% | none |
| 100 | 30% | none |
| 101 | variable | acrylic |
| 102 | variable | polyethylene |

EXAMPLES 103–109

The molding processes set forth in Examples 89–95 were repeated except that the sheets were pressed into the shapes of a two part breakfast platter, including a top and bottom half. The top half had a length of 20 cm and a depth of 3.5 cm, while the bottom half had a length of 21 cm and a depth of 1.0 cm. Sheets having a thickness of 0.8 mm were used, yielding pieces which each weighed between 12–15 g. Although they were as similar in weight compared to existing breakfast platters used in the fast food industry, they were less flimsy.

The top and bottom halves were complementary in size and could be interlocked together to form a closed container using tabs on the sides of the top half and slots in the sides of the bottom half. The product was flexible enough that nonshattering failure occurred when crushed. Those that were coated exhibited a synergistic effect between the coating and the hydraulically settable structural matrix, wherein the product became stronger, tougher and more elastic before rupture due to the high elongation of the elastomeric coating.

| Example | Added Water | Coating |
|---|---|---|
| 103 | 0% | none |
| 104 | 5% | none |
| 105 | 10% | none |
| 106 | 20% | none |
| 107 | 30% | none |
| 108 | variable | acrylic |
| 109 | variable | polyethylene |

EXAMPLE 110

A two-part breakfast platter was manufactured using the mix design set forth in Examples 103–109, except that instead of drying and then rewetting the calendered sheet a wet sheet was directly molded into the shape of the breakfast platter. The wet sheet was readily molded and resulted in very few surface and structural defects. The breakfast platter made in this example had a thickness of 0.5 mm and possessed similar weight and insulation properties as the platter made in the previous examples.

EXAMPLE 111

Containers set forth above were placed in a microwave oven and tested for microwave compatibility; that is, they were tested to determine whether the containers themselves, or the food items within them, become hot when container and food were exposed to microwave radiation. Although the containers may have been expected to absorb some of the radiation and become hot in light of the water tied up within the hydraulically settable structural matrix, in fact, the containers themselves remained cool. Because of the low dielectric constant of the material, all of the energy was found to go into the food not the container.

For the same reason, steam which may have condensed onto the surface of the container during initial stages of the microwaving were found to quickly revaporize under further microwaving. Therefore, when the food container was opened, no condensed steam was found on the surface of the container after the microwave process. Any excess steam comes out when the container is opened, leaving food which looks and tastes better. This is in sharp contrast to polystyrene containers which tend to accumulate large amounts of condensed steam on the container surfaces, thereby rendering a "soggier," and hence less desirable, food product. In addition, polystyrene containers often melt if the food is heated too long.

The specific heats of the hydraulically settable materials of the present invention are relatively low, being about 0.9 J/g.K and having a low thermal constant within the range of 0.06–014 W/m.K. This allows for less thermal conductance from the food to the container during the microwave process. It was possible, therefore, to in all cases remove the container from the microwave without burning the hands. After the container was removed from the microwave oven it slowly warmed (by absorbing some of the heat within the food) but never become too hot to touch.

EXAMPLE 112

Flat paper sheets suitable for manufacturing a wide variety of food and beverage containers were manufactured from a hydraulically settable mixture containing the following:

| | |
|---|---|
| Portland Cement | 1.0 kg |
| Perlite | 0.3 kg |
| Hollow Glass Spheres (<0.1 mm) | 0.8 kg |
| Mica | 0.5 kg |
| Fiber (Southern pine) | 0.25 kg |
| Tylose® FL 15002 | 0.2 kg |
| Water | 2.6 kg |

The cement, mica, fiber, Tylose®, and water were mixed together in a high shear mixer for 5 minutes, after which the perlite and hollow glass spheres were added and the resulting mixture mixed using low shear. The mixture was extruded using an auger extruder and a die into a sheet 30 cm wide and 0.6 cm thick. The sheet was passed successively between pairs of heated rollers in order to reduce the thickness of the sheet to between 0.1 mm and 2 mm.

As a result of the lower specific surface area of the glass spheres (200–250 m$^2$/kg) compared to perlite, the mixture of Example 112 yielded a product with a more uniform thickness and improved surface finish compared to the mix design of Examples 43–60. The reduced specific surface area of the aggregates reduced the amount of moisture that was removed when contacting the heated calendering rollers. The material, therefore, remains more moldable, retains the optimum rheology, and results in less microdefects and more uniformity during the calendering process.

EXAMPLE 113

The sheets made according to Example 112 were cut, rolled, and glued into 10 oz. drinking cups using a commercial paper cup manufacturing machine. The cups were alternatively coated with a wax coating in order to render them more waterproof.

EXAMPLE 114

The mix design and molding processes of Examples 43–60 were repeated in every way except that the mica was substituted with 0.5 kg kaolin. The sheets made using this alternative mix design yielded sheets that had a glossier surface than where mica was used. The glossier surface resulted from the alignment of the smaller kaolin particles within the sheet surface when the sheet was successively passed between a pair of calendering rollers, which also acted like a pair of smoothing rollers.

EXAMPLE 115

The mix design and molding process of Example 114 were repeated in every way except that 1.0 kg of kaolin was used. The sheets that were molded using this increased amount of kaolin had a smoother surface finish than when only 0.5 kg kaolin was used.

EXAMPLE 116

The mix design and molding process of Example 114 were repeated in every way except that 1.5 kg of kaolin was used. The sheets that were molded using this increased amount of kaolin had a smoother surface finish than when only 0.5 kg or 1.0 kg of kaolin was used. However, the increase in kaolin yield a more brittle sheet. In addition, drying defects due to the increased specific surface area were somewhat problematic when passing the sheet between the reduction rollers.

EXAMPLE 117

The mix design and molding processes of Examples 43–60 were repeated in every way except that the perlite was excluded and the amount of mica was increased to 1.5 kg. The resulting sheets made using this alternative mix design had a smoother finish. However, the hydraulically settable structural matrix was more dense and more brittle. In addition, there was an increase in drying defects. The sheets could be rolled into cups but with minor surface defects in the form cracks. Also curling of the top was less successful than in Examples 43 and 44.

EXAMPLE 118

The mix design and molding process of Examples 43–60 were repeated in every way except that the amount of perlite was increased to 1.0 kg. The resulting sheets and containers made therefrom had a slightly lower density but slightly lower strength and toughness.

EXAMPLE 119

The mix design and molding process of Examples 43–60 were repeated in every way except that the amount of perlite was increased to 0.75 kg. The resulting sheets and containers made therefrom had a slightly lower density but slightly lower strength and toughness. However, the strength characteristics were somewhat better than when 1.0 kg of perlite was used, as in Example 118.

EXAMPLE 120

The mix design and molding process of Examples 43–60 were repeated in every way except that the amount of perlite was reduced to 0.25 kg. The resulting sheets and containers made therefrom had a higher fiber content, slightly higher density, but had greater strength and toughness.

EXAMPLE 121

The mix design and molding process of Examples 43–60 were repeated in every way except that perlite was eliminated from the mix design altogether. The resulting sheets and containers made therefrom had a slightly higher density, but had greater strength and toughness.

EXAMPLE 122

An insulating cup was manufactured by directly molding a hydraulically settable mixture that contained the following components:

| | |
|---|---|
| Portland cement | 1.0 kg |
| Hollow Glass Spheres (<1 mm) | 1.1 kg |
| Fiber (Southern Pine) | 0.08 kg |
| Tylose ® FL 15002 | 0.1 kg |
| Water | 2.5 kg |

The cement, fiber, Tylose® and water were mixed together for 5 minutes using a high shear mixer. Thereafter, the hollow glass spheres were added and the resulting mixture mixed for an additional 5 minutes in a low shear mixer. The resulting mixture had the consistency of a dough-like material and could be easily molded while retaining its shape while in the green state.

The mixture was molded using a male and female die pair into the shape of a cup. The mold dies were heated to a temperature of 110°–130° C. to prevent sticking. After demolding, the cup was self-supporting in the green state. The green cup was allowed to dry.

The cup had a compressive strength of 1.1 MPa, a tensile strength of 0.8 MPa, and a k-factor of 0.07 W/m.K.

EXAMPLE 123

The mix design and molding process of Example 122 was repeated in every way, except that the glass spheres were substituted with 1.1 kg of perlite. The resulting dried molded cup had a compressive strength of 8.0 MPa, a tensile strength of 3.2 MPa, and a k-factor of 0.14 W/m.K. Thus, the use of perlite instead of hollow glass spheres yields a cup with greatly increased tensile and compressive strength, but with a higher level of thermal conductivity.

EXAMPLE 124

The mix design and molding process of Example 122 was repeated in every way, except that glass spheres having carefully graded diameters were used in order to increase the particle packing efficiency of the hydraulically settable material. In particular 231 g of fine, 528 g of medium, and 341 g of course hollow glass spheres were included, for a total content of 1.1 kg. The average diameter of the hollow glass spheres designated as "fine" was 30 microns; of the "medium" was 47 microns; and of the "course" was 67 microns.

The mixture had better workability due to the decrease in interstitial spaces between the particles. The resulting cups had a smoother surface and slightly superior strength characteristics. The k-factor was 0.083 W/m.K (slightly higher than in Example 122) due to the slight decrease in interstitial space and increase in overall density of the material.

The following examples relate to tests that were performed in order to optimize the mix designs that would yield products having the preferred performance criteria. Although only sheets were made in the remaining test examples, it will be understood to one of ordinary skill in the art how such sheets could be formed into appropriate food or beverage containers using any of the methods (including the examples) set forth within the Specification. In addition, many of the mix designs could also have application in either direct molding or wet sheet molding food or beverage containers.

EXAMPLES 125–130

Hydraulically settable sheets having a thickness of 0.4 mm were manufactured according to the processes set forth in Examples 43–60 from a hydraulically settable mixture containing the following components:

| | |
|---|---|
| Portland Cement | 1.0 kg |
| Perlite | variable |
| Mica | 0.5 kg |
| Tylose ® FL 15002 | 0.2 kg |
| Fiber (Southern pine) | 0.25 kg |
| Water | variable |

The effect of adding varying amounts of perlite was studied to determine the effect on the properties of the material, particularly the strength properties of the hardened sheet. Because of the water-absorbing behavior of perlite, it was necessary to decrease the amount of water as the amount of perlite was decreased in order to maintain the same level of rheology and workability.

| Example | Perlite | Water |
|---|---|---|
| 125 | 0.5 kg | 2.15 kg |
| 126 | 0.4 kg | 2.05 kg |
| 127 | 0.3 kg | 1.85 kg |
| 128 | 0.2 kg | 1.65 kg |
| 129 | 0.1 kg | 1.50 kg |
| 130 | 0.0 kg | 1.40 kg |

The extrusion and calendering processes had the effect of longitudinally orienting the fibers in a substantially unidirectional manner. Therefore, the sheets possessed a "strong" and a "weak" direction. The sheets were tested for tensile strength in the two directions, designated as 0° for the strong direction and 90° for the weak direction, along with the level of elongation before failure was measured (or Young's Modulus of elasticity).

The sheets were also tested for strength in the intermediate, or 45°, direction although only exemplary results for tests in this direction are given. The tensile strength, elongation, and Young's modulus of the sheets in the 45° direction generally fell between those measured in the strong and weak directions, although as a general rule they were closer to the same properties measured in the weak direction. The results are set forth as follows:

| | Strength (MPa) | | Elongation (ΔL/L) | | Modulus (MPa) | |
|---|---|---|---|---|---|---|
| Example | 0° | 90° | 0° | 90° | 0° | 90° |
| 125 | 10.67 | 5.18 | 1.57% | 0.66% | 2297 | 1375 |
| 126 | 11.2 | 5.33 | 2.38% | 1.25% | 2156 | 1559 |
| 127 | 13.45 | 6.27 | 2.22% | 1.00% | 2956 | 1548 |
| 128 | 16.06 | 7.73 | 3.05% | 1.01% | 3006 | 1674 |
| 129 | 17.91 | 10.0 | 1.38% | 0.9 | 3375 | 2608% |
| 130 | 13.87 | 6.76 | 1.03% | 0.48% | 3058 | 2434 |

These examples demonstrate that as the amount of perlite was decreased (which increased the concentration of fiber), the tensile strength, elongation, and Young's modulus all increased, except after the amount of perlite was reduced below a certain amount. Both the tensile strength and the Young's modulus continued to increase until the perlite was left out altogether, as in Example 130. However, the ability of the material to elongate increased as the perlite was decreased, until less than 0.2 kg was used, after which the elongation dropped considerably. Reducing the amount of perlite beyond a certain point in this mix design results in an increased amount of defects in the sheets, which decreases the strength, elongation, and elasticity of the sheets.

However, in general, as the amount of perlite is decreased, the concentrations of fiber, rheology modifying agent, and hydraulic cement are increased, which would be expected to add to the tensile strength. In addition, increasing the concentration of cement would add to the stiffness (modulus) while negatively affecting the elongation ability of the product.

Another interesting point is that the ratio of tensile strength in the strong and weak directions was only about 2:1 in these sheets, whereas in paper products the ratio is typically 3:1.

While the sheets tested above were substantially dry, sheets made according to Examples 125–130 were further dried in an oven in order to obtain a sheet of maximum dryness. The further drying of the sheets was performed in order to portray a more accurate picture of the strength and other properties of the sheets under constant conditions. Depending on the mix designs, humidity during the test procedures, or other variables, the sheets would be expected to absorb or retain a certain amount of moisture. The strength, elongation, and modulus of elasticity results for the further dried sheets are set forth as follows:

| | Strength (MPa) | | Elongation (ΔL/L) | | Modulus (MPa) | |
|---|---|---|---|---|---|---|
| Example | 0° | 90° | 0° | 90° | 0° | 90° |
| 125 | 14.01 | N/A | 1.53% | N/A | 2559 | N/A |
| 126 | 13.6 | 6.23 | 1.34% | 1% | 1799 | 2071 |
| 127 | 16.81 | 8.11 | 1.76% | 1.08% | 2659 | 1587 |
| 128 | 19.32 | 8.91 | 1.82% | 1.16% | 4002 | 1609 |
| 129 | 20.25 | 11.23 | 1.41% | 0.63% | 3448 | 1536 |
| 130 | 17.5 | N/A | 0.81% | N/A | 3457 | N/A |

As shown by these examples, totally drying the sheets decreases the elongation somewhat, whereas the strength and modulus of elongation are increased. Theses examples therefore teach that where increased strength and stiffness are important, the sheet should be totally dry. Where increased elongation is important, the elongation may be controlled with the humidity of the sheet.

EXAMPLES 131–135

Hydraulically settable sheets having a thickness of 0.4 mm were manufactured according to the process set forth in Examples 43–60 from a hydraulically settable mixture containing the following component:

| | |
|---|---|
| Portland Cement | 1.0 kg |
| CaCO₃ (talc) | variable |
| Tylose ® FL 15002 | 0.20 kg |
| Fiber (Southern pine) | 0.25 kg |
| Water | variable |

The effect of adding varying amounts of talc was studied to determine the effect on the properties of the material, particularly the strength properties of the hardened sheet. Because of the reduced water-absorbing behavior of talc compared to perlite, it was not necessary to decrease the amount of water by the same level as the amount of talc was decreased in order to maintain the same level of rheology and workability.

| Example | CaCO₃ | Water |
|---|---|---|
| 131 | 5.0 kg | 2.25 kg |
| 132 | 4.0 kg | 2.15 kg |
| 133 | 3.0 kg | 2.05 kg |
| 134 | 2.0 kg | 2.00 kg |
| 135 | 1.0 kg | 1.96 kg |

The strength, elongation, and Young's modulus of each of the totally dry sheets formed from the different mix designs are set forth as follows:

| | Strength (MPa) | | Elongation (ΔL/L) | | Modulus (MPa) | |
|---|---|---|---|---|---|---|
| Example | 0° | 90° | 0° | 90° | 0° | 90° |
| 131 | 11.59 | N/A | N/A | N/A | N/A | N/A |
| 132 | 16.16 | N/A | 0.72% | N/A | 4638 | N/A |
| 133 | 14.82 | 5.22 | 0.97% | 0.42% | 4521 | 3521 |
| 134 | 20.43 | 8.26 | 1.11% | 0.56% | 4301 | 2773 |
| 135 | 18.43 | 7.98 | 1.13% | 0.51% | 3902 | 3320 |

The use of talc yields sheets with a smoother, more defect-free surface as well as a more homogeneous microstructure compared to where perlite is used.

EXAMPLES 136–142

Hydraulically settable sheets having a thickness of 0.4 mm were manufactured according to the process set forth in Examples 43–60 from a hydraulically settable mixture containing the following components:

| | |
|---|---|
| Portland Cement | 1.0 kg |
| Perlite | 0.5 kg |
| Mica | 0.5 kg |
| Tylose ® FL 15002 | variable |
| Fiber (Southern pine) | 0.25 kg |
| Water | variable |

The level of Tylose® was altered in order to determine the effect of increasing amounts of Tylose® within the hydraulically settable mixture. Increasing the amount of Tylose® within the mixture required the addition of more water in order to dissolve the Tylose® and maintain similar rheology and workability.

| Example | Tylose ® | Water |
|---|---|---|
| 136 | 0.1 kg | 2.25 kg |
| 137 | 0.3 kg | 2.75 kg |
| 138 | 0.4 kg | 3.00 kg |
| 139 | 0.5 kg | 3.25 kg |
| 140 | 0.6 kg | 3.50 kg |
| 141 | 0.7 kg | 3.75 kg |
| 142 | 0.8 kg | 4.0 kg |

The tensile strength and elongation properties increased up to a point as more Tylose® was added, while the Young's modulus fluctuated. The results of testing oven dried sheets made using the various mix designs are as follows:

| | Strength (MPa) | | Elongation (ΔL/L) | | Modulus (MPa) | |
|---|---|---|---|---|---|---|
| Example | 0° | 90° | 0° | 90° | 0° | 90° |
| 136 | N/A | N/A | N/A | N/A | N/A | N/A |
| 137 | 13.84 | 7.25 | 1.41% | 0.75% | 2954 | 1692 |
| 138 | 16.43 | 7.9 | 1.9% | 0.83% | 2400 | 2075 |
| 139 | 21.31 | 11.58 | 3.64% | 1.06% | 3347 | 2370 |
| 140 | 16.11 | 10.35 | 1.84% | 1.13% | 2816 | 1797 |
| 141 | 15.73 | 9.56 | 1.81% | 0.93% | 2690 | 1851 |
| 142 | 18.86 | 10.33 | 2.35% | 1.45% | 2790 | 1570 |

As illustrated, increasing the concentration of Tylose® will generally tend to increase the tensile strength, modulus, and elongation before rupture. A higher elongation ability would be expected to aid in curling the rim of a cup formed from a sheet, while increasing the strength of the sheet at a score cut. However, as the concentration of Tylose® is increased above a certain amount, the material becomes less workable and more defects are introduced within the structural matrix, which would be expected to reduce the strength, modulus, and elongation of the sheet. Nevertheless, the amount of defects (and resulting strength properties) can be improved by optimizing the calendering process.

EXAMPLE 143

Based on the understanding that tensile strength and elongation generally increase as both the amount of fiber and Tylose® is increased within a mix design, a mix design was made which maximized both. The cementitious mixture included the following components:

| | |
|---|---|
| Portland cement | 1.0 kg |
| Water | 2.2 kg |
| Perlite | 0.1 kg |
| Fiber (Southern pine) | 0.25 kg |
| Tylose ® FL 15002 | 0.5 kg |

The mixture was extruded and then passed between a series of pairs of rollers into a sheet having a thickness of 0.4 mm. The totally dried sheet was found to have superior strength and elongation properties. The tensile strength was tested as 39.05 MPa in the strong direction and 18.86 MPa in the weak direction; the elongation was 1.97% in the strong direction and 1.23% in the weak direction; and the modulus of elasticity was 3935 in the strong direction and 2297 in the weak direction, which is comparable to normal paper.

EXAMPLES 144–148

Hydraulically settable sheets having a thickness of 0.4 mm were manufactured according to the process set forth in Examples 43–60 from a hydraulically settable mixture containing the following components:

| | | |
|---|---|---|
| Portland Cement | 1.0 kg | |
| Hollow glass spheres (4000 psi) | variable | |
| Tylose ® FL 15002 | 0.2 kg | |
| Fiber (Southern pine) | 0.25 kg | |
| Water | variable | |

The effect of adding varying amounts of hollow glass spheres was studied to determine the effect on the properties of the material, particularly the strength properties of the hardened sheet. Although glass spheres do not absorb large amounts of water, less water was required to maintain the same rheology as the amount of glass spheres was decreased because of the corresponding decrease in interparticulate space.

| Example | Glass Spheres | Water |
|---|---|---|
| 144 | 0.5 kg | 1.6 kg |
| 145 | 0.4 kg | 1.45 kg |
| 146 | 0.3 kg | 1.40 kg |
| 147 | 0.2 kg | 1.35 kg |
| 148 | 0.1 kg | 1.25 kg |

The strength, elongation, and Young's modulus of each of the totally dry sheets formed from the different mix designs are set forth as follows:

| | Strength (MPa) | | Elongation (ΔL/L) | | Modulus (MPa) | |
|---|---|---|---|---|---|---|
| Example | 0° | 90° | 0° | 90° | 0° | 90° |
| 144 | 10.34 | 3.69 | 2.2% | 1.52% | 1166 | 620 |
| 145 | 11.1 | 4.79 | 2.02% | 1.49% | 1446 | 677 |
| 146 | 12.38 | 5.71 | 1.58% | 1.15% | 1800 | 870 |
| 147 | 14.52 | 6.89 | 1.5% | 1.1% | 1935 | 1220 |
| 148 | 19.45 | 9.66 | 1.54% | 0.96% | 2660 | 1741 |

As seen with glass spheres, the modulus of elasticity is much lower while the elongation is fairly high compared to other mix designs. The sheets are therefore more pliable and elastic. The sheets formed in Examples 144–148 were highly thermally insulating, with k-factors ranging from 0.08–0.14 W/m.K.

EXAMPLES 149–152

Hydraulically settable sheets having a thickness of 0.4 mm were manufactured according to the process set forth in Examples 43–60 from a hydraulically settable mixture containing the following components:

| | | |
|---|---|---|
| Portland Cement | 1.0 kg | |
| Perlite | 0.5 kg | |
| Mica | variable | |
| Tylose ® FL 15002 | 0.2 kg | |
| Fiber (Southern pine) | 0.25 kg | |
| Water | variable | |

The effect of adding varying amounts of mica was studied to determine the effect on the properties of the material, particularly the strength properties of the hardened sheet. Because of the water-absorbing behavior of mica, it was necessary to increase the amount of water as the amount of mica was increased in order to maintain the same level of rheology and workability.

| Example | Mica | Water |
|---|---|---|
| 149 | 1.0 kg | 2.7 kg |
| 150 | 1.5 kg | 2.9 kg |
| 151 | 2.0 kg | 3.0 kg |
| 152 | 2.5 kg | 3.2 kg |

The strength, elongation, and Young's modulus of each of the totally dry sheets formed from the different mix designs are set forth as follows:

| | Strength (MPa) | | Elongation (ΔL/L) | | Modulus (MPa) | |
|---|---|---|---|---|---|---|
| Example | 0° | 90° | 0° | 90° | 0° | 90° |
| 149 | 9.92 | 4.61 | 0.825% | 0.652% | 2127 | 1257 |
| 150 | 9.37 | 5.3 | 0.71% | 0.49% | 3079 | 2188 |
| 151 | 11.14 | 4.05 | 0.79% | 0.314% | 3100 | 1520 |
| 152 | 11.41 | 4.76 | 0.58% | 0.32% | 2693 | 1282 |

Increasing the concentration of mica increases the strength of the sheets while reducing their elongation ability. Sheets containing larger amounts of mica became very brittle.

EXAMPLE 153

Using any of the mix designs set forth above, a hydraulically settable mixture is made by substituting gypsum hemihydrate for the hydraulic cement in roughly the same quantity by weight. The hydraulically settable mixture will have a faster setting time but will generally result in sheets having similar strength, elongation, and stiffness properties.

EXAMPLE 154

Using any of the mix designs set forth above, a hydraulically settable mixture is made by substituting calcium oxide for the hydraulic cement. The hydraulically settable mixture will have a slower setting time due to the slower reaction between calcium oxide and carbon dioxide, but will generally result in sheets having similar strength, elongation, and stiffness properties. However, by removing much of the water within the mixture during or after the molding process, the level of quickly attained green strength will be possible.

EXAMPLE 155

A hydraulically settable mixture is made having the following components:

| | | |
|---|---|---|
| Gypsum hemihydrate | 1.0 kg | |
| Perlite | 0.5 kg | |
| Tylose ® | 0.075 kg | |
| Fiber | 0.25 kg | |
| Water | 2.6 kg | |

The gypsum, Tylose®, Fiber, and Water are mixed together in a high shear mixer for 3 minutes, after which the perlite is added and mixed in a low shear mixer for an additional 3 minutes.

The mixture is extruded into a sheet having a thickness of 6 mm and then calendered in order to reduce the thickness of the sheets in steps to yield sheets having a final thickness ranging between 0.25 mm to 0.5 mm.

These sheets are readily formed into an appropriate food or beverage container using any appropriate procedure set forth in this Specification. The strength properties are comparable to containers made using hydraulic cement and may be useful in the place of, e.g., paper, cardboard, or polystyrene containers.

EXAMPLE 156

Any of the cementitious mix designs using hydraulic cement is altered to include about 25% gypsum hemihydrate by weight of the hydraulic cement. The gypsum acts as a water absorbing component (or internal drying agent) and results in quicker form stability. The strength properties of containers formed therefrom are comparable to mixtures not including gypsum.

EXAMPLE 157

A set accelerator is included within any of the above mix designs, resulting in a hydraulically settable mixture that will more quickly achieve form stability. The final strength of the material will be comparable to materials in which a set accelerator is not used.

EXAMPLE 158

Waste hydraulically settable containers were composted along with waste food. After 4 weeks, the containers were completely broken down and resulted in compost which substantially resembled potting soil.

EXAMPLE 159

Hydraulically settable sheets using any of the mix designs set forth above are used to manufacture printed reading materials, such as magazines or brochures. Such magazines and brochures contain both thinner, more flexible sheets, as well as thicker, less flexible sheets. The thinner, more flexible sheets have a thickness of about 0.25–0.05 mm, while the thicker, less flexible sheets have a thickness of about 0.1–0.2 mm.

IV. Summary

From the foregoing, it will be appreciated that the present invention provides improved compositions and methods for manufacturing cementitious and other hydraulically settable sheets that can be formed into a variety of objects presently formed from paper, cardboard, polystyrene, or plastic.

The present invention also provides compositions and methods which yield hydraulically settable sheets which have properties similar to those of paper, cardboard, polystyrene, and plastic. Such hydraulically settable sheets can be formed into a variety of containers and other objects using the same or similar manufacturing apparatus and techniques as those presently used to form such objects from paper, cardboard, polystyrene, or plastic.

The present invention further provides compositions and methods for manufacturing hydraulically settable sheets which do not result in the generation of wastes involved in the manufacture of paper, cardboard, plastic, or polystyrene materials. Further, such sheets, as well as containers or other objects made therefrom, are readily degradable into substances which are commonly found in the earth.

In addition, the present invention provides compositions and methods which make possible the manufacture of sheets, containers, and other objects at a cost comparable to and even superior to existing methods of manufacturing paper or polystyrene products.

Finally, the present invention provides compositions and methods for mass producing cementitious sheets which can rapidly be formed and substantially dried within a matter of minutes from the beginning of the manufacturing process.

The present invention may be embodied in other specific forms without departing from its spirit or essential characteristics. The described embodiments are to be considered in all respects as illustrative only and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for manufacturing a sheet having a hydraulically settable matrix, the method comprising the steps of:

mixing together a hydraulically settable binder, fibers, a rheology-modifying agent, and aggregate filler, and water to form a hydraulically settable mixture that is capable of being formed into a cohesive sheet;

forming the hydraulically settable mixture between at least one pair of counter-rotating rollers into a sheet having a thickness less than 2 cm and having sufficient cohesive strength while still in a green state and prior to drying such that the sheet does not rupture as the sheet exits the counter-rotating rollers; and drying the sheet to a significant degree in an accelerated manner such that the sheet is substantially dried in less than about 10 minutes after the hydraulically mixture is formed into the sheet.

2. A method for manufacturing a sheet as defined in claim 1, wherein the sheet has a thickness of less than about 3 mm.

3. A method for manufacturing a sheet as defined in claim 2, further including the step of rolling the significantly dried sheet onto a spool.

4. A method for manufacturing a sheet as defined in claim 1, further including the step of extruding the hydraulically settable mixture through a die prior to the forming step.

5. A method for manufacturing a sheet having a substantially dried hydraulically settable matrix, the method comprising the steps of:

mixing together a hydraulically settable binder, fibers, a rheology-modifying agent, an inorganic aggregate filler, and water to form a hydraulically settable mixture having a combined concentration of fibers and inorganic aggregate filler of at least about 50% by weight of the hydraulically settable binder;

extruding the hydraulically settable mixture through a die to form a sheet;

passing the extruded sheet while in a green state between counter-rotating reduction rollers in order to form a sheet having sufficient cohesive strength while still in a green state and prior to drying such that the sheet does not rupture as the sheet exits the rollers;

drying the sheet to a significant degree in an accelerated manner in order to quickly form the substantially dried hydraulically settable matrix of the sheet, wherein the substantially dried hydraulically settable matrix of the sheet has a thickness of up to about 3 mm: and rolling the sheet having the substantially dried hydraulically settable matrix obtained from the drying step onto a spool.

6. A method for manufacturing a sheet as defined in claim 5, wherein the forming step yields a sheet having a thickness up to about 1 cm.

7. A method for manufacturing a sheet as defined in claim 5, wherein the forming step yields a sheet having a thickness up to about 3 mm.

8. A method for manufacturing a sheet as defined in claim 5, wherein the forming step yields a sheet having a thickness of up to about 1 mm.

9. A method for manufacturing a sheet as defined in claim 5, wherein the extruding step is carried out using an auger extruder.

10. A method for manufacturing a sheet as defined in claim 5, wherein the extruding step is carried out using a piston extruder.

11. A method for manufacturing a sheet having a substantially dried hydraulically settable matrix, the method comprising the steps of:

mixing together a hydraulically settable binder, fibers, an inert inorganic aggregate filler, and water in order to form a hydraulically settable mixture that is capable of being passed between a pair of counter-rotating reduction rollers while in a green state to form a cohesive sheet;

passing the hydraulically settable mixture between at least one pair of counter-rotating rollers to form a coherent sheet having sufficient cohesive strength while still in the green state and prior to drying such that the sheet does not rupture as the sheet exits the rollers;

drying the sheet to a significant degree in an accelerated manner in order to form the substantially dried hydraulically settable matrix of the sheet; and rolling the sheet having the substantially dried hydraulically settable matrix obtained in the drying step onto a spool.

12. A method for manufacturing a spooled sheet as defined in claim 11, wherein the mixing step further includes adding a rheology-modifying agent to the hydraulically settable mixture.

13. A method for manufacturing a spooled sheet as defined in claim 11, wherein the forming and drying steps yield a significantly dried sheet having a thickness less than about 3 mm.

14. A method for manufacturing a spooled sheet as defined in claim 11, wherein the forming and drying steps yield a significantly dried sheet having a thickness less than about 1 mm.

15. A method for manufacturing a spooled sheet as defined in claim 11, wherein the sheet that is wound on the spool has a length of at least about 25 feet.

16. A method for manufacturing a spooled sheet as defined in claim 11, wherein the sheet that is wound on the spool has a length of at least about 100 feet.

17. A method for manufacturing a spooled sheet as defined in claim 11, wherein the sheet that is wound on the spool has a length of at least about 1000 feet.

18. A method for manufacturing a spooled sheet as defined in claim 11, wherein the drying step yields a substantially hardened hydraulically settable matrix in about 10 minutes or less from the time the hydraulically settable mixture is first formed into the sheet.

19. A method for manufacturing a sheet having a hydraulically settable matrix, the method comprising the steps of:

mixing together a hydraulically settable binder, fibers, and water in order to form a hydraulically settable mixture that can be passed between a pair of counter-rotating reduction rollers while in a green state to form a cohesive sheet;

passing the hydraulically settable mixture between a pair of counter-rotating reduction rollers to form the cohesive sheet having sufficient cohesive strength while still in the green state and prior to drying such that the sheet does not rupture as the sheet exits the reduction rollers;

drying the sheet to a significant degree in an accelerated manner in order to form the hydraulically settable matrix of the sheet; and rolling the sheet having the substantially dried hydraulically settable matrix obtained in the drying stop onto a spool.

20. A method for manufacturing a sheet as defined in claim 19, further including the step of extruding the hydraulically settable mixture through a die prior to passing the extruded mixture between the pair of counter-rotating reduction rollers.

21. A method for manufacturing a sheet as defined in claim 19, wherein the forming step yields a sheet having a thickness less than about 1 mm.

22. A method for manufacturing a sheet as defined in claim 19, wherein the mixing step further includes adding an inorganic aggregate filler to the hydraulically settable mixture.

23. A method for manufacturing a sheet as defined in claim 19, wherein the mixing step further includes adding a rheology-modifying agent to the hydraulically settable mixture.

24. A method for manufacturing a sheet as defined in claim 19, further including the step of extruding the hydraulically settable mixture through a die prior to forming the cohesive sheet.

25. A method for manufacturing a sheet having a substantially dried hydraulically settable matrix, the method comprising the steps of:

mixing together a hydraulically settable binder, fibers, rheology-modifying agent, an inorganic aggregate filler, and water in order to form a hydraulically settable mixture having a combined concentration of fibers and inorganic aggregate filler of at least about 50% by weight of the hydraulically settable binder, wherein the hydraulically settable mixture is capable of being passed between a pair of counter-rotating rollers while in a green state to form a cohesive sheet;

forming the hydraulically settable mixture between at least one pair of counter-rotating rollers into a sheet having a thickness up to about 2 cm and having sufficient cohesive strength while still in the green state and prior to drying such that the sheet does not rupture as the sheet exits the rollers; and drying the sheet to a significant degree in an accelerated manner by passing the sheet obtained in the forming step around a portion of at least one substantially cylindrical drying roller in order to form the substantially dried hydraulically settable matrix of the sheet in less than about 10 minutes after forming the sheet.

26. A method for manufacturing a sheet as defined in claim 25, wherein the forming step yields a sheet having a thickness up to about 1 cm.

27. A method for manufacturing a sheet as defined in claim 25, wherein the forming step yields a sheet having a thickness up to about 3 mm.

28. A method for manufacturing a sheet as defined in claim 25, wherein the forming step yields a sheet having a thickness in a range from about 0.01 mm to about 1 mm.

29. A method for manufacturing a sheet as defined in claim 25, wherein the hydraulically settable binder comprises a hydraulic cement.

30. A method for manufacturing a sheet as defined in claim 29, wherein the hydraulic cement includes portland cement.

31. A method for manufacturing a sheet as defined in claim 25, wherein the hydraulically settable binder includes gypsum hemihydrate.

32. A method for manufacturing a sheet as defined in claim 25, wherein the hydraulically settable binder includes calcium oxide.

33. A method for manufacturing a sheet as defined in claim 25, wherein the fibers are included in an amount in a range from about 0.2% to about 50% by volume of the hydraulically settable mixture.

34. A method for manufacturing a sheet as defined in claim 25, wherein the fibers are included in an amount in a range from between about 1% to about 30% by volume of the hydraulically settable mixture.

35. A method for manufacturing a sheet as defined in claim 25, wherein the fibers are included in an amount in a range from about 5% to about 15% by volume of the hydraulically settable mixture.

36. A method for manufacturing a sheet as defined in claim 25, wherein the inorganic aggregate filler is included in an amount of up to about 80% by weight of the hydraulically settable mixture.

37. A method for manufacturing a sheet as defined in claim 25, wherein the inorganic aggregate filler is included in an amount in a range from about 3% to about 50% by weight of the hydraulically settable mixture.

38. A method for manufacturing a sheet as defined in claim 25, wherein the inorganic aggregate filler is included in an amount in a range from about 20% to about 35% by weight of the hydraulically settable mixture.

39. A method for manufacturing a sheet as defined in claim 25, wherein the rheology-modifying agent is included in an amount in a range from about 0.1% to about 20% by weight of the hydraulically settable mixture.

40. A method for manufacturing a sheet as defined in claim 25, wherein the rheology-modifying agent is included in an amount in a range from about 0.5% to about 3% by weight of the hydraulically settable mixture.

41. A method for manufacturing a sheet as defined in claim 25, wherein the rheology-modifying agent includes a cellulosic material.

42. A method for manufacturing a sheet as defined in claim 41, wherein the cellulosic material is selected from the group consisting of methylhydroxyethylcellulose, hydroxymethylethylcellulose, carboxymethylcellulose, methylcellulose, ethylcellulose, hydroxyethylcellulose, hydroxyethylpropylcellulose, and mixtures or derivatives thereof.

43. A method for manufacturing a sheet as defined in claim 25, wherein the rheology-modifying agent includes a starch or a derivative thereof.

44. A method for manufacturing a sheet as defined in claim 43, wherein the starch or derivative thereof is selected from the group consisting of amylopectin, amylose, seagel, starch acetates, starch hydroxyethyl ethers, ionic starches, long-chain alkylstarches, dextrins, amine starches, phosphate starches, dialdehyde starches, and mixtures or derivatives thereof.

45. A method for manufacturing a sheet as defined in claim 25, wherein the rheology-modifying agent includes a protein or a derivative thereof.

46. A method for manufacturing a sheet as defined in claim 45, wherein the protein or derivative thereof is selected from the group consisting of prolamine, collagen, gelatin, glue, casein, and mixtures or derivatives thereof.

47. A method for manufacturing a sheet as defined in claim 25, wherein the rheology-modifying agent includes a synthetic organic material.

48. A method for manufacturing a sheet as defined in claim 47, wherein the synthetic organic material is selected from the group consisting of polyvinyl pyrrolidone, polyethylene glycol, polyvinyl alcohol, polyvinylmethyl ether, polyacrylic acids, polyacrylic acid salts, polyvinylacrylic acids, polyvinylacrylic acid salts, polyacrylimides, polylactic acid, ethylene oxide polymers, synthetic clay, latex, and mixtures thereof.

49. A method for manufacturing a sheet as defined in claim 25, wherein the rheology-modifying agent comprises a polysaccharide material selected from the group consisting of alginic acid, phycocolloids, agar, gum arabic, guar gum, locust bean gum, gum karaya, gum tragacanth, and mixtures or derivatives thereof.

50. A method for manufacturing a sheet as defined in claim 25, wherein the mixing step includes adding a dispersant to the hydraulically settable mixture, to create a mixture having a more fluid-like consistency.

51. A method for manufacturing a sheet as defined in claim 50, wherein the dispersant is selected from the group consisting of sulfonated naphthalene-formaldehyde condensate, sulfonated melamine-formaldehyde condensate, lignosulfonate, acrylic acid, and mixtures thereof.

52. A method for manufacturing a sheet as defined in claim 25, wherein the thickness of the sheet is reduced in steps during the forming step by passing the sheet between a plurality of sets of counter-rotating rollers having progressively smaller gap distances therebetween.

53. A method for manufacturing a sheet as defined in claim 25, wherein the forming step is performed using heated rollers.

54. A method for manufacturing a sheet as defined in claim 53, wherein the heated rollers remove a significant amount of the water by evaporation from the hydraulically settable mixture.

55. A method for manufacturing a sheet as defined in claim 53, wherein the heated rollers increase the rate of hydration of the hydraulically settable binder.

56. A method for manufacturing a sheet as defined in claim 53, wherein the heated rollers have a temperature in a range from about 50° C. to about 140° C.

57. A method for manufacturing a sheet as defined in claim 53, wherein the heated rollers have a temperature in a range from about 70° C. to about 120° C.

58. A method for manufacturing a sheet as defined in claim 25, wherein the drying step is carried out using at least one heated drying roller.

59. A method for manufacturing a sheet as defined in claim 25, wherein the drying step is carried out using a heated drying chamber.

60. A method for manufacturing a sheet as defined in claim 25, wherein the forming step yields a sheet in which the fibers have a substantially unidirectional orientation.

61. A method for manufacturing a sheet as defined in claim 25, wherein the forming step yields a sheet in which the fibers have a substantially bidirectional orientation.

62. A method for manufacturing a sheet as defined in claim 25, further including the step of compacting a partially dried sheet between compaction rollers in order to increase the density of the sheet.

63. A method for manufacturing a sheet as defined in claim 25, further including the step of finishing the sheet by passing a substantially dried sheet between a pair of finishing rollers including a hard roller and a soft roller.

64. A method for manufacturing a sheet as defined in claim 25, further including the step of passing the sheet between a pair of rollers which impart a textured surface to the sheet.

65. A method for manufacturing a sheet as defined in claim 25, further including the step of passing the sheet between a pair of corrugating rollers to form a corrugated sheet.

66. A method for manufacturing a sheet as defined in claim 25, further including the step of rolling the substantially dried sheet onto a spool to form a roll.

67. A method for manufacturing a sheet as defined in claim 66, wherein the coating material is selected from the group consisting of melamine, polyvinyl chloride, polyvinyl alcohol, polyvinyl acetate, polyacrylate, hydroxypropylmethylcellulose, polyethylene glycol, acrylics, polyurethane, polyethylene, polyhydroxybutyrate-hydroxyvalerate copolymer, polylactic acid, synthetic polymers, waxes, elastomers, and mixtures of the foregoing.

68. A method for manufacturing a sheet as defined in claim 66, wherein the coating material is selected from the group consisting of sodium silicate, calcium carbonate, kaolin clay, ceramic, and mixtures thereof.

69. A method for manufacturing a sheet as defined in claim 68, wherein the score defines a fold line along which the sheet may be bent.

70. A method for manufacturing a sheet as defined in claim 66, wherein the coating step is carried out using a coating apparatus selected from the group consisting of a blade coater, a puddle coater, an air-knife coater, a printer coater, and a gravure coater.

71. A method for manufacturing a sheet as defined in claim 25, further including the step of cutting the substantially hardened sheet into discontinuous sheets and stacking said discontinuous sheets to form a stack of sheets.

72. A method for manufacturing a sheet as defined in claim 25, further including the step of coating at least a portion of the sheet with a coating material.

73. A method for manufacturing a sheet as defined in claim 25, further including the step of pressing or cutting a score into the substantially dried sheet.

74. A method for manufacturing a sheet as defined in claim 25, further including the step of cutting a perforation into the substantially dried sheet.

75. A method for manufacturing a sheet as defined in claim 25, wherein at least a part of the mixing step is carried out using a high shear mixer.

* * * * *

UNITED STATES PATENT AND TRADEMARK OFFICE
CERTIFICATE OF CORRECTION

PATENT NO. : 5,720,913

DATED : February 24, 1998

INVENTOR(S) : Per Just Andersen; Simon K. Hodson

It is certified that error appears in the above-identified patent and that said Letters Patent is hereby corrected as shown below:

On title
Page 4, Left Column, line 46, after "Marilyn" change "Bakekr" to --Bakker--

Page 4, Right Column, line 51, after "with" change "llowance" to --Allowance--

Page 5, Left Column, line 36, after "and" change "concretes" to --Concretes--

Figure 22:
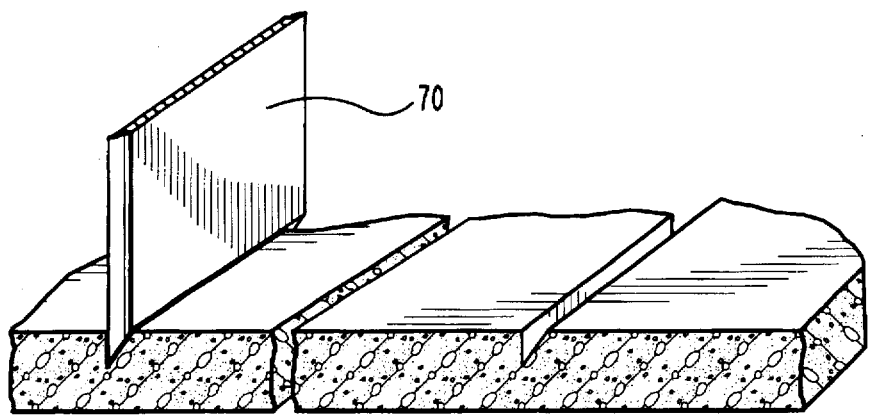
FIG. 22 is a perspective view of a sheet being score cut by a knife blade cutter.

On drawing sheet,
Figure 22, change reference numeral "70" to --170--

Figure 23, change reference numeral "74" to --172--

Col. 1, line 9, after "Just" change "Anderson" to --Andersen--

Col. 1, line 15, after "Just" change "Anderson" to --Andersen--

Col. 5, line 22, after "materials ?" delete the period

Col. 29, line 52, change "$Al_2O_3.3SiO_2.2H_2O$" to --$Al_2O_3 \cdot 3SiO_2 \cdot 2H_2O$--

Col. 29, line 54, change "$Al_2O_3.4SiO_2.H_2O$" to --$Al_2O_3 \cdot 4SiO_2 \cdot H_2O$--

Col. 30, line 44, change "W/m.K" to --W/m·K--

Col. 41, line 60, delete the quotation mark before "or" and insert it before "machine"

Col. 50, line 21, after "nozzle" change "112" to --119--

UNITED STATES PATENT AND TRADEMARK OFFICE
CERTIFICATE OF CORRECTION

PATENT NO. : 5,720,913

DATED : February 24, 1998

INVENTOR(S) : Per Just Andersen; Simon K. Hodson

It is certified that error appears in the above-identified patent and that said Letters Patent is hereby corrected as shown below:

Col. 50, line 46, after "roller" change "168" to --160'--

Col. 51, line 49, after "about" change "355" to --35%--

Col. 54, line 47, after "the" change ""course"" to --"coarse"--

Col. 61, line 45, before "shell" change "claim" to --clam--

Col. 66, line 29, before "and" change "J/g.K" to --J/g·K--

Col. 66, line 30, after "0.06-" change "014 W/m.K" to --0.14 W/m·K --

Col. 68, line 44, change "W/m.K" to --W/m·K--

Col. 68, line 51, change "W/m.K" to --W/m·K--

Col. 68, line 63, after "of" change "course" to --coarse--

Col. 68, line 66, after "the" change ""course"" to --"coarse"--

Col. 69, line 4, change "W/m.K" to --W/m·K--

Col. 70, line 9, Example 129, change "0.9" to --0.9%--

Col. 70, line 9, Example 129, change "2608%" to --2608--

UNITED STATES PATENT AND TRADEMARK OFFICE
CERTIFICATE OF CORRECTION

PATENT NO. : 5,720,913
DATED : Feb. 24, 1998
INVENTOR(S) : Per Just Andersen, et al It is certified that error appears in the above-identified patent and that said Letters Patent is hereby corrected as shown below:

Col. 73, line 47, change "W/m.K" to --W/m·K--

Signed and Sealed this

Twenty-ninth Day of December, 1998

Attest:

BRUCE LEHMAN

*Attesting Officer*   *Commissioner of Patents and Trademarks*